US008504217B2

(12) United States Patent
Nilsen et al.

(10) Patent No.: US 8,504,217 B2
(45) Date of Patent: Aug. 6, 2013

(54) SYSTEM AND METHOD FOR PROVIDING DYNAMIC POWER MANAGEMENT

(75) Inventors: Wayne T. Nilsen, Trabuco Canyon, CA (US); Grant Edward Burrows, Dana Point, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 256 days.

(21) Appl. No.: 12/967,713

(22) Filed: Dec. 14, 2010

(65) Prior Publication Data

US 2011/0184579 A1 Jul. 28, 2011

Related U.S. Application Data

(60) Provisional application No. 61/286,343, filed on Dec. 14, 2009.

(51) Int. Cl.
*G05D 29/00* (2006.01)

(52) U.S. Cl.
USPC .......... 700/295

(58) Field of Classification Search
USPC .......... 700/295
See application file for complete search history.

(56) References Cited

U.S. PATENT DOCUMENTS 3,037,812 A 6/1962 Monroe
3,795,771 A 3/1974 Gundersen et al.
3,894,244 A 7/1975 Hill
3,980,954 A 9/1976 Whyte
4,208,740 A 6/1980 Yin et al.
4,367,488 A 1/1983 Leventer et al.
4,428,078 A 1/1984 Kuo
4,464,724 A 8/1984 Gurr et al.
4,583,131 A 4/1986 Dakin
4,584,603 A 4/1986 Harrison
4,742,544 A 5/1988 Kupnicki et al.

(Continued)

FOREIGN PATENT DOCUMENTS

CN 1462552 A 12/2003
CN ZL200520103236.4 12/2006

(Continued)

OTHER PUBLICATIONS

Office Action. EP Application No. 08 830 787.1, Dec. 9, 2011.

(Continued)

*Primary Examiner* — Kavita Padmanabhan
*Assistant Examiner* — Patrick D Cummins
(74) *Attorney, Agent, or Firm* — Orrick, Herrington & Sutcliffe LLP

(57) ABSTRACT

A power management system suitable for dynamically allocating power provided by a selected power source among one or more associated loads and methods for manufacturing and using same. In a normal operation mode, the power source provides power to one or more enabled loads. The selection of loads that are enabled, and therefore the provided power, can dynamically vary over time. If an undesired power condition arises, a power limiting mode is entered, wherein at least one of the enabled loads is disabled. The resultant power provided by the power source to the remaining enabled loads is measured, and the power limit mode is maintained until the undesired power condition is resolved. As needed, further corrective action, such as disabling additional enabled loads, can be applied to resolve the undesired power condition. The power management system thereby can comprise a hierarchical system for dynamically resolving undesired power conditions.

30 Claims, 38 Drawing Sheets

U.S. PATENT DOCUMENTS 4,774,514 A 9/1988 Hildebrandt et al.
4,835,604 A 5/1989 Kondo et al.
4,866,515 A 9/1989 Tagawa et al.
4,866,704 A 9/1989 Bergman
4,866,732 A 9/1989 Carey et al.
4,887,152 A 12/1989 Matsuzaki et al.
4,890,104 A 12/1989 Takanabe et al.
4,896,209 A 1/1990 Matsuzaki et al.
4,897,714 A 1/1990 Ichise et al.
4,916,328 A 4/1990 Culp, III
4,939,527 A 7/1990 Lamberty et al.
4,958,381 A 9/1990 Toyoshima
4,975,696 A 12/1990 Salter, Jr. et al.
5,005,183 A 4/1991 Carey et al.
5,027,124 A 6/1991 Fitzsimmons et al.
5,034,808 A 7/1991 Murray
5,123,015 A 6/1992 Brady, Jr. et al.
5,136,304 A 8/1992 Peters
5,151,896 A 9/1992 Bowman et al.
5,177,616 A 1/1993 Riday
5,189,671 A 2/1993 Cheng
5,208,590 A 5/1993 Pitts
5,237,659 A 8/1993 Takats
5,243,652 A 9/1993 Teare et al.
5,247,414 A 9/1993 Mitchell et al.
5,276,455 A 1/1994 Fitzsimmons et al.
5,289,272 A 2/1994 Rabowsky et al.
5,295,089 A 3/1994 Ambasz
5,311,302 A 5/1994 Berry et al.
5,311,515 A 5/1994 Henderson et al.
5,325,131 A 6/1994 Penney
5,343,456 A 8/1994 Maeda
5,383,178 A 1/1995 Unverrich
5,410,754 A 4/1995 Klotzbach et al.
5,414,640 A 5/1995 Seem
5,444,762 A 8/1995 Frey et al.
5,463,656 A 10/1995 Polivka et al.
5,469,363 A 11/1995 Saliga
5,481,478 A 1/1996 Palmieri et al.
5,493,702 A 2/1996 Crowley et al.
5,524,272 A 6/1996 Podowski et al.
5,543,805 A 8/1996 Thaniyavarn
5,555,466 A 9/1996 Scribner et al.
5,557,656 A 9/1996 Ray et al.
5,568,484 A 10/1996 Margis
5,596,647 A 1/1997 Wakai et al.
5,610,822 A 3/1997 Murphy
5,617,331 A 4/1997 Wakai et al.
5,640,002 A 6/1997 Ruppert et al.
5,666,291 A 9/1997 Scott et al.
5,701,582 A 12/1997 DeBey
5,706,353 A 1/1998 Arai et al.
5,709,448 A 1/1998 Jennings et al.
5,711,014 A 1/1998 Crowley et al.
5,745,159 A 4/1998 Wax et al.
5,751,248 A 5/1998 Thaniyavarn
5,754,445 A 5/1998 Jouper et al.
5,760,819 A 6/1998 Sklar et al.
5,790,175 A 8/1998 Sklar et al.
5,790,423 A 8/1998 Lau et al.
5,790,787 A 8/1998 Scott et al.
5,801,751 A 9/1998 Sklar et al.
5,808,660 A 9/1998 Sekine et al.
5,831,664 A 11/1998 Wharton
5,832,380 A 11/1998 Ray et al.
5,835,127 A 11/1998 Booth et al.
5,857,869 A 1/1999 Parcel et al.
5,878,345 A 3/1999 Ray et al.
5,889,268 A 3/1999 Swartz
5,889,775 A 3/1999 Sawicz et al.
5,929,895 A 7/1999 Berry et al.
5,950,129 A 9/1999 Schmid et al.
5,953,429 A 9/1999 Wakai et al.
5,959,596 A 9/1999 McCarten et al.
5,960,343 A 9/1999 Ray et al.
5,966,442 A 10/1999 Sachdev
5,973,722 A 10/1999 Wakai et al.
5,990,928 A 11/1999 Sklar et al.
6,003,008 A 12/1999 Postrel et al.
6,014,381 A 1/2000 Troxel et al.
6,018,203 A 1/2000 David et al.
6,020,848 A 2/2000 Wallace et al.
6,046,513 A 4/2000 Jouper et al.
6,047,165 A 4/2000 Wright et al.
6,058,288 A 5/2000 Reed et al.
6,078,297 A 6/2000 Kormanyos
6,078,348 A 6/2000 Klosterman et al.
6,108,523 A 8/2000 Wright et al.
6,108,539 A 8/2000 Ray et al.
6,129,274 A 10/2000 Suzuki
6,130,727 A 10/2000 Toyozumi
6,135,549 A 10/2000 Demick et al.
6,137,377 A 10/2000 Wallace et al.
6,151,497 A 11/2000 Yee et al.
6,154,186 A 11/2000 Smith et al.
6,160,998 A 12/2000 Wright et al.
6,163,681 A 12/2000 Wright et al.
6,167,238 A 12/2000 Wright
6,173,159 B1 1/2001 Wright et al.
6,177,887 B1 1/2001 Jerome
6,181,990 B1 1/2001 Grabowsky et al.
6,201,797 B1 3/2001 Leuca et al.
6,208,307 B1 3/2001 Frisco et al.
6,216,065 B1 4/2001 Hall et al.
6,249,913 B1 6/2001 Galipeau et al.
6,266,664 B1 7/2001 Russell-Falla et al.
6,271,728 B1 8/2001 Wallace et al.
6,278,936 B1 8/2001 Jones
6,285,878 B1 9/2001 Lai
6,286,139 B1 9/2001 Decinque
6,308,045 B1 10/2001 Wright et al.
6,321,084 B1 11/2001 Horrer
6,338,045 B1 1/2002 Pappas
6,345,720 B1 2/2002 Redden et al.
6,351,247 B1 2/2002 Linstrom et al.
6,356,239 B1 3/2002 Carson
6,377,802 B1 4/2002 McKenna et al.
6,390,920 B1 5/2002 Infiesto et al.
6,392,692 B1 5/2002 Monroe
6,400,315 B1 6/2002 Adler et al.
6,408,180 B1 6/2002 McKenna et al.
6,414,644 B1 7/2002 Desargant et al.
6,417,803 B1 7/2002 de La Chapelle et al.
6,424,313 B1 7/2002 Navarro et al.
6,465,908 B1 * 10/2002 Karuppana et al. ............. 307/31
6,483,458 B1 11/2002 Carson
6,484,011 B1 11/2002 Thompson et al.
6,487,540 B1 11/2002 Smith et al.
6,499,027 B1 12/2002 Weinberger
6,507,279 B2 1/2003 Loof
6,507,952 B1 1/2003 Miller et al.
6,519,693 B1 2/2003 Debey
6,522,867 B1 2/2003 Wright et al.
6,529,706 B1 3/2003 Mitchell
6,538,656 B1 3/2003 Cheung et al.
6,542,086 B2 4/2003 Baumgartner et al.
6,549,754 B1 4/2003 Miller et al.
6,559,812 B1 5/2003 McCarten et al.
6,570,881 B1 5/2003 Wils et al.
6,574,338 B1 6/2003 Sachdev
6,580,402 B2 6/2003 Navarro et al.
6,594,471 B1 7/2003 Crowley et al.
6,598,227 B1 7/2003 Berry et al.
6,600,418 B2 7/2003 Francis et al.
6,606,056 B2 8/2003 Brogden
6,608,398 B2 8/2003 Masaoka
6,608,900 B1 8/2003 Yancey et al.
6,609,103 B1 8/2003 Kolls
6,611,537 B1 8/2003 Edens et al.
6,618,580 B2 9/2003 Parrott et al.
6,622,124 B1 9/2003 Kolls
6,628,235 B2 9/2003 Wight
6,637,484 B1 10/2003 Kraft
6,643,510 B2 11/2003 Taylor
6,650,898 B2 11/2003 Jochim et al.
6,661,353 B1 12/2003 Gopen
6,674,339 B2 1/2004 Kormanyos 6,674,398 B2 1/2004 Murphy
6,684,240 B1 1/2004 Goddard
6,693,236 B1 2/2004 Gould et al.
6,703,974 B2 3/2004 White et al.
6,707,346 B2 3/2004 Tillotson et al.
6,708,019 B2 3/2004 McLain et al.
6,714,163 B2 3/2004 Navarro et al.
6,725,035 B2 4/2004 Jochim et al.
6,728,535 B2 4/2004 Parkman
6,731,909 B2 5/2004 McLain et al.
6,736,315 B2 5/2004 Swartz
6,741,141 B2 5/2004 Kormanyos
6,741,841 B1 5/2004 Mitchell
6,745,010 B2 6/2004 Wright et al.
6,747,960 B2 6/2004 Tillotson
6,748,597 B1 6/2004 Frisco et al.
6,757,712 B1 6/2004 Bastian et al.
6,771,608 B2 8/2004 Tillotson
6,775,545 B2 8/2004 Wright et al.
6,778,825 B2 8/2004 Parkman
6,782,392 B1 8/2004 Weinberger et al.
6,785,526 B2 8/2004 McLain et al.
6,788,935 B1 9/2004 McKenna et al.
6,796,495 B2 9/2004 Stahl et al.
6,807,148 B1 10/2004 Eicher
6,807,538 B1 10/2004 Weinberger et al.
6,810,527 B1 10/2004 Conrad et al.
6,813,777 B1 11/2004 Weinberger et al.
6,844,855 B2 1/2005 Carson
6,847,801 B2 1/2005 de La Chapelle et al.
6,876,905 B2 4/2005 Farley et al.
6,885,845 B1 4/2005 Crowley et al.
6,885,863 B2 4/2005 Parkman et al.
6,885,864 B2 4/2005 McKenna et al.
6,889,042 B2 5/2005 Rousseau et al.
6,892,052 B2 5/2005 Kotola et al.
6,899,390 B2 5/2005 Sanfrod et al.
6,920,611 B1 7/2005 Spaeth et al.
6,937,164 B2 8/2005 Thomson et al.
6,938,258 B1 8/2005 Weinberger et al.
6,940,978 B2 9/2005 Parkman
6,941,111 B2 9/2005 McLain et al.
6,946,990 B2 9/2005 Monk
6,947,726 B2 9/2005 Rockwell
6,947,733 B2 9/2005 Tillotson
6,959,168 B2 10/2005 Parkman
6,963,304 B2 11/2005 Murphy
6,965,851 B2 11/2005 Tillotson
6,971,608 B2 12/2005 Harrington et al.
6,973,479 B2 12/2005 Brady et al.
6,974,076 B1 12/2005 Siegel
6,975,616 B2 12/2005 Stephenson et al.
6,983,312 B1 1/2006 O'Neil
6,985,588 B1 1/2006 Glick et al.
6,985,942 B2 1/2006 D'Annunzio et al.
6,990,338 B2 1/2006 Miller et al.
6,993,288 B2 1/2006 de La Chapelle et al.
7,003,293 B2 2/2006 D'Annunzio
7,023,996 B2 4/2006 Stephenson et al.
7,036,889 B2 5/2006 Sanfrod et al.
7,040,698 B2 5/2006 Park et al.
7,054,593 B2 5/2006 de La Chapelle et al.
7,062,268 B2 6/2006 McKenna
7,068,615 B2 6/2006 Niesen
7,072,634 B2 7/2006 Tillotson
7,085,563 B2 8/2006 Parkman
7,086,081 B2 8/2006 Martinez et al.
7,099,665 B2 8/2006 Taylor
7,100,187 B2 8/2006 Pierzga et al.
7,107,062 B2 9/2006 Cruz et al.
7,113,780 B2 9/2006 McKenna et al.
7,120,389 B2 10/2006 de La Chapelle et al.
7,123,199 B2 10/2006 Rotta
7,124,426 B1 10/2006 Tsuria et al.
7,136,621 B2 11/2006 de La Chapelle et al.
7,139,258 B2 11/2006 Tillotson
7,155,168 B2 12/2006 McLain et al.
7,161,788 B2 1/2007 Richie et al.
7,162,235 B1 1/2007 Gilbert
7,171,197 B2 1/2007 Miller et al.
7,177,638 B2 2/2007 Funderburk et al.
7,187,690 B2 3/2007 Taylor
7,187,927 B1 3/2007 Mitchell
7,233,958 B2 6/2007 Weng et al.
7,250,915 B2 7/2007 Nelson
7,274,336 B2 9/2007 Carson
7,280,825 B2 10/2007 Keen et al.
7,286,503 B1 10/2007 Clarke et al.
7,299,013 B2 11/2007 Rotta et al.
7,302,226 B2 11/2007 Stephenson
7,321,383 B2 1/2008 Monagahn et al.
7,328,012 B2 2/2008 Ziarno et al.
7,330,151 B1 2/2008 Monk et al.
7,343,157 B1 3/2008 Mitchell
7,359,700 B2 4/2008 Swensen et al.
7,362,262 B2 4/2008 Murphy
7,382,327 B2 6/2008 Nelson
7,400,858 B2 7/2008 Crowley et al.
7,406,309 B2 7/2008 Usher et al.
7,414,573 B2 8/2008 Murphy
7,437,125 B2 10/2008 McLain et al.
7,450,901 B2 11/2008 Parkman
7,454,202 B2 11/2008 de La Chappelle
7,454,203 B2 11/2008 Levitan
7,460,866 B2 12/2008 Salkini et al.
7,483,696 B1 1/2009 Mitchell
7,486,927 B2 2/2009 Kallio et al.
7,496,361 B1 2/2009 Mitchell et al.
7,508,342 B2 3/2009 Nelson
7,690,012 B2 3/2010 Luehrs
7,904,244 B2 3/2011 Sugla
8,036,001 B2 * 10/2011 Choi .......................... 363/21.02
2001/0025377 A1 9/2001 Hinderks
2002/0013150 A1 1/2002 McKenna et al.
2002/0045444 A1 4/2002 User et al.
2002/0045484 A1 4/2002 Eck
2002/0046406 A1 4/2002 Chelehmal et al.
2002/0058478 A1 5/2002 de La Chapelle et al.
2002/0059363 A1 5/2002 Katz et al.
2002/0059614 A1 5/2002 Lipsanen et al.
2002/0065711 A1 5/2002 Fujisawa et al.
2002/0069293 A1 6/2002 Natalio
2002/0087992 A1 7/2002 Bengeult et al.
2002/0094829 A1 7/2002 Ritter
2002/0095680 A1 7/2002 Davidson
2002/0152470 A1 10/2002 Hammond
2002/0162113 A1 10/2002 Hunter
2002/0164960 A1 11/2002 Slaughter et al.
2002/0170060 A1 11/2002 Lyman
2002/0178451 A1 11/2002 Ficco
2002/0197990 A1 12/2002 Jochim et al.
2003/0003899 A1 1/2003 Tashiro et al.
2003/0008652 A1 1/2003 Jochim et al.
2003/0020991 A1 1/2003 Chang
2003/0043760 A1 3/2003 Taylor
2003/0047647 A1 3/2003 Poblete
2003/0048007 A1 * 3/2003 Mercier et al. ................ 307/125
2003/0055975 A1 3/2003 Nelson et al.
2003/0060190 A1 3/2003 Mallart
2003/0067542 A1 4/2003 Monroe
2003/0069015 A1 4/2003 Brinkley et al.
2003/0069990 A1 4/2003 D'Annunzio et al.
2003/0084130 A1 5/2003 D'Annunzio
2003/0084451 A1 5/2003 Pierzga et al.
2003/0085818 A1 5/2003 Renton et al.
2003/0087672 A1 5/2003 Kattukaran et al.
2003/0093798 A1 5/2003 Rogerson
2003/0107248 A1 6/2003 Sanford et al.
2003/0126614 A1 7/2003 Staiger
2003/0130769 A1 7/2003 Farley et al.
2003/0140345 A1 7/2003 Fisk et al.
2003/0148736 A1 8/2003 Wright et al.
2003/0158958 A1 8/2003 Chiu
2003/0160710 A1 8/2003 Baumgartner et al.
2003/0161411 A1 8/2003 McCorkle et al.
2003/0169563 A1 9/2003 Adams
2003/0184449 A1 10/2003 Baumgartner et al.
2003/0217363 A1 11/2003 Brady, Jr. et al.

2003/0233469 A1 12/2003 Knowlson et al.
2003/0233658 A1 12/2003 Keen et al.
2003/0237016 A1 12/2003 Johnson et al.
2004/0001303 A1 1/2004 Dobler et al.
2004/0021371 A1 2/2004 Jouper
2004/0054923 A1 3/2004 Seago et al.
2004/0057177 A1 3/2004 Glahn et al.
2004/0077308 A1 4/2004 Sanford et al.
2004/0078821 A1 4/2004 Frisco et al.
2004/0088412 A1 5/2004 John et al.
2004/0098745 A1 5/2004 Marston et al.
2004/0108963 A1 6/2004 Clymer et al.
2004/0111523 A1 6/2004 Hall et al.
2004/0123322 A1 6/2004 Erkocevic et al.
2004/0128688 A1 7/2004 Seo
2004/0133634 A1 7/2004 Luke et al.
2004/0139467 A1 7/2004 Rogerson et al.
2004/0142658 A1 7/2004 McKenna et al.
2004/0158863 A1 8/2004 McLain
2004/0167967 A1 8/2004 Bastian et al.
2004/0183346 A1 9/2004 Sanford et al.
2004/0192339 A1 9/2004 Wilson et al.
2004/0198346 A1 10/2004 Swensen et al.
2004/0235469 A1 11/2004 Krug
2004/0252965 A1 12/2004 Moreno et al.
2004/0252966 A1 12/2004 Holloway et al.
2004/0253951 A1 12/2004 Chang et al.
2004/0254688 A1 12/2004 Chassin et al.
2005/0021602 A1 1/2005 Noel et al.
2005/0026608 A1 2/2005 Kallio et al.
2005/0027787 A1 2/2005 Kuhn et al.
2005/0039208 A1 2/2005 Veeck et al.
2005/0044564 A1 2/2005 Stopniewicz et al.
2005/0067530 A1 3/2005 Schafer et al.
2005/0102322 A1 5/2005 Bagley et al.
2005/0114894 A1 5/2005 Hoerl
2005/0132407 A1 6/2005 Boyer
2005/0136917 A1 6/2005 Taylor
2005/0138654 A1 6/2005 Minne
2005/0171653 A1 8/2005 Taylor
2005/0176368 A1 8/2005 Young et al.
2005/0177763 A1 8/2005 Stoler
2005/0181723 A1 8/2005 Miller et al.
2005/0193257 A1 9/2005 Stoler
2005/0202785 A1 9/2005 Meyer
2005/0215249 A1 9/2005 Little et al.
2005/0216938 A1 9/2005 Brady et al.
2005/0239261 A1 10/2005 Tai et al.
2005/0251798 A1 11/2005 Fraley
2005/0256616 A1 11/2005 Rhoads
2005/0268319 A1 12/2005 Brady
2005/0268320 A1 12/2005 Smith
2005/0270373 A1 12/2005 Trela
2005/0273823 A1 12/2005 Brady et al.
2005/0278753 A1 12/2005 Brady, Jr. et al.
2005/0278754 A1 12/2005 Bleacher et al.
2005/0281223 A1 12/2005 D'Annunzio
2006/0006287 A1 1/2006 Ferguson et al.
2006/0008256 A1 1/2006 Khedouri et al.
2006/0010438 A1 1/2006 Brady et al.
2006/0030311 A1 2/2006 Cruz et al.
2006/0032979 A1 2/2006 Mitchell et al.
2006/0040612 A1 2/2006 Min
2006/0040660 A1 2/2006 Cruz et al.
2006/0048196 A1 3/2006 Yau
2006/0088001 A1 4/2006 Reitmann et al.
2006/0107295 A1 5/2006 Margis et al.
2006/0143662 A1 6/2006 Easterling et al.
2006/0154601 A1 7/2006 Tewalt et al.
2006/0174285 A1 8/2006 Brady, Jr. et al.
2006/0183450 A1 8/2006 Cameron
2006/0187959 A1 8/2006 Kawaguchi et al.
2006/0197750 A1 9/2006 Kerr
2006/0212909 A1 9/2006 Girard et al.
2006/0217121 A1 9/2006 Soliman et al.
2006/0234700 A1 10/2006 Funderburk et al.
2006/0250947 A1 11/2006 Allen
2006/0264173 A1 11/2006 Gilbert
2006/0270373 A1 11/2006 So
2006/0270470 A1 11/2006 de La Chapelle et al.
2006/0276127 A1 12/2006 Cruz et al.
2006/0277589 A1 12/2006 Margis et al.
2006/0291803 A1 12/2006 Watson et al.
2006/0293190 A1 12/2006 Watson et al.
2007/0021117 A1 1/2007 McKenna et al.
2007/0022018 A1 1/2007 Suryanarayana et al.
2007/0025240 A1 2/2007 Snide
2007/0026795 A1 2/2007 de La Chapelle
2007/0042772 A1 2/2007 Salkini et al.
2007/0044126 A1 2/2007 Mitchell
2007/0060133 A1 3/2007 Spitzer et al.
2007/0130599 A1 6/2007 Monroe
2007/0155381 A1 7/2007 Alberth et al.
2007/0185977 A1 8/2007 Sato et al.
2007/0202802 A1 8/2007 Kallio et al.
2007/0213009 A1 9/2007 Higashida et al.
2007/0258417 A1 11/2007 Harvey et al.
2007/0296273 A1 12/2007 Reitmann et al.
2007/0298741 A1 12/2007 Harnist et al.
2008/0004016 A1 1/2008 Smee et al.
2008/0023600 A1 1/2008 Perlman
2008/0040756 A1 2/2008 Perlman
2008/0084882 A1 4/2008 Eruchimovitch
2008/0085691 A1 4/2008 Harvey et al.
2008/0090567 A1 4/2008 Gilbert
2008/0124054 A1 5/2008 Bonar
2008/0125112 A1 5/2008 Clarke et al.
2008/0127278 A1 5/2008 Bonar
2008/0130539 A1 6/2008 Lauer et al.
2008/0132212 A1 6/2008 Lemond et al.
2008/0133705 A1 6/2008 Lemond et al.
2008/0141314 A1 6/2008 Lemond et al.
2008/0181169 A1 7/2008 Lauer et al.
2008/0182573 A1 7/2008 Lauer et al.
2008/0274734 A1 11/2008 Kostanic et al.
2008/0299965 A1 12/2008 Lagerman
2008/0305762 A1 12/2008 Malosh
2009/0007193 A1 1/2009 Correa et al.
2009/0010200 A1 1/2009 Lauer et al.
2009/0042651 A1 2/2009 Prabhu et al.
2009/0077595 A1 3/2009 Sizelove et al.
2009/0083805 A1 3/2009 Sizelove et al.
2011/0254371 A1* 10/2011 Galsim et al. .................... 307/39
2012/0235622 A1* 9/2012 Welchko et al. .............. 318/722

FOREIGN PATENT DOCUMENTS

EP 0 577 054 A1 1/1994
EP 0 767 594 A2 9/1997
EP 0 890 907 A1 1/1999
EP 0 930 513 A2 7/1999
EP 1 231 534 A1 8/2002
EP 1 217 833 A2 6/2003
EP 1 217 833 A3 4/2004
JP H06-285259 A 10/1994
JP H09-512401 A 11/1995
JP 2003-534959 A 4/2000
JP 2002-77084 A 3/2002
JP 2003-140804 A 5/2003
JP 2004-343744 A 12/2004
JP 2005-045490 A 2/2005
JP 2005-508098 A 3/2005
JP 2005-528030 A 9/2005
JP 2006-527540 A 11/2006
WO WO 99/14655 A1 3/1999
WO WO 99/31821 A1 6/1999
WO WO 02/15582 A1 2/2002
WO WO 02/084971 A2 10/2002
WO WO 03/024110 A1 3/2003
WO WO 03/032503 A2 4/2003
WO WO 03/050000 A1 6/2003
WO WO 03/024085 A2 8/2003
WO WO 2004/003696 A2 1/2004
WO WO 2004/008277 A2 1/2004
WO WO 2005/086865 A2 9/2005
WO 2005/120068 A3 12/2005
WO WO 2005/125207 A2 12/2005
WO WO 2006/052941 A1 5/2006

| | | | |
|---|---|---|---|
| WO | WO 2006/062641 | A2 | 6/2006 |
| WO | WO 2006/065381 | A2 | 6/2006 |
| WO | WO 2007/035739 | A2 | 3/2007 |

OTHER PUBLICATIONS

International Search Report, PCT/US2010/060344, Jun. 11, 2012

Office Action, Appl. No. 200880107132.7, Jul. 22, 2011.

Chen, Y.F. et al., "Personalized Multimedia Services Using a Mobile Service Platform", IEEE 2002, pp. 918-925.

Gratschew, S., Raitaniemi, J.; Ylinen, J.; Loula, P: "A Multimedia Messaging Platform For Content Delivering," Telecommunications, 2003, ICT 2003, 10th International Conference on Online! vol. 1, Feb. 23, 2003, pp. 431-435.

Ibenthal, A., et al.,"Multimedia im Fahrzeug: Dienste und Technik", Fernseh und Kino-Technik 54, Jahrgang Nr. Mar. 2000, pp. 100-105.

Kartalopoulos, S.V.: "Consumer Communications in the Next Generation Access Network" Consumer Communications and Networking Conference, 2004. CCNC 2004. First IEEE Las Vegas, NV, USA Jan. 5-8, 2004, Piscataway, NJ, pp. 273-278.

Farries, M. et al: "Optical Branching Devices For Avionic Passive Optical Network" Avionics, Fiber-Optics and Photonics Technology Conference, 2007 IEEE, IEEE, PI, Oct. 1, 2007, pp. 76-77.

CN 200880117151.8 Office Action with English translation, Aug. 24, 2012.

JP 2010-527121 Office Action with English translation, Jul. 12, 2012.

Office Action, CN Appln No. 200880115267.8, Dec. 24, 2012.

Office Action, JP Appln No. 2010-525047, Dec. 25, 2012.

Office Action, JP Appln No. 2010-525045, Mar. 5, 2013.

Office Action, JP Appln No. 2010-525046, Mar. 5, 2013.

Office Action, JP Appln No. 20880107089.4, Mar. 7, 2013.

* cited by examiner

| |
|---|
| FIG. 5B-1 |
| FIG. 5B-2 |

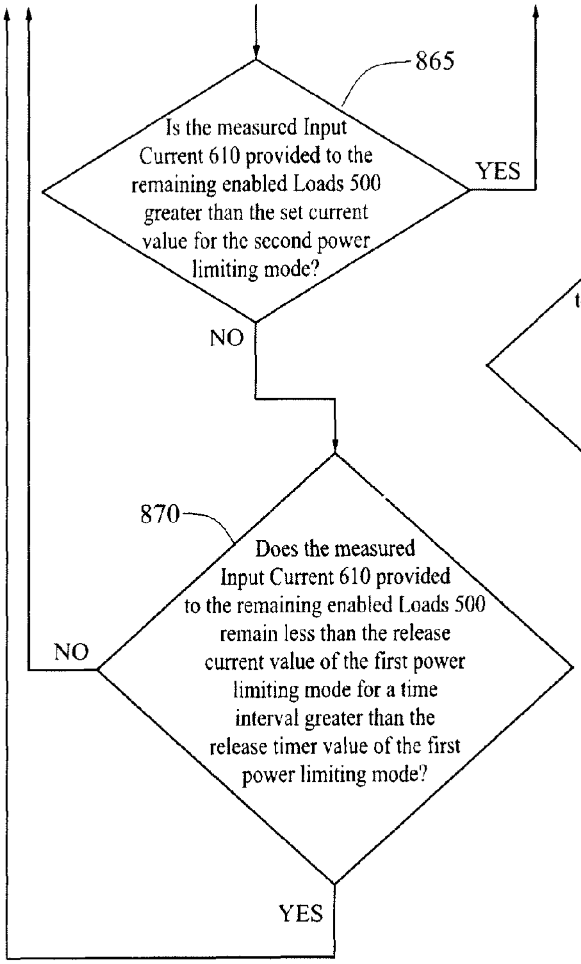
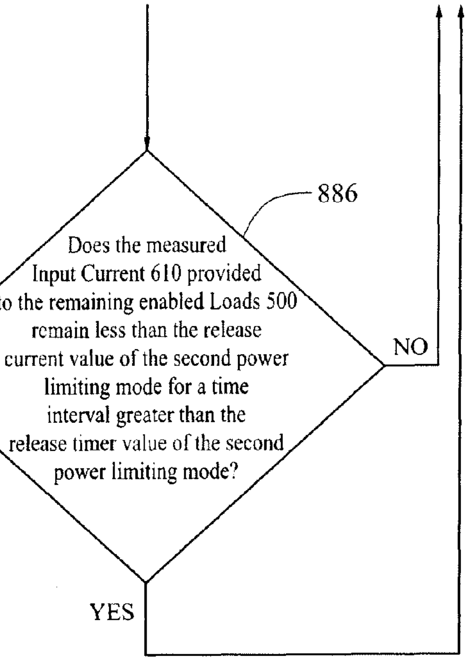
FIG. 13-2
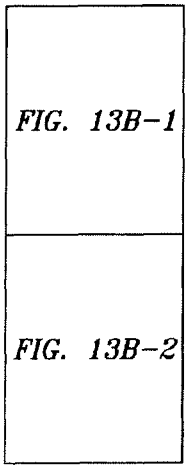
FIG. 13

Exemplary Current Meter 210 for a Selected Power Source 200

Exemplary Current Meter 220 for a Selected Power Junction System 320

FIG. 21A
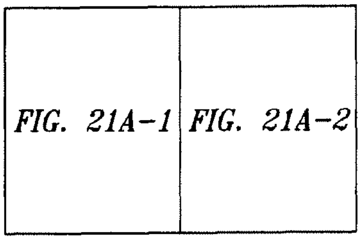
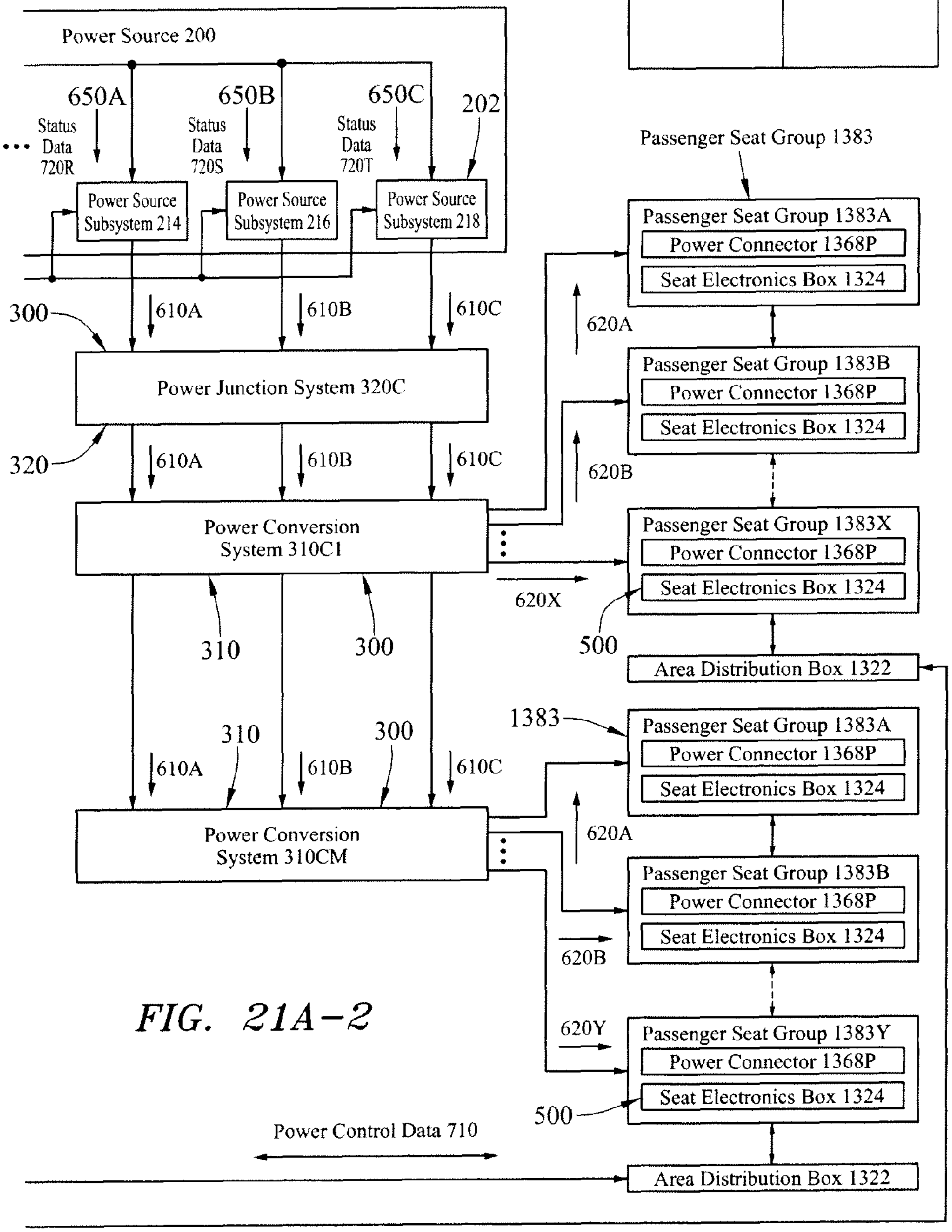
FIG. 21A-2

SYSTEM AND METHOD FOR PROVIDING DYNAMIC POWER MANAGEMENT

CROSS-REFERENCE TO RELATED APPLICATIONS

This application claims priority to U.S. provisional patent application Ser. No. 61/286,343, filed Dec. 14, 2009. Priority to the provisional patent application is expressly claimed, and the disclosure of the provisional application is hereby incorporated herein by reference in its entirety and for all purposes.

FIELD

The disclosed embodiments relate generally to power management systems and more particularly, but not exclusively, to dynamic power management systems suitable for use with information systems installed aboard passenger vehicles.

BACKGROUND

Passenger vehicles, such as automobiles and aircraft, often provide information systems to satisfy passenger demand for viewing content during travel.

Conventional passenger information systems include overhead cabin viewing systems and/or seatback viewing systems with individual controls for presenting selected viewing content. The viewing content typically includes entertainment content, such as audio and/or video materials, and can be derived from a variety of content sources. For instance, prerecorded viewing content, such as motion pictures and music, can be provided by internal content sources, such as audio and video systems, that are installed within the vehicle. External content sources likewise can transmit viewing content, including satellite television or radio programming and Internet content, to the vehicle via wireless communication systems.

These information systems typically must be designed to operate under strict power, weight, and other restrictions when installed aboard the passenger vehicle. In aircraft applications, for example, the trend in modern commercial aircraft designs is to move toward incorporating smaller power generator models in order to improve aircraft flight performance and operational characteristics. The smaller power generator models, however, have reduced power capacity, further limiting the amount of power that can be appropriated for use throughout the passenger cabin. Despite being subjected to increasingly severe power restrictions, the in-flight entertainment industry recently reported an exponential increase in passenger power usage with the introduction of personal electronic (or media) device (PED) power sources as well as a number of commercial off-the-shelf (COTS) technologies, such as Universal Serial Bus (USB) and laptop connectivity at the passenger seat.

Increased power usage, coupled with demand for high-performance information systems and reduced power availability, has created a condition within the commercial aircraft cabin that demands intervention. Currently-available commercial power control architectures typically utilize a plurality of master control units and a tri-state unidirectional signal at the column level to manage PED power only. Such management architectures, however, are crude, indiscriminant, and incapable of managing PED power at the passenger seat level. These management architectures likewise do not provide control over other equipment within the passenger cabin. Being provided as stand-alone systems, these conventional management architectures are intrusive and fail to manage global power distribution within the passenger cabin.

In view of the foregoing, a need exists for an improved system and method for providing power management to optimize the distribution of power and its usage within a passenger cabin that overcomes the aforementioned obstacles and deficiencies of currently-available power management architectures.

Figure 1:
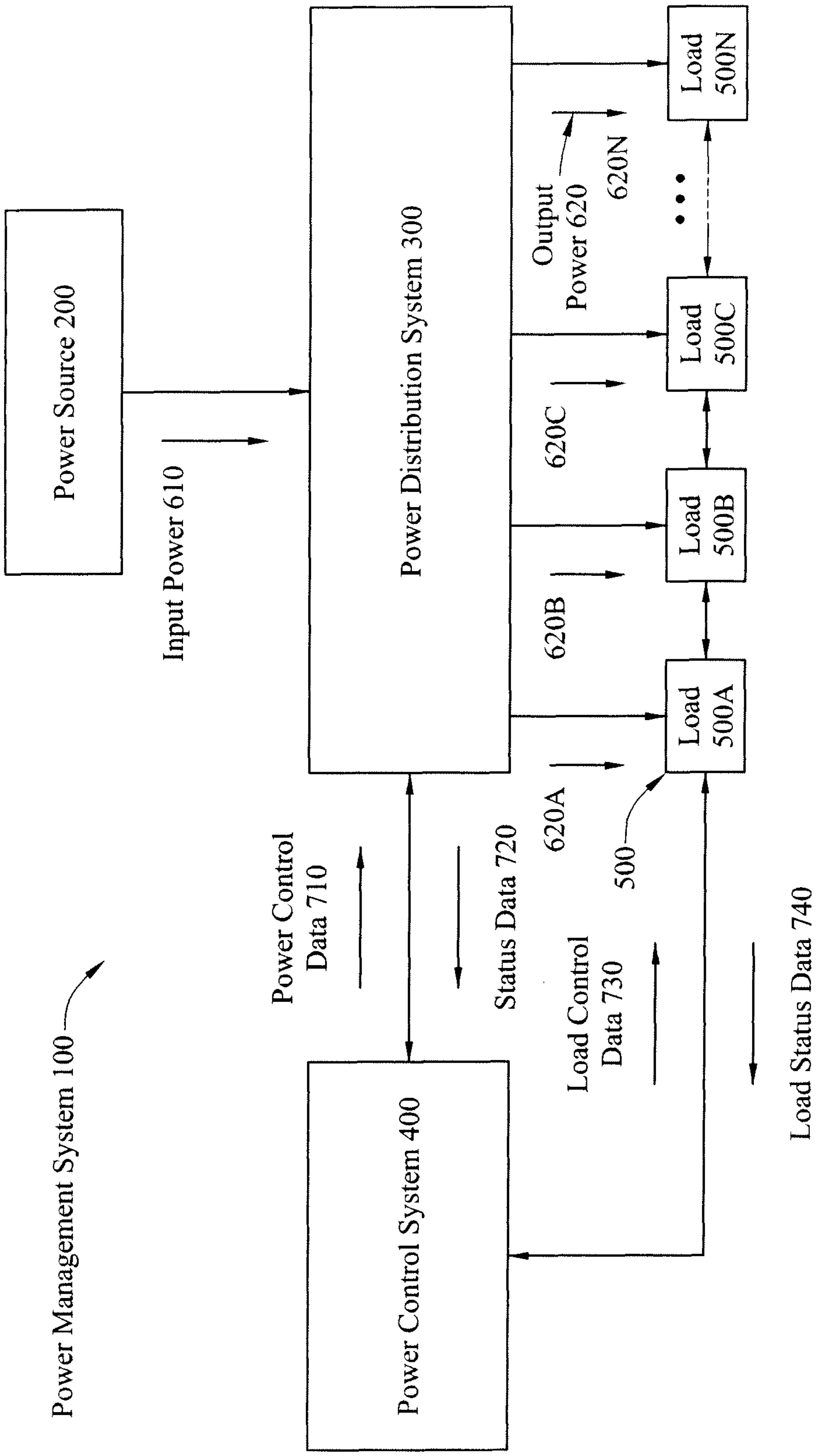
FIG. 1 is an exemplary top-level block diagram illustrating an embodiment of a power management system suitable for dynamically optimizing power distribution and usage among a plurality of loads.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available power control architectures are incapable of providing global power distribution management for high-performance information systems, a power management system and method that optimizes power distribution and usage despite reduced power availability and increase power usage can prove desirable and provide a basis for a wide range of system applications, such as vehicle information systems for use aboard automobiles, aircraft, and other types of vehicles during travel. This result can be achieved, according to one embodiment disclosed herein, by a power management system 100 as illustrated in FIG. 1.

Turning to FIG. 1, the power management system 100 is shown as including at least one power source 200 that can be coupled with one or more loads 500 via a power distribution system 300. Stated somewhat differently, the power management system 100 can comprise a network of power sources 200 that support distribution of power throughout the power distribution system 300. The power source 200 can comprise a conventional power source for providing input power 610 to the power distribution system 300. The input power 610 can include direct current (DC) power and/or alternating current (AC) power each having any suitable voltage value and/or current value. If provided as alternating current power, the input power 610 can be provided at any conventional power frequency and with any conventional number of power phases as desired. Exemplary power phases for the alternating current power can include single-phase alternating current power and/or three-phase alternating current power; whereas, illustrative power frequencies can include fifty hertz, sixty hertz, and/or four hundred hertz. The total input power 610 available from the power source 200 typically is limited by a maximum power rating (and/or power budget) of the power source 200.

The power distribution system 300 receives the input power 610 from the power source 200 and distributes the input power 610 among the loads 500. In other words, the power distribution system 300 provides the input power 610 to the loads 500 as output power 620. Comprising conventional power loads, the loads 500 can receive the output power 620 from the power distribution system 300 and thereby can perform at least one load function associated with each respective load 500. In the manner discussed in more detail above with reference to the input power 610, the output power 620 can include direct current (DC) power and/or alternating current (AC) power each having any suitable voltage value, current value, power frequency, and/or number of power phases. The output power 620 provided to (and/or drawn by) each load 500 typically is established by a nominal (and/or maximum) power rating (and/or power budget) for the relevant load 500, and a sum of the total output power 620 provided to the loads 500 preferably does not exceed the maximum power rating of the power source 200 at any give time.

As illustrated in FIG. 1, for example, the power distribution system 300 can provide output power 620A-N to respective loads 500A-N that are associated with the power management system 100. The output power 620A-N can be uniform and/or different among the loads 500A-N. Stated somewhat differently, the voltage value, current value, power frequency, and/or number of power phases of a first output power 620A can be the same as the voltage value, current value, power frequency, and/or number of power phases of a second output power 620B and different from the voltage value, current value, power frequency, and/or number of power phases of a third output power 620C. The power distribution system 300 thereby can include one or more power conversion systems 310 (shown in FIGS. 11A-B) for converting the input power 610 into each of the output power 620A-N. Exemplary types of power conversion systems 310 can include a step-down transformer, a step-up transformer, a DC-to-DC voltage converter, a power filter, a power frequency converter, a voltage rectifier, and/or a voltage regulator, without limitation. As desired, a selected power conversion system 310 can be integrated with the power source 200 and/or can be disposed at any suitable location within the power distribution system 300.

FIG. 1 illustrates that a predetermined number of loads 500 can be coupled with the power distribution system 300. The predetermined number can comprise any suitable number of loads 500 and, for example, can be based upon a selected system application. In a preferred embodiment, the power distribution system 300 can support a variable number of loads 500. In other words, at least one of the loads 500 can be removably coupled with the power distribution system 300. One or more selected loads 500 thereby can be decoupled from the power distribution system 300, and/or at least one additional load 500 can be coupled with the power distribution system 300, as desired. The power distribution system 300, for example, can include at least one power connector (or port) 1368P (shown in FIG. 9B), such as a conventional electrical power outlet, for coupling a selected load with the power distribution system 300. A current load 500 that is presently coupled with a selected power connector 1368P can draw an output power 620 that is the same as, and/or different from, the output power 620 drawn by a prior load 500 that was previously coupled with the selected power connector 1368P.

The loads 500 coupled with the power distribution system 300 likewise can be activated and/or deactivated over time as desired. In other words, at least one load 500 can continuously draw output power 620; whereas, one or more other loads 500 can draw output power 620 (and/or additional output power 620) intermittently. For example, the other loads 500 can draw output power 620 on a periodic basis and/or on an as-needed basis. The output power 620 provided by the power distribution system 300 thereby can dynamically change as predetermined number, respective power ratings (and/or power budgets), and/or respective operational statuses of the loads 500 each vary with time. Accordingly, the input power 610 provided by the power source 200 likewise can dynamically change.

The power source 200 typically includes limited capabilities with respect to the management of power. To help manage the dynamic changes in the input power 610 and/or the output power 620, the power management system 100 can include a power control system 400 for allocating the input power 610 from the power source 200 among the loads 500. The power control system 400 is shown as receiving status data 720 from the power distribution system 300. The status data 720 can include real-time information regarding the operational status of the power source 200 and/or the loads 500. Exemplary operational status information for the power source 200 can include at least one present voltage and/or current value of the input power 610 and/or the maximum power rating (and/or power budget) of the power source 200; whereas, the predetermined number of loads 500 presently coupled with the power distribution system 300, the respective power ratings (and/or power budgets) of the loads 500, and/or the present voltage and/or current value of the output power 620 provided to each load 500 can comprises illustrative operational status information regarding the loads 500.

Advantageously, the power control system 400 can apply the status data 720 to generate power control data 710. The power control data 710 can include information for allocating the input power 610 among the loads 500 in a dynamic manner to account for the dynamic changes in the input power 610 and/or the output power 620. The power control system 400 is shown as providing the power control data 710 to the power distribution system 300. Thereby, the power distribution system 300 can provide the output power 620 to the loads 500 in accordance with the power control data 710. Although as shown and described as communicating with the power distribution system 300 for purposes of illustration only, the power control system 400 can communicate with the power source 200 and/or the loads 500 in any conventional direct and/or indirect manner without limitation.

For example, the power control system 400 can exchange the power control data 710 and/or the status data 720 with the power source 200 and/or the loads 500 and/or indirectly via one or more intermediate system components. Additionally, and/or alternatively, the power management system 100 can provide a first direct communication link (not shown) between the power control system 400 and at least one selected load 500 and/or a second direct communication link (not shown) between two (or more) selected loads 500. The first direct communication link can enable the power control system 400 to exchange the power control data 710 and/or the status data 720 directly with the selected load 500; whereas, the second direct communication link can permit the power control data 710 and/or the status data 720 to be exchanged between the two selected loads 500.

In one exemplary situation, for instance, the aggregate power rating of the loads 500 coupled with the power distribution system 300 may exceed the maximum power rating of the power source 200. In other words, a sum of the total output power 620 demanded by the loads 500, if activated, can exceed the maximum input power 610 available from the power source 200. Although the power source 200 may be designed to temporarily withstand such an overpower condition, the power source 200 typically cannot sustain the overpower condition indefinitely. The power control system 400 therefore can sense the operational status of the power management system 100, including any overpower condition or other undesired power condition, in real time by monitoring the status data 720 received from the power distribution system 300 and, as needed, provide the control power data 710 for dynamically resolving the undesired power condition. As desired, the power control system 400 can attempt to resolve the undesired power condition in any conventional manner, including at least temporarily limiting (and/or suspending) the output power 620 provided to one or more selected loads 500 or otherwise disabling the selected loads 500.

Alternatively, and/or additionally, the power control system 400 can allocate the input power 610 from the power source 200 among the loads 500 based upon communication with one or more of the loads 500. The power control system 400, in other words, can communicate with the power distribution system 300, at least one load 500, or both in order to allocate the input power 610. The power control system 400 can communicate with the loads 500 in any conventional manner, including direct and/or indirect communications with each load 500, in the manner set forth above with reference to communications between the power control system 400 and the power distribution system 300. As illustrated in FIG. 1, for example, the power control system 400 can communicate with the loads 500 in a series (and/or daisy-chain) load configuration. The loads 500 likewise can communicate with the power control system 400 via the power distribution system 300 as desired. The communication between the power control system 400 and each load 500 can comprise unidirectional and/or bidirectional communications of any kind.

The power control system 400 is shown as receiving load status data 740 from each of the loads 500. The load status data 740 can include real-time information regarding the operational status of the loads 500. In the manner set forth above, exemplary operational status information regarding the loads 500 can include the predetermined number of loads 500 presently coupled with the power distribution system 300, the respective power ratings (and/or power budgets) of the loads 500, and/or the present voltage and/or current value of the output power 620 provided to each load 500. The power control system 400 can collect the load status data 740 from the loads 500 and can apply the load status data 740 to generate load control data 730, which can be provided to the loads 500. In other words, the power control system 400 and the loads 500 exchange the load status data 740 and the load control data 730. The load control data 730 can be provided to each load 500 and/or to one or more relevant loads 500 to which the load control data 730 is applicable.

As discussed in more detail above, the load control data 730 can include information for allocating the input power 610 among the loads 500 in a dynamic manner to account for the dynamic changes in the input power 610 and/or the output power 620. The power control system 400 provides the load control data 730 to the loads 500. Load 500A is shown as receiving the load control data 730 directly from the power control system 400 and as relaying the load control data 730 to load 500B. Load 500B, in turn, can provide the load control data 730 to load 500C and so on until the load control data 730 is transmitted to the last load 500N. Thereby, the loads 500 can adjust consumption of the output power 620 in accordance with the load control data 730.

Figure 2:
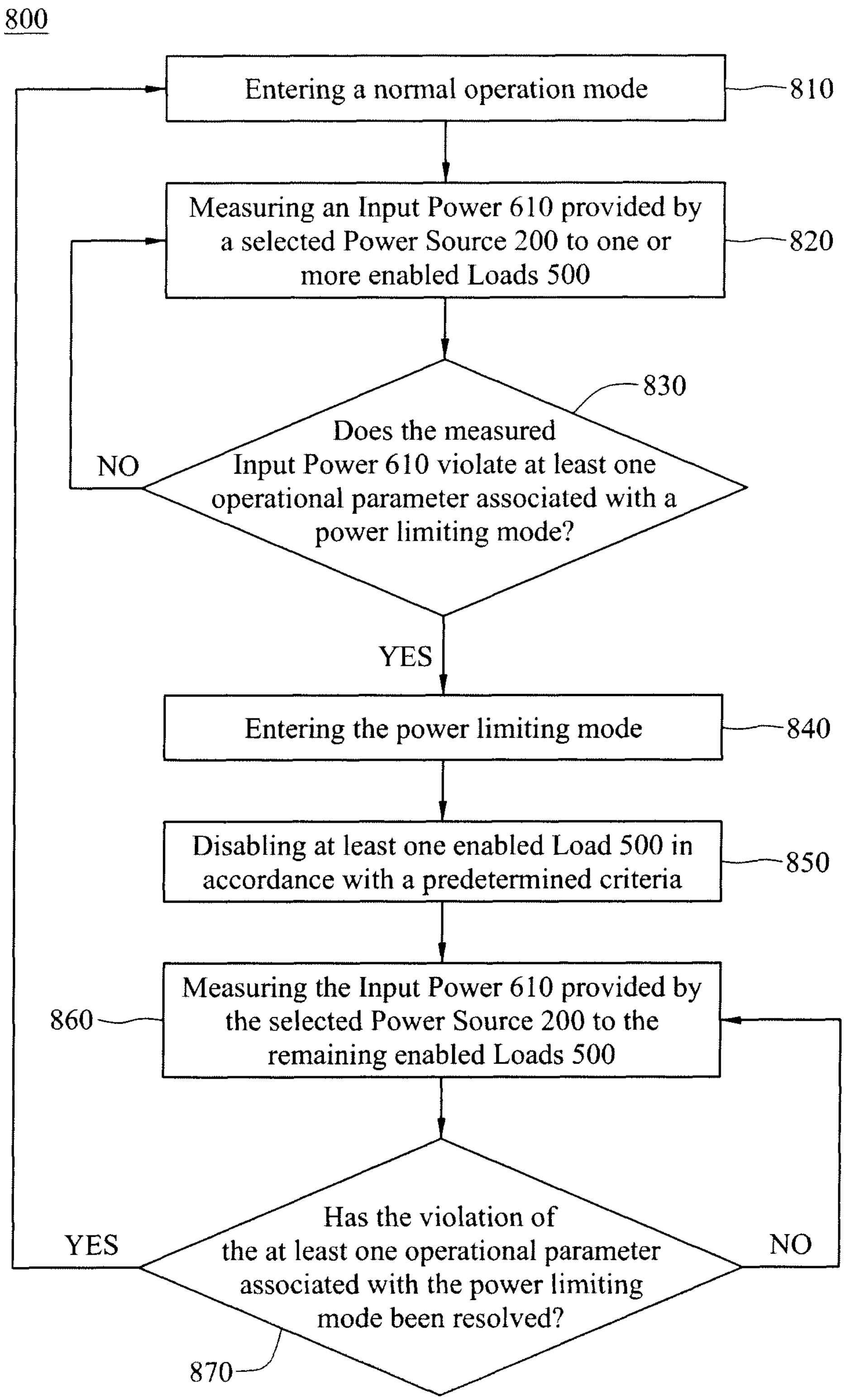
FIG. 2 is an exemplary top-level flow diagram illustrating an embodiment of a power management method for dynamically allocating power provided by a selected power source among the loads of FIG. 1, wherein the method supports a power limiting mode for resolving undesired power conditions.

An illustrative power management method 800 for resolving the undesired power condition is illustrated in FIG. 2. Turning to FIG. 2, the power management method 800 can dynamically allocate power provided by a selected power source 200 (shown in FIG. 1) among one or more loads 500 (shown in FIG. 1) and supports a power limiting mode for resolving the undesired power conditions. The method 800 is shown as including, at 810, entering a normal operation mode. In the normal operation mode, the selected power source 200 can be associated with a plurality of loads 500 in the manner set forth in more detail above with reference to FIG. 1. A predetermined number of the loads 500 can be enabled to receive input power 610 from the selected power source 200. In other words, the enabled loads 500, once enabled, are permitted to receive the input power 610 from the selected power source 200; whereas, any load 500 that is not enabled can be inhibited from receiving the input power 610.

The enabled loads 500 can comprise all or a selected portion of the loads 500 associated with the power source 200. As desired, the selection of loads 500 that are enabled can dynamically vary over time. Stated somewhat differently, a selected load 500 that is enabled can be subsequently disabled; whereas, a disabled load 500 can be later enabled. While enabled, the enabled loads 500 are available to perform the associated load functions and can receive power in accordance with the respective power ratings of the enabled loads 500.

As desired, the enabled loads 500 can be associated with a plurality of load classes. Some enabled loads 500, for example, can belong to a first load class, wherein the enabled loads 500 require activation prior to receiving the input power 610 from the selected power source 200. Each enabled load 500 within the first load class can be independently activated and/or deactivated, which can effect a level of input power 610 provided by the power source 200. When activated, the enabled load 500 can be available to perform any associated load function and thereby can receive the input power 610. The level of input power 610 drawn by a selected enabled load 500 can depend upon the nature of the relevant load function.

The enabled load 500, when deactivated, enters a low-power (or sleep) state and preferably draws a nominal amount, if any, of the input power 610 from the selected power source 200. The amount of the input power 610 drawn by the enabled load 500, once deactivated, typically is less than the amount of the input power 610 drawn by the enabled load 500 when activated. Each enabled load 500 within a second load class can be available to perform any associated load function and receive the input power 610 upon being enabled. Since the number of enabled loads 500 and/or activated loads 500 can dynamically change over time, the input power 610 drawn from the power source 200 likewise can dynamically change. Further, as more enabled loads 500 become activated, the input power 610 can increase and approach the maximum power rating of the power source 200.

The power management method 800 of FIG. 2, at 820, can include measuring the input power 610 provided by the selected power source 200 to the enabled loads 500. The input power 610 can be measured at any suitable node within the power distribution system 300 (shown in FIG. 1) as desired. For example, input power 610 can be measured adjacent to the power source 200 and/or can comprise a sum of the output power 620 as measured adjacent to the loads 500. Alternatively, and/or additionally, the power source 200 likewise can provide measurement information and other operational information regarding the input power 610, and/or the loads 500 can provide measurement information and other operational information regarding the output power 620. Since the input power 610 drawn from the power source 200 can dynamically change over time, the input power 610 preferably is measured continuously. An operational status of the selected power source 200 thereby can be sensed and/or monitored in real time.

The measured input power 610 can be compared, at 830, with at least one operational parameter associated with a power limiting mode. The operational parameters can be determined in any suitable manner and preferably are based at least in part upon the power rating of the power source 200. As desired, the operational parameters can comprise static values and/or dynamic values that can change over time based, for example, upon variation in the predetermined number of the enabled loads 500, the number of enabled loads that are activated, and/or the power ratings of the enabled loads 500. If the measured input power 610 does not violate the operational parameter associated with the power limiting mode, the normal operation mode can be maintained, and the input power 610 provided by the selected power source 200 to the enabled loads 500 can again be measured, at 820.

If the measured input power 610 violates the operational parameter, the power limiting mode can be entered, at 840. In the power limiting mode, at least one of the enabled loads 500 can be disabled, at 850, in accordance with one or more predetermined criteria. Preferably, the enabled loads 500 to be disabled include enabled loads 500 within the first load class, and the disabling of the enabled loads 500, at 850, comprises placing the enabled loads 500 within the first load class into the deactivated mode. The enabled loads 500 to be disabled likewise can include one or more enabled loads 500 within other load class as desired. The predetermined criteria can comprise any suitable criteria for selecting the enabled loads 500 to be disabled and can be based on any preselected number of factors. Illustrative factors can include a load type, a load class, a load power rating, a physical load location, and/or any other load characteristic of each enabled load 500.

After one or more of the enabled loads 500 has been disabled, the input power 610 provided by the selected power source 200 to the remaining enabled loads 500 can be measured, at 860. The measurement of the input power 610, at 860, can be performed in the manner set forth in more detail above, at 820, by which the input power 610 provided to the enabled loads 500 can be measured. The resultant measured input power 610 can be compared, at 870, with the operational parameter associated with a power limiting mode in the manner discussed in more detail above with reference to the comparison, at 830.

If the resultant measured input power 610 violates the operational parameter, the power limiting mode can be maintained, and the input power 610 provided by the selected power source 200 to the remaining enabled loads 500 can again be measured, at 860. As desired, the one or more additional enabled loads 500 can be disabled, at 850, in accordance with the predetermined criteria if the resultant measured input power 610 continues to violate the operational parameter. If the resultant measured input power 610 resolves the violation of the operational parameter, the normal operation mode can be re-entered, at 810, wherein a predetermined number of the loads 500 can be enabled to receive input power 610 from the selected power source 200 in the manner discussed above. The power management method 800 thereby comprises a dynamic method for attempting to resolve undesired power conditions.

Figure 3:
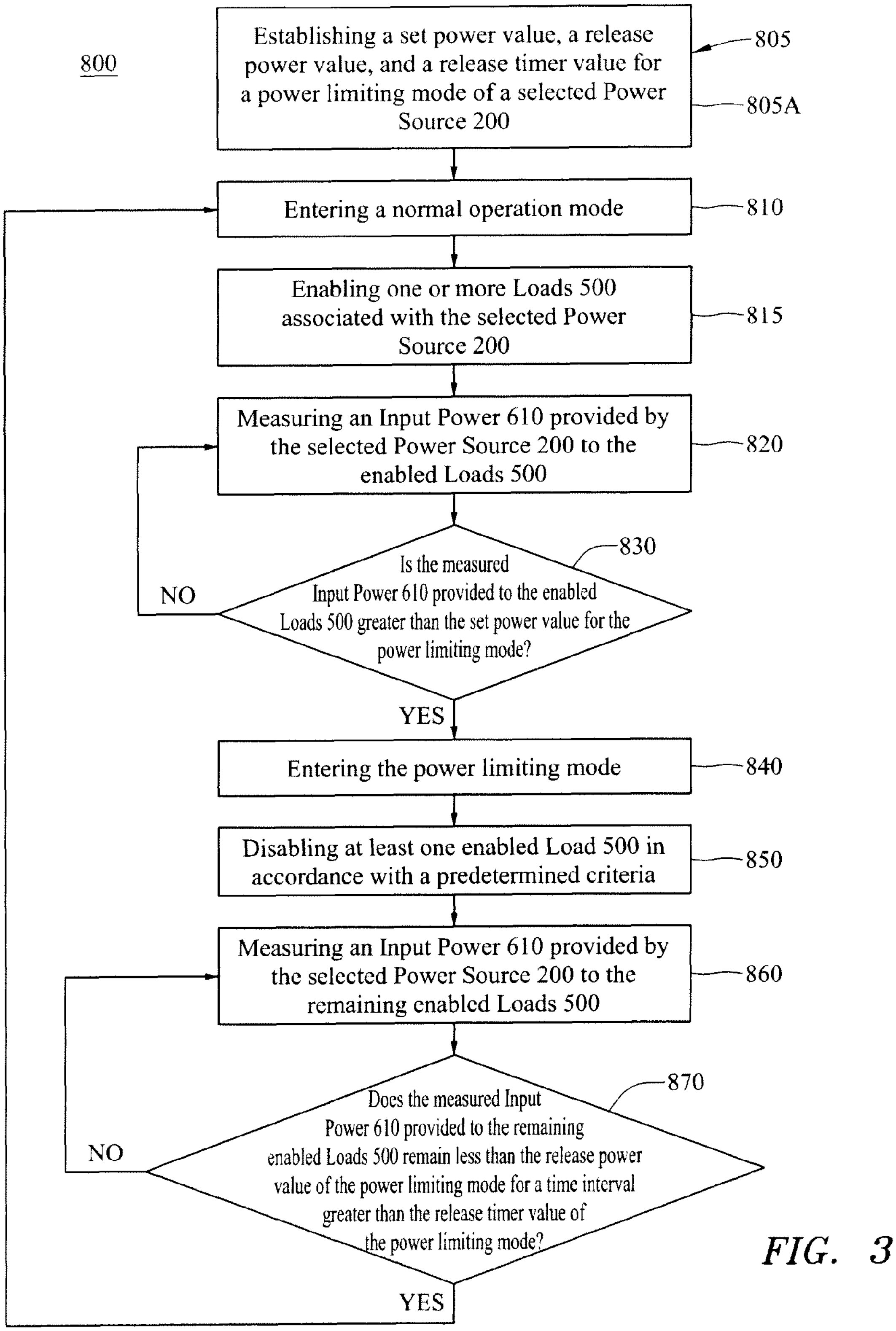
FIG. 3 is an exemplary flow chart illustrating an alternative embodiment of the power management method of FIG. 2, wherein the power limiting mode includes disabling at least one enabled load in accordance with one or more predetermined criteria.

One preferred embodiment of the power management method 800 is shown in FIG. 3. Selected processes within the method 800 of FIG. 3 are represented by reference designators that are common to the reference designators associated with selected processes within the power management method 800 of FIG. 2. The use of common reference designators within the power management methods 800 is intended to represent that the associated processes can comprise equivalent processes. Turning to FIG. 3, the power management method 800 is illustrated as including, at 805, establishing the one or more operational parameters associated with the power limiting mode. The operational parameters are discussed in more detail above with reference to FIG. 2, at 830. As shown in FIG. 3, the selected operational parameters for the power limiting mode, at 805A, can include a set power value, a release power value, and/or a release timer value.

The set power value can comprise a predetermined power level, wherein the power limiting mode can be entered if the input power 610 provided by the power source 200 is greater than the set power value. As desired, the set power value can be established as a preselected percentage (and/or a preselected percentage range) of the maximum power rating of the power source 200. Exemplary preselected percentage ranges can include between fifty percent (50%) and one hundred percent (100%) of the maximum power rating of the power source 200, including any percentage sub-ranges, such as a five percent sub-range (i.e., between sixty-five percent (65%) and seventy percent (70%)) and/or a ten percent sub-range (i.e., between sixty percent (60%) and seventy percent (70%)), within the preselected percentage range, without limitation. The set power value can comprised a power value that is fixed and/or that can dynamically change over time to, for example, adapt to changing system conditions, such as a increasing and/or decreasing amount of input power 610 being drawn from the power source 200 as system load conditions change such as by one or more loads 500 being added, removed, activated, deactivated, etc.

Similarly, the release power value can comprise a second predetermined power level, wherein the power limiting mode is maintained as long as the input power 610 provided by the power source 200 remains greater than the release power value. The release power value can be established as a second preselected percentage (and/or a second preselected percentage range) of the maximum power rating of the power source 200 and preferably comprises a power level that is less than the predetermined power level established for the set power value. Exemplary preselected percentage ranges can include between fifty percent (50%) and one hundred percent (100%) of the maximum power rating of the power source 200, including any percentage sub-ranges, such as a five percent sub-range (i.e., between sixty-five percent (65%) and seventy percent (70%)) and/or a ten percent sub-range (i.e., between sixty percent (60%) and seventy percent (70%)), within the preselected percentage range, without limitation.

Alternatively, and/or additionally, the release power value can be established as a power value that is offset from the set power value. In other words, the release power value can be established as being equal to the predetermined power level established for the set power value less a predetermined power offset value. The release power value can comprised a power value that is fixed and/or that can dynamically change over time to, for example, adapt to changing system conditions, such as a increasing and/or decreasing amount of input power 610 being drawn from the power source 200 as system load conditions change such as by one or more loads 500 being added, removed, activated, deactived, etc.

The release timer value can comprise any suitable non-negative value (and/or range of values) that represents a predetermined period of time. The release timer value, for example, can comprise a predetermined time period within a range between one second and five minutes, as desired. The release timer value can comprised a time interval that is fixed and/or that can dynamically change over time to, for example, adapt to changing system conditions, such as a increasing and/or decreasing amount of input power 610 being drawn from the power source 200 as system load conditions change such as by one or more loads 500 being added, removed, activated, deactived, etc.

Once entered, the power limiting mode can be maintained until the undesired power condition has been resolved. In one embodiment, the power limiting mode can be maintained until the input power 610 provided by the power source 200 remains less than the release power value for a time interval that is greater than the release timer value. If the input power 610 remains less than the release power value during the time interval, the power limiting mode can be exited, and the normal operation mode can be re-entered. Otherwise, the power limiting mode continues until the input power 610 can remain less than the release power value until the time interval has elapsed. As desired, the comparison terms "greater than" and "less than" as used herein can be construed to respectively comprise the comparison terms "greater than or equal to" and "less than or equal to."

Once the selected operational parameters for the power limiting mode have been established, the normal operation mode can be entered, at 810, in the manner set forth above with reference to FIG. 2. In the normal operation mode, one or more of the loads 500 associated with the power source 200 can be enabled, at 815. The enabled loads 500 can comprise all or a selected portion of the loads 500 associated with the power source 200, and the selection of loads 500 that are enabled, at 815, can dynamically vary over time in the manner set forth above with reference to FIG. 2. As desired, at least one of the enabled loads 500 can be independently deactivated and/or activated, which can effect a level of input power 610 provided by the power source 200. As a larger number of the enabled loads 500 becomes activated, the input power 610 can increase and approach the maximum power rating of the power source 200.

The power management method 800, at 820, includes measuring the input power 610 provided by the selected power source 200 to the enabled loads 500. The measurement of the input power 610, at 820, is discussed in more detail above with reference to the measurement, at 820, of FIG. 2. The measured input power 610 can be compared, at 830, with at least one operational parameter associated with a power limiting mode in the manner set forth above with reference to the comparison, at 830, of FIG. 2. As shown in FIG. 3, for example, the at least one operational parameter can include the set power value. Therefore, if the input power 610 provided by the power source 200 is less than the set power value, the normal operation mode can be maintained, and the input power 610 provided by the selected power source 200 to the enabled loads 500 can again be measured, at 820.

If the measured input power 610 is greater than the set power value, the power limiting mode can be entered, at 840. In the power limiting mode, at least one of the enabled loads 500 can be disabled, at 850, in accordance with the predetermined criteria in the manner set forth above with reference to FIG. 2. After one or more of the enabled loads 500 has been disabled, the input power 610 provided by the selected power source 200 to the remaining enabled loads 500 can be measured, at 860, and the resultant measured input power 610 can be compared, at 870, with the release power value. If the resultant measured input power 610 is greater than the release power value, the power limiting mode can be maintained, and the input power 610 provided by the selected power source 200 to the remaining enabled loads 500 can again be measured, at 860.

When the resultant measured input power 610 is less than the release power value, the normal operation mode can be re-entered, at 810, wherein a predetermined number of the loads 500 can be enabled to receive input power 610 from the selected power source 200 in the manner discussed above. The resultant measured input power 610 preferably is required to remain less than the release power value for at least a predetermined time interval before the normal operation mode can be re-entered. As illustrated in FIG. 3, the power limiting mode can be maintained until the input power 610 provided by the power source 200 remains less than the release power value for a time interval that is greater than the release timer value. If the input power 610 remains less than the release power value throughout the time interval, the power limiting mode can be exited, and the normal operation mode can be re-entered. Otherwise, the power limiting mode continues until the input power 610 can remain less than the release power value until the time interval has elapsed. The power management method 800 thereby comprises a dynamic method for attempting to resolve undesired power conditions.

Figure 4:
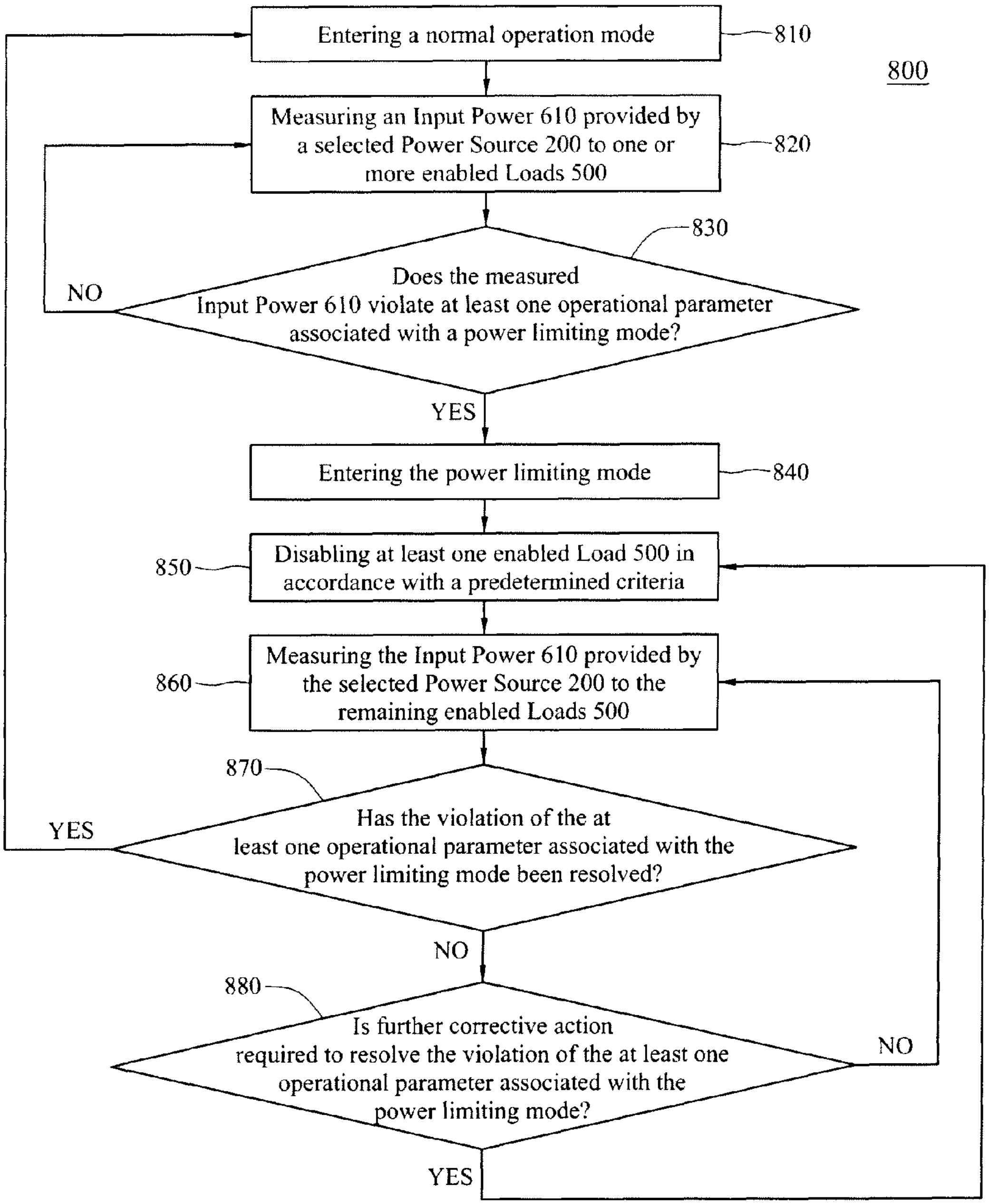
FIG. 4 is an exemplary top-level flow diagram illustrating another alternative embodiment of the power management method of FIG. 2, wherein the power limiting mode can provide further corrective action for resolving the undesired power conditions.

Turning to FIG. 4, the power management method 800 of FIG. 2 is illustrated as further comprising an optional process, at 880, wherein further corrective action can be provided for resolving the undesired power conditions. If the disabling of the at least one enabled loads 500, at 850, proves to be insufficient for resolving the violation of the operational parameter associated with the power limiting mode, the power management method 800 can include further corrective action, at 880, for resolving the undesired power conditions. The further corrective action can comprise any suitable process for further reducing the input power 610 provided by the selected power source 200. As illustrated in FIG. 4, for example, the further corrective action can include disabling at least one additional enabled load 500 in the manner set forth in more detail above with reference to the disabling, at 850, of FIG. 2. The previously-disabled load 500 and the additional enabled load 500 to be disabled can be associated with one or more uniform and/or different load characteristics, as desired.

FIG. 4 shows that the resultant measured input power 610 can be compared, at 870, with the operational parameter associated with a power limiting mode in the manner discussed in more detail above with reference to the comparison, at 830, of FIG. 2. If the resultant measured input power 610 resolves the violation of the operational parameter, the normal operation mode can be re-entered, at 810; otherwise, the power limiting mode can be maintained, and the further corrective action, at 880, for resolving the undesired power conditions can be required. The input power 610 provided by the selected power source 200 to the remaining enabled loads 500 can again be measured, at 860, if the further corrective action is not needed.

If the further corrective action is needed, the power limiting mode can be maintained, and at least one additional enabled load 500 can be disabled, at 850, in accordance with the predetermined criteria. The additional enabled load 500 can be disabled in the manner discussed in more detail above with reference to the disabling, at 850, of FIG. 2. The input power 610 provided by the selected power source 200 to the remaining enabled loads 500 then can again be measured, at 860, and a determination can be made, at 870, regarding whether the violation of the operational parameter associated with the power limiting mode has been resolved. The power management method 800 thereby can support a plurality of discrete power limiting modes. In other words, the power management method 800 can comprise an incremental and/or hierarchical process for providing power management for the selected power source 200.

Figure 5A:
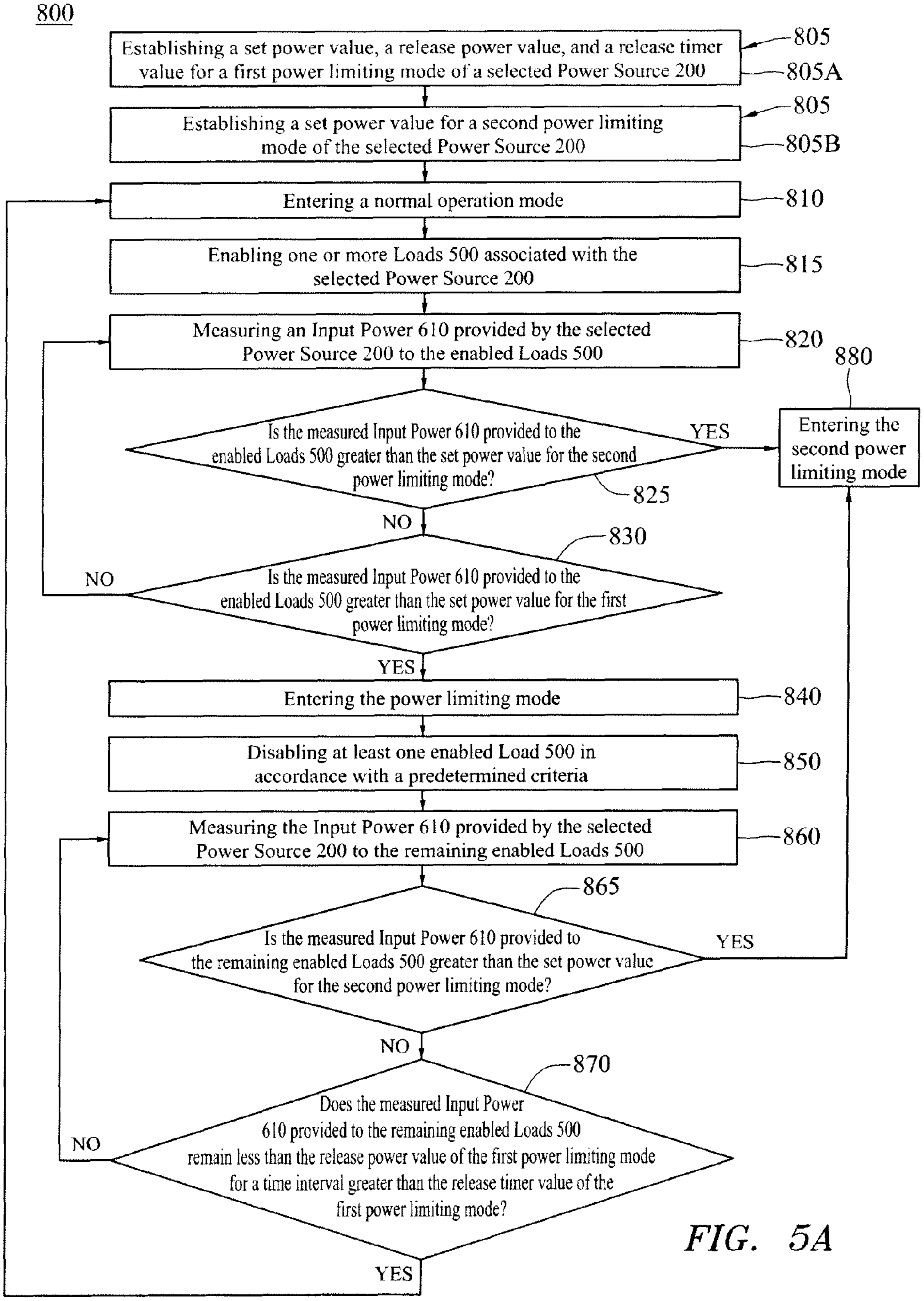
FIG. 5A is an exemplary flow chart illustrating an alternative embodiment of the power management method of FIG. 4, wherein the method supports a plurality of power limiting modes.
Figures 1, 5B:
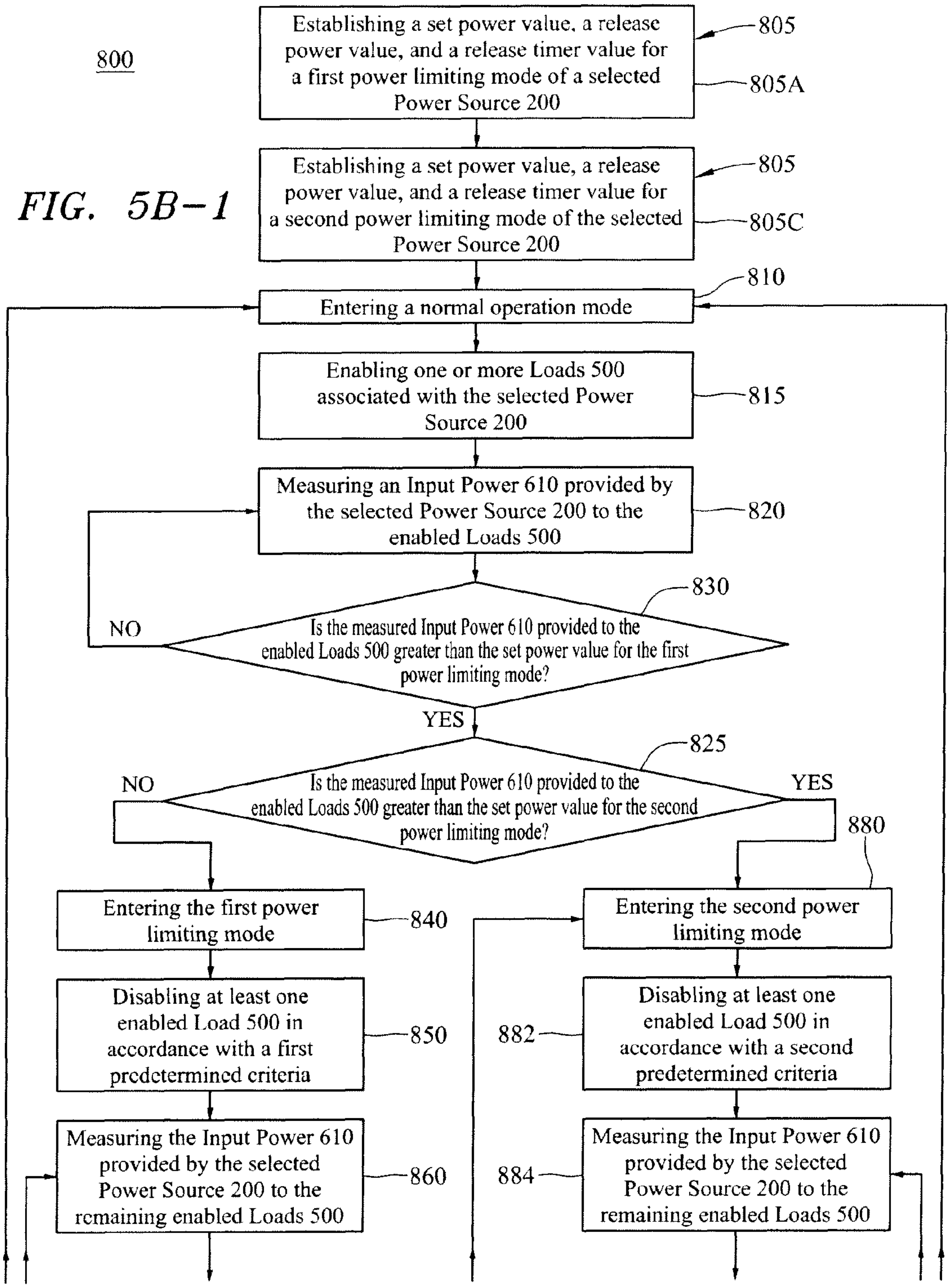
FIG. 5B is an exemplary top-level flow chart illustrating another alternative embodiment of the power management method of FIG. 4, wherein a second power limiting mode includes disabling at least one enabled load in accordance with one or more second predetermined criteria.
Figures 2, 5B:
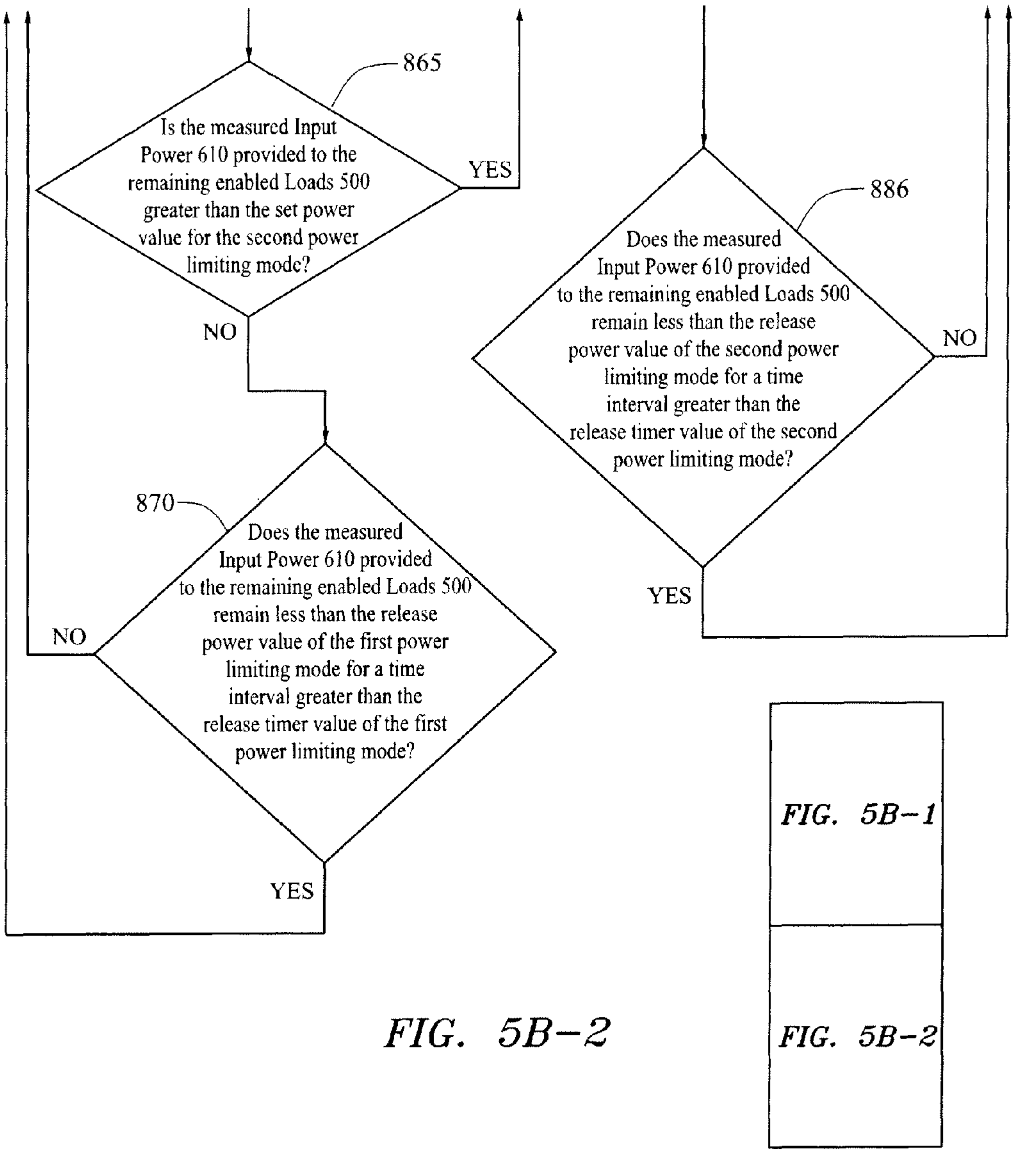

FIGS. 5A-B illustrate exemplary preferred embodiments of the incremental and/or hierarchical power management method 800 of FIG. 4. Although shown and described as comprising first and second power limiting modes for purposes of illustration only, the power management method 800 can include any suitable number of power limiting modes as desired. Alternatively, and/or additionally, selected processes within the method 800 of FIGS. 5A-B are represented by reference designators that are common to the reference designators associated with selected processes within the power management methods 800 of FIGS. 2-4. The use of common reference designators within the power management methods 800 is intended to represent that the associated processes can comprise equivalent processes.

Turning to FIG. 5A, the power management method 800 is shown as including, at 805, establishing the one or more operational parameters associated with each power limiting mode. In the manner set forth in more detail with reference to the establishing, at 805, of FIG. 3, the power management method 800 is shown as including establishing, at 805A, a set power value, a release power value, and/or a release timer value for the first power limiting mode and establishing, at 805B, a set power value for the second power limiting mode. The set power value for the second power limiting mode can be established in the manner discussed above with reference to the set power value for the first power limiting mode and preferably comprises a second predetermined power level that is greater than the predetermined power level associated with the set power value for the first power limiting mode.

Once the selected operational parameters have been established for each power limiting mode, the normal operation mode can be entered, at 810, in the manner set forth above with reference to FIG. 2. In the normal operation mode, one or more of the loads 500 associated with the power source 200 can be enabled, at 815. The enabled loads 500 can comprise all or a selected portion of the loads 500 associated with the power source 200, and the selection of loads 500 that are enabled, at 815, can dynamically vary over time in the manner set forth above with reference to FIG. 2. As desired, at least one of the enabled loads 500 can be independently deactivated and/or activated, which can effect a level of input power 610 provided by the power source 200. As a larger number of the enabled loads 500 becomes activated, the input power 610 can increase and approach the maximum power rating of the power source 200.

The power management method 800, at 820, includes measuring the input power 610 provided by the selected power source 200 to the enabled loads 500. The measurement of the input power 610, at 820, is discussed in more detail above with reference to the measurement, at 820, of FIG. 2. The measured input power 610 can be compared, at 825, with the established operational parameter associated with the second power limiting mode in the manner set forth above with reference to the comparison, at 830, of FIG. 2. As shown in FIG. 5A, for example, the established operational parameter can include the set power value for the second power limiting mode. If the input power 610 provided by the power source 200 is greater than the set power value for the second power limiting mode, the second power limiting mode can be entered, at 880, wherein the further corrective action can be provided for resolving the undesired power conditions.

Otherwise, if the input power 610 provided by the power source 200 is less than the set power value for the second power limiting mode, the normal operation mode can be maintained, and the input power 610 provided by the selected power source 200 can be compared, at 830, with at least one operational parameter associated with the first power limiting mode in the manner set forth above with reference to the comparison, at 830, of FIG. 2. As shown in FIG. 5A, for example, the established operational parameter can include the set power value for the first power limiting mode. Therefore, if the input power 610 provided by the power source 200 is less than the set power value for the first power limiting mode (and therefore less than the set power value for the second power limiting mode), the normal operation mode can be maintained, and the input power 610 provided by the selected power source 200 to the enabled loads 500 can again be measured, at 820.

If the measured input power 610 is greater than the set power value of the first power limiting mode (but less than the set power value of the second power limiting mode), the first power limiting mode can be entered, at 840. In the first power limiting mode, at least one of the enabled loads 500 can be disabled, at 850, in accordance with the predetermined criteria in the manner set forth above with reference to FIG. 2. After one or more of the enabled loads 500 has been disabled, the input power 610 provided by the selected power source 200 to the remaining enabled loads 500 can be measured, at 860, and the resultant measured input power 610 can be compared, at 865, with the established operational parameter associated with the second power limiting mode in the manner set forth above with reference to the comparison, at 825. As illustrated in FIG. 5A, the established operational parameter can include the set power value for the second power limiting mode.

If the input power 610 provided by the power source 200 is greater than the set power value for the second power limiting mode, the second power limiting mode can be entered, at 880, wherein the further corrective action can be provided for resolving the undesired power conditions. Otherwise, if the input power 610 provided by the power source 200 is less than the set power value for the second power limiting mode, the resultant measured input power 610 can be compared, at 870, with the release power value of the first power limiting mode. If the resultant measured input power 610 is greater than the release power value of the first power limiting mode (and less than the set power value for the second power limiting mode), the first power limiting mode can be maintained, and the input power 610 provided by the selected power source 200 to the remaining enabled loads 500 can again be measured, at 860.

When the resultant measured input power 610 is less than the release power value of the first power limiting mode (and therefore less than the set power value for the second power limiting mode), the normal operation mode can be re-entered, at 810, wherein a predetermined number of the loads 500 can be enabled to receive input power 610 from the selected power source 200 in the manner discussed above. Preferably, the resultant measured input power 610 can be required to remain less than the release power value for at least a predetermined time interval before the normal operation mode can be re-entered. As illustrated in FIG. 5A, the first power limiting mode can be maintained until the input power 610 provided by the power source 200 remains less than the release power value for a time interval that is greater than the release timer value. If the input power 610 remains less than the release power value throughout the time interval, the first power limiting mode can be exited, and the normal operation mode can be re-entered. Otherwise, the first power limiting mode continues until the input power 610 can remain less than the release power value until the time interval has elapsed and/or the input power 610 becomes greater the set power value for the second power limiting mode. The power management method 800 thereby can comprise an incremental and/or hierarchical dynamic method for attempting to resolve undesired power conditions.

One preferred embodiment of the power management method 800 of FIG. 5A is shown in FIG. 5B. Selected processes within the method 800 of FIG. 5B are represented by reference designators that are common to the reference designators associated with selected processes within the power management methods 800 of FIGS. 2, 3, 4 and/or 5A. The use of common reference designators within the power management methods 800 is intended to represent that the associated processes can comprise equivalent processes. Turning to FIG. 5B, the power management method 800 is illustrated as including, at 805, establishing the one or more operational parameters associated with first and second power limiting modes. The operational parameters are discussed in more detail above with reference to FIG. 2, at 830.

As shown in FIG. 5B, the selected operational parameters for the first power limiting mode, at 805A, can include a set power value, a release power value, and/or a release timer value in the manner discussed in more detail above with reference to the establishing, at 805A, as shown in FIG. 5A. The selected operational parameters for the second power limiting mode, at 805C, likewise can include a set power value, a release power value, and/or a release timer value as set forth above with reference to the first power limiting mode. For example, the set power value for the second power limiting mode can comprise a predetermined power level, wherein the second power limiting mode can be entered if the input power 610 provided by the power source 200 is greater than the set power value of the second power limiting mode. As desired, the set power value of the second power limiting mode can be established in the manner set forth in more detail above with reference to the set power value for the first power limiting mode, such as a preselected percentage of the maximum power rating of the power source 200, and preferably comprises a predetermined power level that is greater than the predetermined power level associated with the set power value for the first power limiting mode.

Similarly, the release power value for the second power limiting mode can comprise a second predetermined power level, wherein the second power limiting mode can be maintained as long as the input power 610 provided by the power source 200 remains greater than the release power value of the second power limiting mode. The release power value of the second power limiting mode can be established in the manner set forth in more detail above with reference to the release power value for the first power limiting mode, such as a second preselected percentage of the maximum power rating of the power source 200. Preferably, the release power value of the second power limiting mode comprises a predetermined power level that is less than the set power value of the second power limiting mode. The release power value of the first power limiting mode and the release power value of the second power limiting mode can have any suitable predetermined relationship, as desired.

The release timer value of the second power limiting mode can be established in the manner set forth in more detail above with reference to the release timer value for the first power limiting mode. The release timer value of the second power limiting mode can comprise any suitable non-negative value that represents a predetermined period of time, which can be greater than, less than, and/or equal to the release timer value of the first power limiting mode. Once entered, the second power limiting mode can be maintained until the undesired power condition has been resolved.

In one preferred embodiment, the second power limiting mode can be maintained until the input power 610 provided by the power source 200 remains less than the release power value of the second power limiting mode for a time interval that is greater than the release timer value of the second power limiting mode. If the input power 610 remains less than the release power value of the second power limiting mode during the time interval, the second power limiting mode can be exited, and the normal operation mode can be re-entered. Otherwise, the second power limiting mode continues until the input power 610 can remain less than the release power value of the second power limiting mode until the time interval has elapsed. The release timer value of the first power limiting mode and the release timer value of the second power limiting mode can have any suitable predetermined relationship, as desired.

Once the selected operational parameters for the first and second power limiting modes have been established, the normal operation mode can be entered, at 810, in the manner set forth above with reference to FIG. 2. In the normal operation mode, one or more of the loads 500 associated with the power source 200 can be enabled, at 815. The enabled loads 500 can comprise all or a selected portion of the loads 500 associated with the power source 200, and the selection of loads 500 that are enabled, at 815, can dynamically vary over time in the manner set forth above with reference to FIG. 2. As desired, at least one of the enabled loads 500 can be independently deactivated and/or activated, which can effect a level of input power 610 provided by the power source 200. As a larger number of the enabled loads 500 becomes activated, the input power 610 can increase and approach the maximum power rating of the power source 200.

The power management method 800, at 820, includes measuring the input power 610 provided by the selected power source 200 to the enabled loads 500. The measurement of the input power 610, at 820, is discussed in more detail above with reference to the measurement, at 820, of FIG. 2. The measured input power 610 can be compared with, at 830, with at least one operational parameter associated with the first power limiting mode and, at 825, with at least one operational parameter associated with the second power limiting mode in the manner set forth above. As shown in FIG. 5B, for example, the operational parameters for the first and second power limiting modes can include respective set power values.

Thereby, if the input power 610 provided by the power source 200 is less than the set power value for the first power limiting mode, the normal operation mode can be maintained, and the input power 610 provided by the selected power source 200 to the enabled loads 500 can again be measured, at 820. If the input power 610 provided by the power source 200 is greater than the set power value for the second power limiting mode, the second power limiting mode, at 880, can be entered; whereas, the first power limiting mode, at 840, can be entered if the input power 610 provided by the power source 200 is greater than the set power value for the first power limiting mode but is less than the set power value for the second power limiting mode.

In the first power limiting mode, at least one of the enabled loads 500 can be disabled, at 850, in accordance with the predetermined criteria in the manner set forth above with reference to FIG. 2. After one or more of the enabled loads 500 has been disabled, the input power 610 provided by the selected power source 200 to the remaining enabled loads 500 can be measured, at 860, and the resultant measured input power 610 can be compared, at 865, with the set power value for the second power limiting mode. If the resultant measured input power 610 is greater than the set power value for the second power limiting mode, the second power limiting mode can be entered, at 880. Otherwise, if the resultant measured input power 610 is less than the set power value for the second power limiting mode, the resultant measured input power 610 can be compared, at 870, with the release power value for the first power limiting mode. If the resultant measured input power 610 is greater than the release power value for the first power limiting mode (and less than the set power value for the second power limiting mode), the first power limiting mode can be maintained, and the input power 610 provided by the selected power source 200 to the remaining enabled loads 500 can again be measured, at 860.

When the resultant measured input power 610, at 870, is less than the release power value, the normal operation mode can be re-entered, at 810, wherein a predetermined number of the loads 500 can be enabled to receive input power 610 from the selected power source 200 in the manner discussed above. Preferably, the resultant measured input power 610 can be required to remain less than the release power value for at least a predetermined time interval before the normal operation mode can be re-entered. As illustrated in FIG. 5B, the first power limiting mode can be maintained until the input power 610 provided by the power source 200 remains less than the release power value for a time interval that is greater than the release timer value. If the input power 610 remains less than the release power value throughout the time interval, the first power limiting mode can be exited, and the normal operation mode can be re-entered. Otherwise, the first power limiting mode continues until the input power 610 can remain less than the release power value until the time interval has elapsed and/or the input power 610 becomes greater the set power value for the second power limiting mode.

Upon entering the second power limiting mode, at 880, at least one of the enabled loads 500 can be disabled, at 882, in accordance with one or more second predetermined criteria as illustrated in FIG. 5B. The second criteria can be provided in the manner set forth above with reference to the first predetermined criteria of the disabling, at 850, of FIG. 2. After one or more of the enabled loads 500 has been disabled, the input power 610 provided by the selected power source 200 to the remaining enabled loads 500 can be measured, at 884, and the resultant measured input power 610 can be compared, at 886, with the release power value for the second power limiting mode. If the resultant measured input power 610 is greater than the release power value for the second power limiting mode, the second power limiting mode can be maintained, and the input power 610 provided by the selected power source 200 to the remaining enabled loads 500 can again be measured, at 884. As desired, the one or more additional enabled loads 500 can be disabled, at 882, in accordance with the second predetermined criteria if the resultant measured input power 610 continues to be greater than the release power value for the second power limiting mode.

When the resultant measured input power 610, at 886, is less than the release power value of the second power limiting mode, the normal operation mode can be re-entered, at 810, wherein a predetermined number of the loads 500 can be enabled to receive input power 610 from the selected power source 200 in the manner discussed above. Preferably, the resultant measured input power 610 can be required to remain less than the release power value of the second power limiting mode for at least a predetermined time interval before the normal operation mode can be re-entered. As illustrated in FIG. 5B, for example, the second power limiting mode can be maintained until the input power 610 provided by the power source 200 remains less than the release power value of the second power limiting mode for a time interval that is greater than the release timer value of the second power limiting mode.

If the input power 610 remains less than the release power value of the second power limiting mode throughout the time interval of the second power limiting mode, the second power limiting mode can be exited, and the normal operation mode can be re-entered. Otherwise, the second power limiting mode continues until the input power 610 can remain less than the release power value of the second power limiting mode until the time interval has elapsed. As desired, the second power limiting mode can transition into the first power limiting mode under appropriate circumstances. The power management method 800 thereby can comprise an incremental and/or hierarchical dynamic method for attempting to resolve undesired power conditions.

Figure 6A:
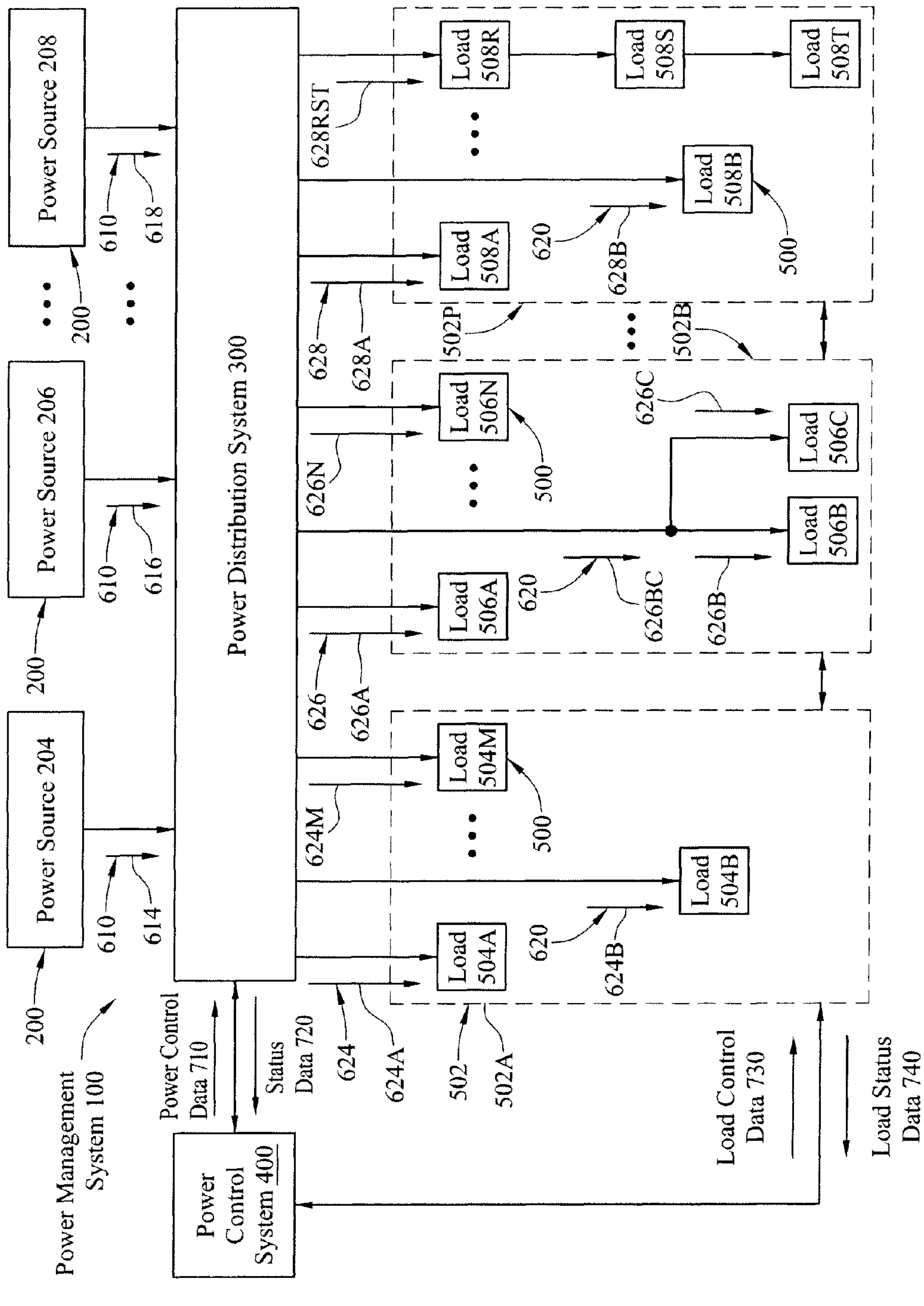
FIG. 6A is an exemplary top-level block diagram illustrating an alternative embodiment of the power management system of FIG. 1, wherein the power management system includes a plurality of power sources for providing power to the loads.
Figure 6B:
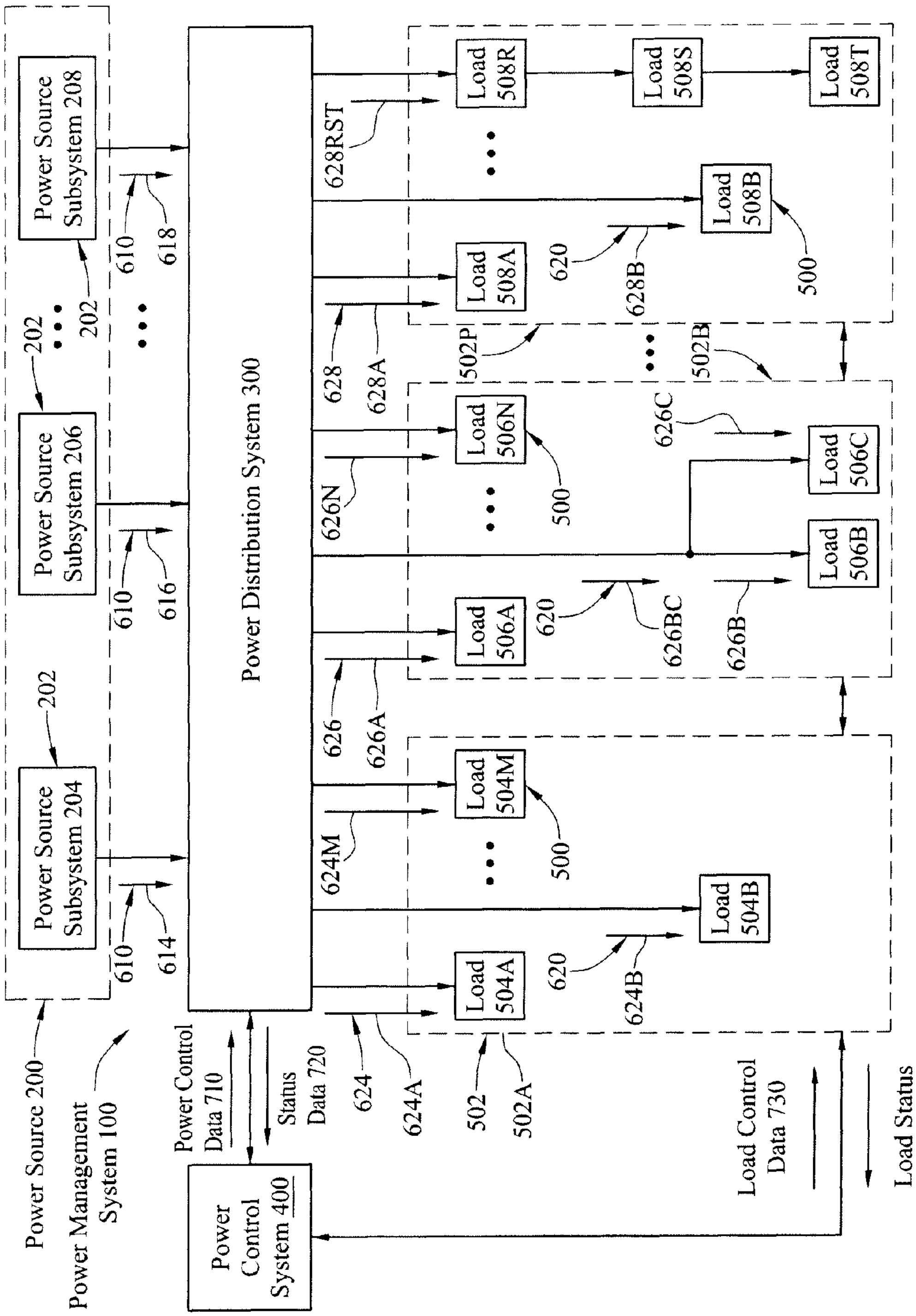
FIG. 6B is an exemplary top-level block diagram illustrating an alternative embodiment of the power management system of FIG. 6A, wherein the plurality of power sources comprise power source subsystems of a single power source.

Illustrative alternative embodiments of the power management system 100 of FIG. 1 are illustrated in FIGS. 6A-B. The power management systems 100 of FIGS. 6A-B are shown as including a plurality of power sources 200 for providing input power 610 to a plurality of loads 500 via a distribution system 300, wherein a power control system 400 allocates the input power 610 from the power sources 200 among the loads 500. The power sources 200, the distribution system 300, the power control system 400, and the loads 500 each can be provided in the manner set forth in more detail above with reference to the power management system 100 of FIG. 1.

Turning to FIG. 6A, each power source 200 is shown as providing input power 610 to a selected load group 502 of loads 500. Power source 204, for example, is shown as providing input power 614 as output power 624 to loads 504A-M within a first load group 502A. Similarly, power source 206 can provide input power 616 as output power 626 to loads 506A-N within a second load group 502B; whereas, power source 208 can provide input power 618 as output power 628 to loads 508A-P within a $P^{th}$ load group 502P. The power management system 100 can include any suitable number of power sources 200 and load groups 502, and/or each load group 502 can include any predetermined number of loads 500. As desired, a selected power source 204, 206, 208 can provide input power 610 to loads 500 within more than one load group 502, and/or more than one power source 204, 206, 208 can provide input power 610 to loads 500 within a selected load group 502.

The input power 610 provided by each power source 200 and/or the output power 620 provided to the loads 500 within the load groups 502 can dynamically change as set forth above. For example, the loads 504A-M within the first load group 502A can be respectively disabled and/or enabled to receive the output power 624A-M, as desired, in the manner set forth above. The loads 506A-N, 508A-T likewise can be respectively disabled and/or enabled to receive the output power 626A-N, 628A-RST. Further, each enabled load 500 can be activated and/or deactivated, as desired. To help manage the dynamic changes in the input power 610 and/or the output power 620, the power control system 400 can allocate the input power 610 provided by each respective power source 200 among the loads 500 in the relevant load group 502. The power control system 400, for instance, can dynamically disable one or more enabled loads 500 if an undesired power condition arises in the manner set forth above.

The loads 500 can be coupled with the power distribution system 300 in any conventional arrangement. As illustrated in FIG. 6A, the load 506B and the load 506C within the second load group 502B are coupled with the power distribution system 300 in a parallel load configuration. The power distribution system 300 thereby provides the output power 626BC to the parallel load configuration of the loads 506B, 506C. The load 506B thereby receives a first portion, or output power 626B, of the output power 626BC; whereas, a second portion, or output power 626C, of the output power 626BC is provided to the load 506C. Similarly, the loads 508R, 508S, 508T within the $P^{th}$ load group 502P are shown as being coupled with the power distribution system 300 in a series (and/or daisy-chain) load configuration. The output power 628RST thereby can be provided to, and distributed among, the loads 508R, 508S, 508T.

As desired, the power sources 204, 206, 208 can be provided as separate power sources 200 as illustrated in FIG. 6A. Alternatively, and/or additionally, one or more of the power sources 204, 206, 208 can be integrated into a selected power source 200 as shown in FIG. 6B. Turning to FIG. 6B, the power source 200 can comprise a plurality of power source subsystems 202. The power source subsystems 202, for example, can be provided in the manner set forth above with reference to the power sources 204, 206, 208 and thereby can provide the input power 610 to the loads 500 within respective load groups 502. Stated somewhat differently, the power source 200 of FIG. 6B can include a plurality of power connectors (or ports) (not shown) for providing the input power 614, 616, 618 to the loads 504, 506, 508 within the respective load groups 502 via the power distribution system 300.

As discussed above with reference to FIG. 1, the power management system 100 of FIGS. 6A-B can provide a first direct communication link (not shown) between the power control system 400 and at least one selected load 500 and/or a second direct communication link (not shown) between two (or more) selected loads 500. The first direct communication link can enable the power control system 400 to exchange the power control data 710 and/or the status data 720 directly with the selected load 500; whereas, the second direct communication link can permit the power control data 710 and/or the status data 720 to be exchanged between the two selected loads 500. Additionally, and/or alternatively, the power management system 100 can support exchanges of load status data 740 and load control data 730 between the power control system 400 and the loads 500 (and/or load groups 502) in the manner set forth in more detail above with reference to FIG. 1.

Figure 7A:
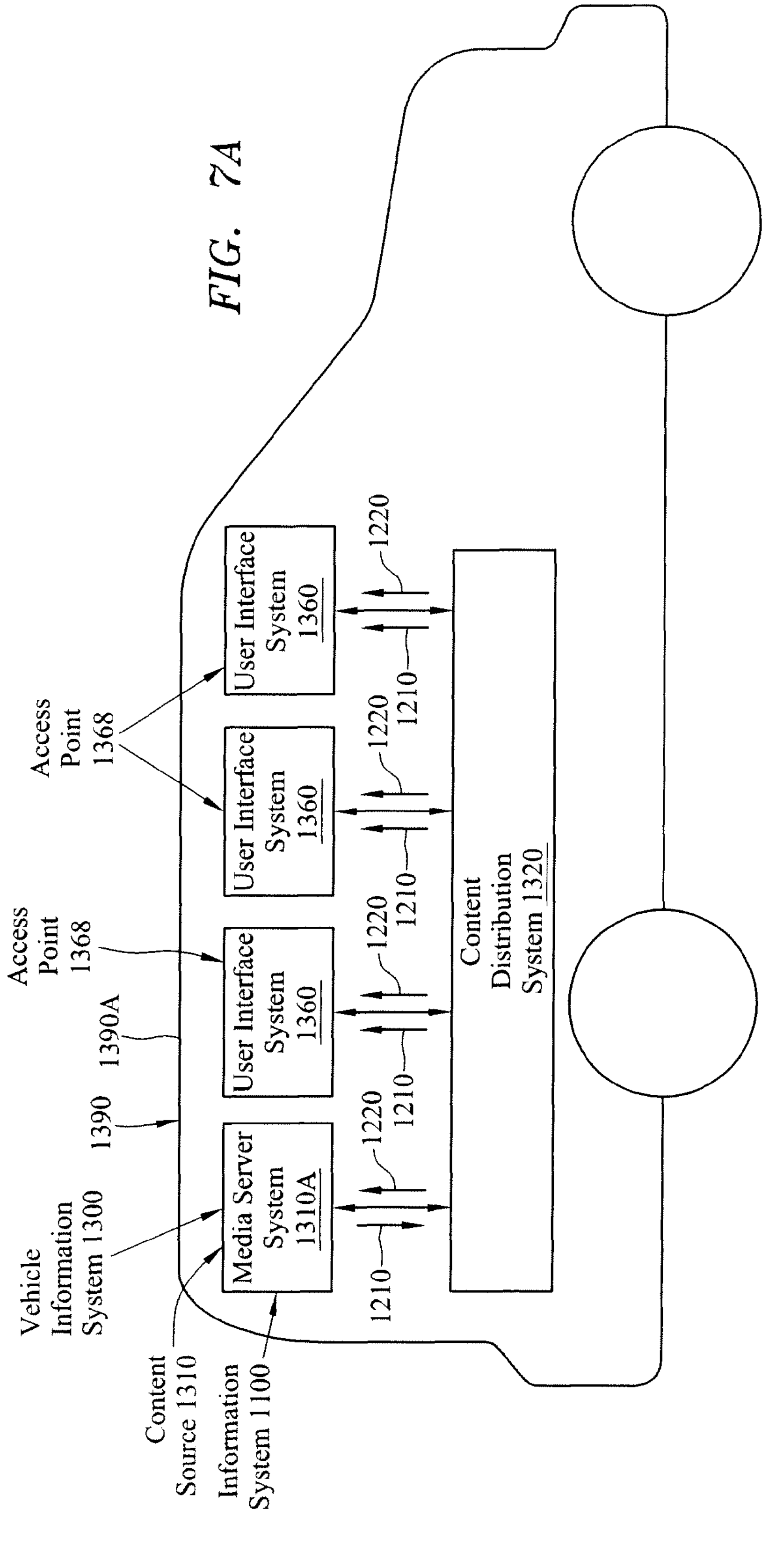
FIG. 7A is an exemplary top-level drawing illustrating a vehicle information system installed aboard a passenger vehicle.
Figure 7B:
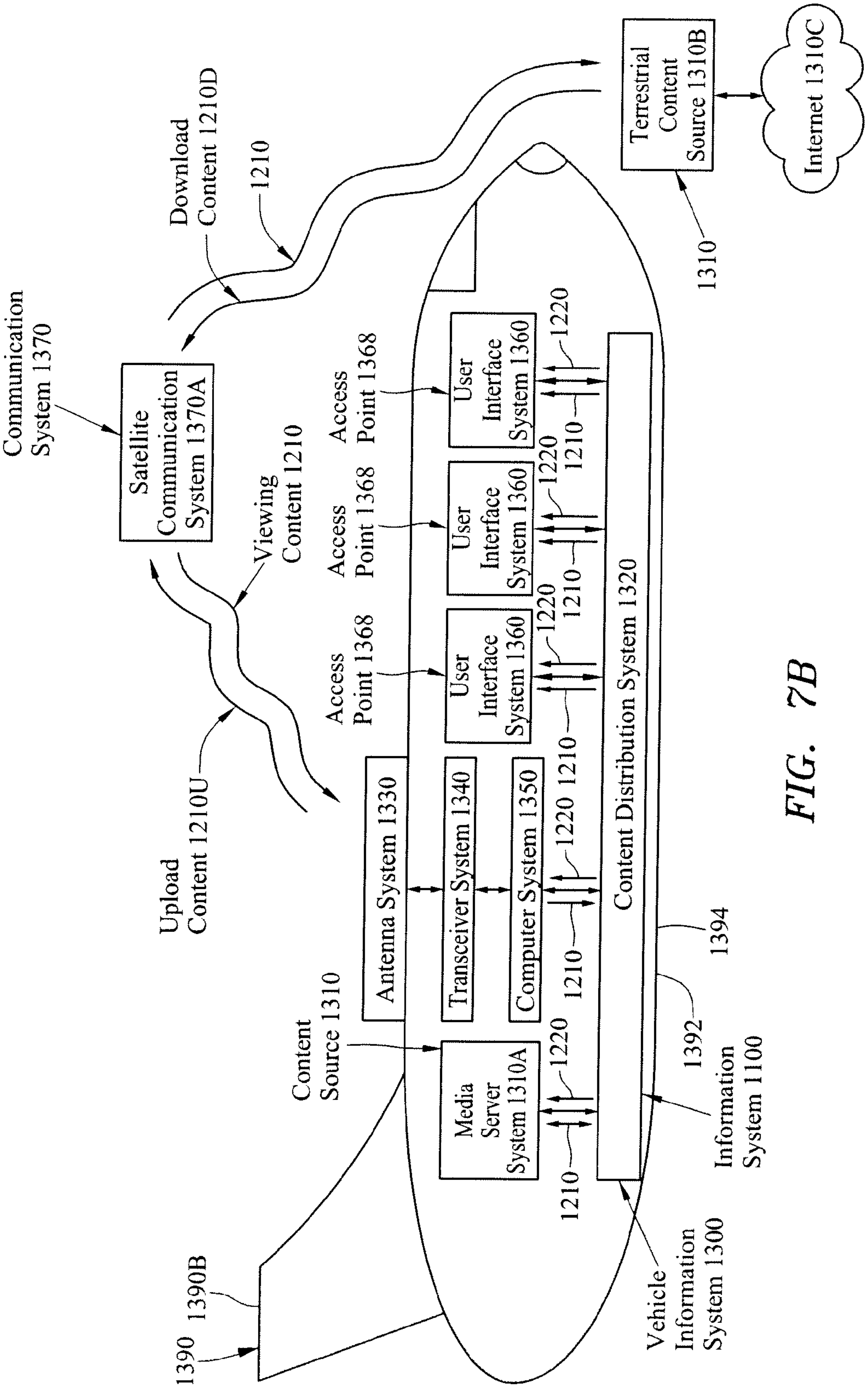
FIG. 7B is an exemplary top-level drawing illustrating the vehicle information system of FIG. 7A, wherein the vehicle information system is installed aboard an aircraft and is configured to communicate with a terrestrial content source.

In one preferred embodiment, the power management system 100 can manage and/or control power distribution and usage within an information system 1100 (shown in FIGS. 7A-B). The information system 1100 can be provided in any conventional manner and, for example, can be provided in the manner set forth in the co-pending United States patent applications, entitled "SYSTEM AND METHOD FOR DOWNLOADING FILES," application Ser. No. 10/772,565, filed on Feb. 4, 2004; entitled "SYSTEM AND METHOD FOR MANAGING CONTENT ON MOBILE PLATFORMS," application Ser. No. 11/123,327, filed on May 6, 2005; entitled "PORTABLE MEDIA DEVICE AND METHOD FOR PRESENTING VIEWING CONTENT DURING TRAVEL," application Ser. No. 11/154,749, filed on Jun. 15, 2005; entitled "SYSTEM AND METHOD FOR RECEIVING BROADCAST CONTENT ON A MOBILE PLATFORM DURING INTERNATIONAL TRAVEL," application Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," application Ser. No. 12/210,624, filed on Sep. 15, 2008; entitled "PORTABLE USER CONTROL DEVICE AND METHOD FOR VEHICLE INFORMATION SYSTEMS," application Ser. No. 12/210,689, filed on Sep. 15, 2008; entitled "SYSTEM AND METHOD FOR RECEIVING BROADCAST CONTENT ON A MOBILE PLATFORM DURING TRAVEL," application Ser. No. 12/237,253, filed on Sep. 24, 2008; and entitled "SYSTEM AND METHOD FOR PRESENTING ADVERTISEMENT CONTENT ON A MOBILE PLATFORM DURING TRAVEL," application Ser. No. 12/245,521, filed on Oct. 3, 2008, which are assigned to the assignee of the present application and the respective disclosures of which are hereby incorporated herein by reference in their entireties and for all purposes.

Although the information system 1100 can be disposed in a fixed location, such as a building, the information system 1100 likewise can advantageously be applied in portable system applications. Turning to FIGS. 7A-B, for example, the information system 1100 is shown as comprising a vehicle information system 1300 that can be configured for installation aboard a wide variety of passenger vehicles 1390. Exemplary types of passenger vehicles can include an automobile 1390A (shown in FIG. 7A), an aircraft 1390B (shown in FIG. 7B), a bus, a recreational vehicle, a boat, a train, and/or any other type of passenger vehicle without limitation. If installed on an aircraft 1390B as illustrated in FIG. 7B, for example, the vehicle information system 1300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 7A-B, the vehicle information system 1300 comprises at least one conventional content source 1310 and one or more user (or passenger) interface systems 1360 that communicate via a real-time content distribution system 1320. The content sources 1310 can include one or more internal content sources, such as a media (or content) server system 1310A, that are installed aboard the passenger vehicle 1390 and/or at least one remote (or terrestrial) content source 1310B that can be external from the passenger vehicle 1390. The media server system 1310A can comprise an information system controller for providing overall system control functions for the vehicle information system 1300 and/or can store viewing content 1210, such as preprogrammed viewing content and/or downloaded viewing content 1210D, for selection, distribution, and presentation. The viewing content 1210 can include any conventional type of audio and/or video viewing content, such as stored (or time-delayed) viewing content and/or live (or real-time) viewing content, without limitation. As desired, the media server system 1310A likewise can support decoding and/or digital rights management (DRM) functions for the vehicle information system 1300.

Being configured to distribute and/or present the viewing content 1210 provided by one or more selected content sources 1310, the vehicle information system 1300 can communicate with the content sources 1310 in real time and in any conventional manner, including via wired and/or wireless communications. The vehicle information system 1300 and the terrestrial content source 1310B, for example, can communicate in any conventional wireless manner, including directly and/or indirectly via an intermediate communication system 1370, such as a satellite communication system 1370A. The vehicle information system 1300 thereby can receive download viewing content 1210D from a selected terrestrial content source 1310B and/or transmit upload viewing content 1210U to the terrestrial content source 1310B. As desired, the terrestrial content source 1310B can be configured to communicate with other terrestrial content sources (not shown). The terrestrial content source 1310B is shown in FIG. 7B as providing access to the Internet 1310C. Although shown and described as comprising the satellite communication system 1370A for purposes of illustration only, the communication system 1370 can comprise any conventional type of wireless communication system, such as a cellular communication system (not shown) and/or an Aircraft Ground Information System (AGIS) communication system (not shown).

To facilitate communications with the terrestrial content sources 1310B, the vehicle information system 1300 can include an antenna system 1330 and a transceiver system 1340 for receiving the viewing content 1210 from the remote (or terrestrial) content sources 1310B as shown in FIG. 7B. The antenna system 1330 preferably is disposed outside the passenger vehicle 1390, such as any suitable exterior surface 1394 of a fuselage 1392 of the aircraft 1390B. The antenna system 1330 can receive viewing content 1210 from the terrestrial content source 1310B and provide the received viewing content 1210, as processed by the transceiver system 1340, to a computer system 1350 of the vehicle information system 1300. The computer system 1350 can provide the received viewing content 1210 to the media server system 1310A and/or to one or more of the user interfaces 1360, as desired. Although shown and described as being separate systems for purposes of illustration only, the computer system 1350 and the media server system 1310A can be at least partially integrated, as desired.

Figure 8:
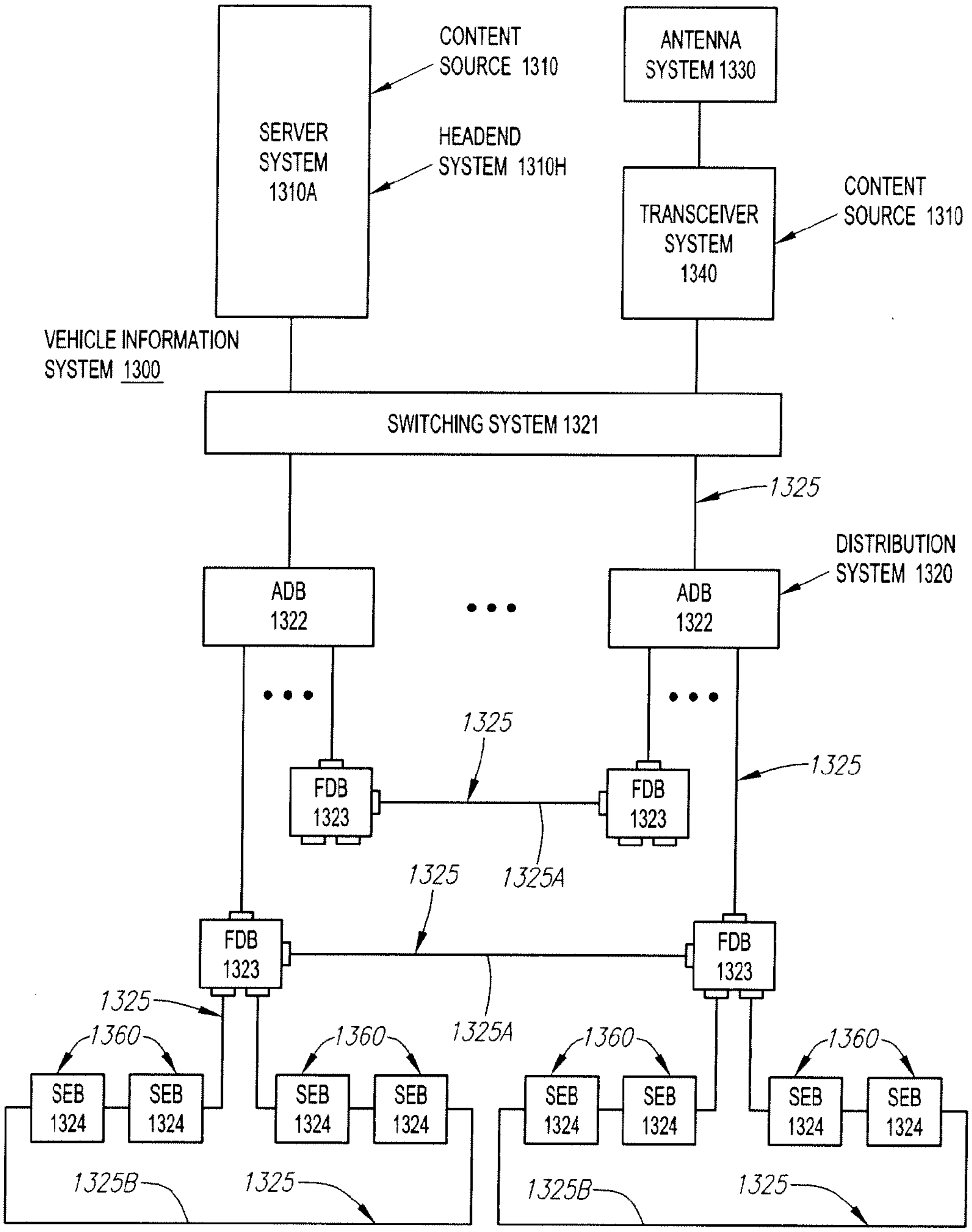
FIG. 8 is an exemplary detail drawing illustrating one preferred embodiment of a content distribution system for the vehicle information systems of FIGS. 7A-B.

FIG. 8 illustrates an exemplary content distribution system 1320 for the vehicle information system 1300. The content distribution system 1320 of FIG. 8 couples, and supports communication between, a headend system 1310H, which includes the content sources 1310, and the plurality of user interface systems 1360. Stated somewhat differently, the components, including the content sources 1310 and the user interface systems 1360, of the vehicle information system 1300 are shown as communicating via the content distribution system 1320. The distribution system 1320 as shown in FIG. 8 is provided in the manner set forth co-pending United States patent application, entitled "SYSTEM AND METHOD FOR ROUTING COMMUNICATION SIGNALS VIA A DATA DISTRIBUTION NETWORK," application Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties and for all purposes. Alternatively, and/or additionally, the distribution system 1320 can be provided in the manner set forth in the co-pending United States patent application, entitled "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety and for all purposes.

As illustrated in FIG. 8, the distribution system 1320 can be provided as a plurality of area distribution boxes (or ADBs) 1322, a plurality of floor disconnect boxes (or FDBs) 1323, and a plurality of seat electronics boxes (or SEBs) (and/or video seat electronics boxes (or VSEBs) and/or premium seat electronics boxes (or PSEBs)) 1324 being configured to communicate in real time via a plurality of wired and/or wireless communication connections 1325. The distribution system 1320 likewise can include a switching system 1321 for providing an interface between the distribution system 1320 and the headend system 1310H. The switching system 1321 can comprise a conventional switching system, such as an Ethernet switching system, and is configured to couple the headend system 1310H with the area distribution boxes 1322. Each of the area distribution boxes 1322 is coupled with, and communicates with, the switching system 1321.

Each of the area distribution boxes 1322, in turn, is coupled with, and communicates with, at least one seat electronics box 1324. The area distribution boxes 1322 and the associated seat electronics boxes 1324 can be coupled in any conventional configuration. One or more sets of the seat electronics boxes 1324, for example, can extend from a selected area distribution box 1322. In one embodiment, each set comprises a plurality of the seat electronics boxes 1324 provided in a daisy-chain configuration, wherein the sets of the seat electronics boxes 1324 are disposed in a star network topology about a central area distribution box 1322. In other words, several daisy-chained sets of the seat electronics boxes 1324 can extend from the central area distribution box 1322 in a star network arrangement.

The area distribution boxes 1322 can be coupled with the seat electronics boxes 1324 directly or, as illustrated in FIG. 8, indirectly via at least one intermediate system, such as a floor disconnect box 1323. Although the area distribution boxes 1322 and the associated floor disconnect boxes 1323 can be coupled in any conventional configuration, the associated floor disconnect boxes 1323 preferably are disposed in a star network topology about a central area distribution box 1322 as illustrated in FIG. 8. Each floor disconnect box 1323 is coupled with, and services, a plurality of daisy-chains of seat electronics boxes 1324. The seat electronics boxes 1324, in turn, are configured to communicate with the user interface systems 1360. Each seat electronics box 1324 can support one or more of the user interface systems 1360.

The switching systems 1321, the area distribution boxes 1322, the floor disconnect boxes 1323, the seat electronics boxes 1324, the antenna system 1330, the transceiver system 1340, the content source 1310, the media server system 1310A, the headend system 1310H, the video interface systems 1362 (shown in FIGS. 9A-B), the audio interface systems 1364 (shown in FIGS. 9A-B), the user input systems 1366 (shown in FIGS. 9A-B), and other resources (and/or components) of the vehicle information system 1300 preferably are provided as line replaceable units (or LRUs) 1326. The use of line replaceable units 1326 facilitate maintenance of the vehicle information system 1300 because a defective line replaceable unit 1326 can simply be removed from the vehicle information system 1300 and replaced with a new (or different) line replaceable unit 1326. The defective line replaceable unit 1326 thereafter can be repaired for subsequent installation. Advantageously, the use of line replaceable units 1326 can promote flexibility in configuring the content distribution system 1320 by permitting ready modification of the number, arrangement, and/or configuration of the system resources of the content distribution system 1320. The content distribution system 1320 likewise can be readily upgraded by replacing any obsolete line replaceable units 1326 with new line replaceable units 1326.

As desired, the floor disconnect boxes 1323 advantageously can be provided as routing systems and/or interconnected in the manner set forth in the above-referenced co-pending United States patent application, entitled "SYSTEM AND METHOD FOR ROUTING COMMUNICATION SIGNALS VIA A DATA DISTRIBUTION NETWORK," application Ser. No. 11/277,896, filed on Mar. 29, 2006. The distribution system 1320 can include at least one FDB internal port bypass connection 1325A and/or at least one SEB loopback connection 1325B. Each FDB internal port bypass connection 1325A is a communication connection 1325 that permits floor disconnect boxes 1323 associated with different area distribution boxes 1322 to directly communicate. Each SEB loopback connection 1325B is a communication connection 1325 that directly couples the last seat electronics box 1324 in each daisy-chain of seat electronics boxes 1324 for a selected floor disconnect box 1323 as shown in FIG. 8. Each SEB loopback connection 1325B therefore forms a loopback path among the daisy-chained seat electronics boxes 1324 coupled with the relevant floor disconnect box 1323.

Figure 9A:
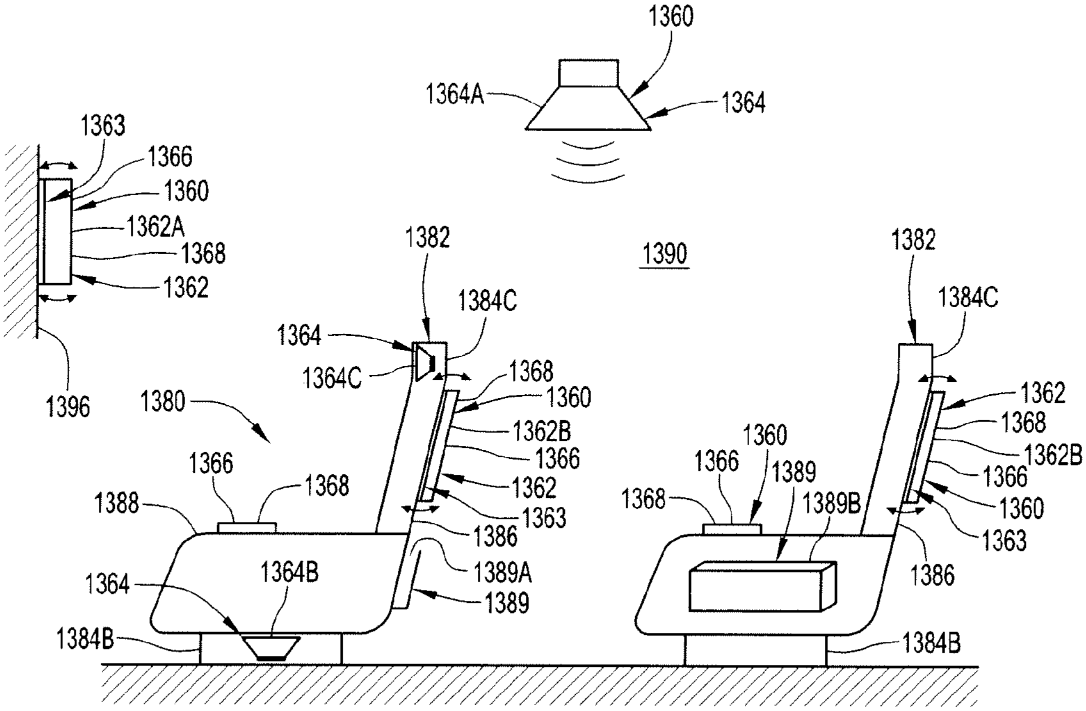
FIG. 9A is an exemplary top-level drawing illustrating a passenger cabin of a passenger vehicle, wherein the vehicle information system of FIGS. 7A-B has been installed.

FIG. 9A provides a view of an exemplary passenger cabin 1380 of a passenger vehicle 1390, such as the automobile 1390A (shown in FIG. 7A) and/or the aircraft 1390B (shown in FIG. 7B), aboard which the vehicle information system 1300 has been installed. The passenger cabin 1380 is illustrated as including a plurality of passenger seats 1382, and each passenger seat 1382 is associated with a selected user interface system 1360. Each user interface system 1360 can include a video interface system 1362 and/or an audio interface system 1364. Exemplary video interface systems 1362 can include overhead cabin display systems 1362A with centralized controls, seatback display systems 1362B or armrest display systems (not shown) each with individualized controls, crew display panels, and/or handheld video presentation systems.

The audio interface systems 1364 of the user interface systems 1360 can be provided in any conventional manner and can include an overhead speaker system 1364A, the handheld audio presentation systems, and/or headphones coupled with an audio jack provided, for example, at an armrest 1388 of the passenger seat 1382. One or more speaker systems likewise can be associated with the passenger seat 1382, such as a speaker system 1364B disposed within a base 1384B of the passenger seat 1382 and/or a speaker system 1364C disposed within a headrest 1384C of the passenger seat 1382. In a preferred embodiment, the audio interface system 1364 can include an optional noise-cancellation system for further improving sound quality produced by the audio interface system 1364.

As shown in FIG. 9A, the user interface system 1360 likewise can include an input system 1366 for permitting a user (or passenger) to communicate with the vehicle information system 1300. The input system 1366 can be provided in any conventional manner and typically includes one or more switches (or pushbuttons), such as a keyboard or a keypad, and/or a pointing device, such as a mouse, trackball, and/or stylus. As desired, the input system 1366 can be at least partially integrated with, and/or separable from, the associated video interface system 1362 and/or audio interface system 1364. For example, the video interface system 1362 and the input system 1366 can be provided as a touchscreen display system. The input system 1366 likewise can include one or more peripheral communication connectors 1366P (or ports) (shown in FIG. 11B) for coupling a peripheral input device (not shown), such as a full-size computer keyboard, an external mouse, and/or a game pad, with the vehicle information system 1300.

Preferably, at least one of the user interface systems 1360 includes a wired and/or wireless access point 1368, such as a conventional communication port (or connector), for coupling a personal electronic (or media) device 1200 (shown in FIG. 9B) with the vehicle information system 1300. Passengers (not shown) who are traveling aboard the passenger vehicle 1390 thereby can enjoy personally-selected viewing content during travel. The access point 1368 is located proximally to an associated passenger seat 1382 and can be provided at any suitable cabin surface, such as a seatback 1386, wall 1396, ceiling, and/or bulkhead.

Figure 9B:
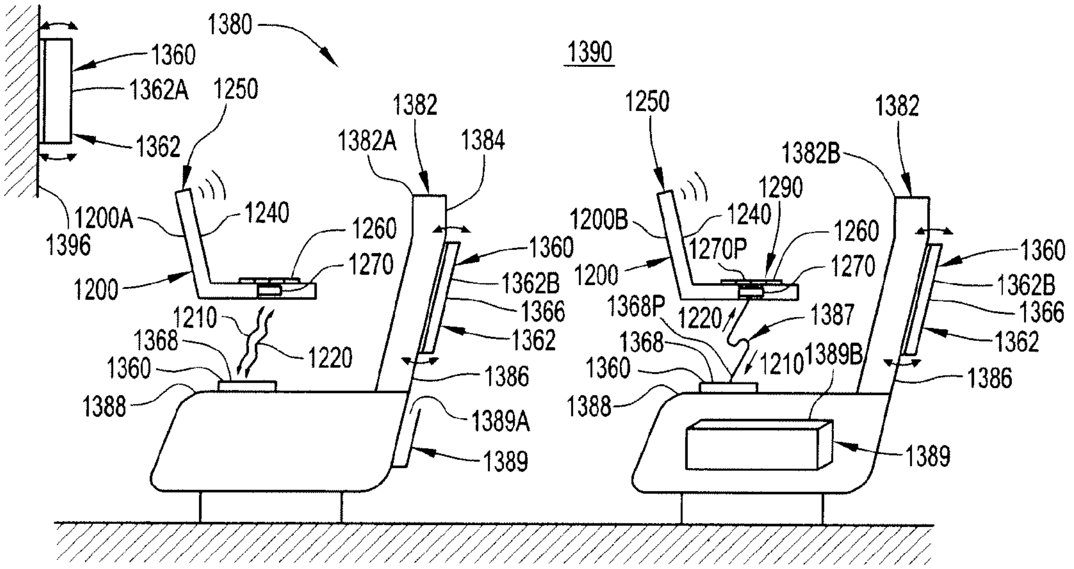
FIG. 9B is an exemplary top-level drawing illustrating an embodiment of the vehicle information system of FIG. 9A, wherein the vehicle information system can provide power to a personal electronic (or media) device.

Turning to FIG. 9B, the vehicle information system 1300 is shown as communicating with one or more personal electronic devices 1200. Each personal electronic device 1200 can store the audio and/or video viewing content 1210 and can be provided as a handheld device, such as a laptop computer, a palmtop computer, a personal digital assistant (PDA), cellular telephone, an iPod® digital electronic media device, an iPhone® digital electronic media device, and/or a MPEG Audio Layer 3 (MP3) device. Illustrative personal electronic devices 1200 are shown and described in the above-referenced co-pending United States patent applications, entitled "SYSTEM AND METHOD FOR DOWNLOADING FILES," application Ser. No. 10/772,565, filed on Feb. 4, 2004; entitled "PORTABLE MEDIA DEVICE AND METHOD FOR PRESENTING VIEWING CONTENT DURING TRAVEL," application Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," application Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," application Ser. No. 12/210,624, filed on Sep. 15, 2008; entitled "MEDIA DEVICE INTERFACE SYSTEM AND METHOD FOR VEHICLE INFORMATION SYSTEMS," application Ser. No. 12/210,636, filed on Sep. 15, 2008; entitled "MEDIA DEVICE INTERFACE SYSTEM AND METHOD FOR VEHICLE INFORMATION SYSTEMS," application Ser. No. 12/210,652, filed on Sep. 15, 2008; and entitled "PORTABLE USER CONTROL DEVICE AND METHOD FOR VEHICLE INFORMATION SYSTEMS," application Ser. No. 12/210,689, filed on Sep. 15, 2008.

The personal electronic devices 1200 as illustrated in FIG. 9B include a video display system 1240 for visually presenting the viewing content 1210 and/or an audio presentation system 1250 for audibly presenting the viewing content 1210. Each personal electronic device 1200 likewise can include a user control system 1260, which can be provided in any conventional manner and typically includes one or more switches (or pushbuttons), such as a keyboard or a keypad, and/or a pointing device, such as a mouse, trackball, or stylus. The personal electronic devices 1200 thereby can select desired viewing content 1210 and control the manner in which the selected viewing content 1210 is received and/or presented.

Each of the personal electronic devices 1200 likewise can include at least one communication port (or connector) 1270. The communication ports 1270 enable the personal electronic devices 1200 to communicate with the vehicle information system 1300 via the access points 1368 of the respective user interface systems 1360. As illustrated with personal electronic device 1200A, for example, a selected communication port 1270 and access point 1368 can support wireless communications; whereas, a communication cable assembly 1387 provides support for wired communications between another selected communication port 1270 and access point 1368 associated with personal electronic device 1200B. The wired communications between the access point 1368 and the communication port 1270 for the personal electronic device 1200B preferably include providing operating power 1220 to the personal electronic device 1200B.

In other words, each personal electronic device 1200 can include a device power connector (or port) 1270P that can be coupled with a system power connector (or port) 1368P, such as a conventional electrical power outlet, provided by the relevant access point 1368. The system power connector 1368P can be disposed adjacent to the relevant passenger seat 1382 and, when coupled with the device power connector 1270P via the communication cable assembly 1387, can provide the operating power 1220 from the vehicle information system 1300 to the personal electronic device 1200. As desired, the viewing content 1210 and the operating power 1220 can be provided to the personal electronic device 1200 via separate communication cable assemblies 1387. When the communication port 1270 and the access points 1368 are in communication, the vehicle information system 1300 supports a simple manner for permitting the associated personal electronic device 1200 to be integrated with the vehicle information system 1300 using a user-friendly communication interface.

When no longer in use and/or direct physical contact with the personal electronic device 1200 is not otherwise required, the personal electronic device 1200 can be disconnected from the system power connector 1368P and stored at the passenger seat 1382. The passenger seat 1382 can include a storage compartment 1389 for providing storage of the personal electronic device 1200. As illustrated with passenger seat 1382B, the personal electronic device 1200 can be placed in a storage pocket 1389B formed in the armrest 1388 of the passenger seat 1382B. The storage compartment 1389 likewise can be provided on the seatback 1386 and/or the headrest 1384 of the passenger seat 1382. As desired, the storage compartment 1389 can comprise an overhead storage compartment, a door storage compartment, a storage compartment provided underneath the passenger seat 1382, or any other type of conventional storage compartment, such as a glove compartment, trunk, or closet, available in the passenger vehicle 1390.

Figure 10:
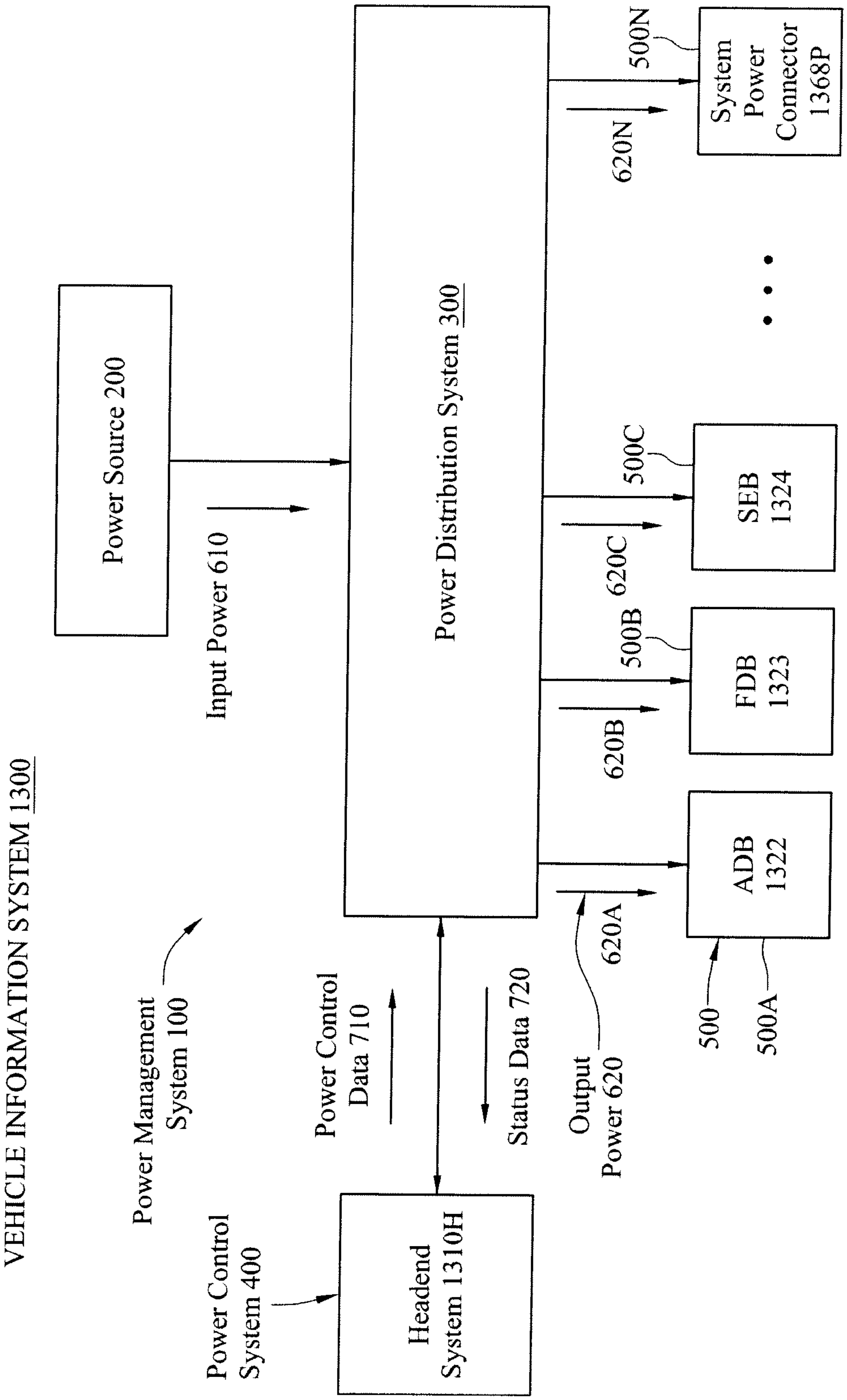
FIG. 10 is an exemplary top-level block diagram illustrating another alternative embodiment of the power management system of FIG. 1, wherein the power management system is associated with the vehicle information system of FIGS. 7A-B, 8, and 9A-B.

FIG. 10 shows the power management system 100 of FIG. 1, wherein the power management system 100 is associated with the vehicle information system 1300 of FIGS. 7A-B, 8, and 9A-B. As illustrated in FIG. 10, the headend system 1310H can comprise the power control system 400 for allocating the input power 610 from the power source 200 among the loads 500 in the manner set forth in more detail above with reference to FIG. 1; whereas, selected resources (and/or components) of the vehicle information system 1300 can comprise the loads 500. The loads 500, for example, can include one or more area distribution boxes 1322, floor disconnect boxes 1323, and/or seat electronics boxes 1324 as discussed above with reference to FIG. 8. As desired, the loads 500 likewise can include at least one at least one power connector 1368P for coupling with, and providing output power 620N to, a selected personal electronic device 1200 (shown in FIG. 9B).

Although shown in FIG. 10 as communicating indirectly via the power distribution system 300 for purposes of illustration only, the power control system 400 and loads 500 can communicate in any conventional direct and/or indirect manner. The power management system 100 of FIG. 10, for example, can include a first direct communication link (not shown) between the power control system 400 and at least one selected load 500 and/or a second direct communication link (not shown) between two (or more) selected loads 500 in the manner set forth above with reference to FIG. 1. The first direct communication link thereby can enable the power control system 400 to exchange the power control data 710 and/or the status data 720 directly with the selected load 500; whereas, the second direct communication link can permit the power control data 710 and/or the status data 720 to be exchanged between the two selected loads 500.

The power management system 100 preferably can be partially and/or completely software driven. For example, the power management system 100 can comprise an application running on the headend system 1310H of the vehicle information system 1300. In fundamental terms, the power management system 100 can deploy a software application at the headend system 1310H. The software application incorporates general principals of current management with respect to the relevant vehicle cabin equipment, such as commercial aircraft cabin equipment. Strategies for a dynamic unobtrusive method of cabin equipment load shedding and load sharing between vehicle power mains (or busbars) 250 (shown in FIG. 12), for example, can be incorporated into the power management system 100. The power management system 100 preferably supports load sharing within the vehicle cabin 1380 (shown in FIGS. 9A-B) among all current-consuming devices, such as various system resources of the vehicle information system 1300, by reallocating unused power to current-consuming devices in areas of the cabin where additional power is needed.

The power management system 100 can receive and/or process power status data 720 from the passenger vehicle 1390 and/or a content distribution system 1320 of the vehicle information system 1300 to generate power control data 710 in the manner set forth above. Thereby, the power management system 100 can support its management and cabin equipment control features. Advantageously, the power management system 100 can utilize virtual operating parameters to support the dynamic feature. The virtual operating parameters enable the power management system 100 to establish "soft" operational boundaries for the current consuming components of the architecture. To optimize current usage, the power management system 100 preferably is capable of dynamically altering the established baseline values during the execution of its management tasks in those areas of the cabin where vehicle load conditions warrant.

As desired, the power management system 100 can incorporate load assignment strategies for the current-consuming components of the architecture, which current-consuming components can serve as mechanisms for calculating maximum operational load conditions and/or establishing baseline operational boundaries for each component. As a part of its dynamic management structure, the power management system 100 can incorporate an ability to support predefined load shed priorities or specified vehicle cabin class/zones and load types. The power management system 100 thereby can advantageously provide a dynamic, unobtrusive manner for optimizing power distribution and its usage within a passenger vehicle 1390 (shown in FIGS. 7A-B). In other words, the power management system 100 can dynamically manage multiple forms of power at a plurality of different levels throughout the passenger vehicle 1390, such as at a selected passenger seat 1382 (shown in FIGS. 9A-B) and/or within a selected passenger seat group 1383 (shown in FIG. 12), if vehicle power load conditions warrant.

Figure 11A:
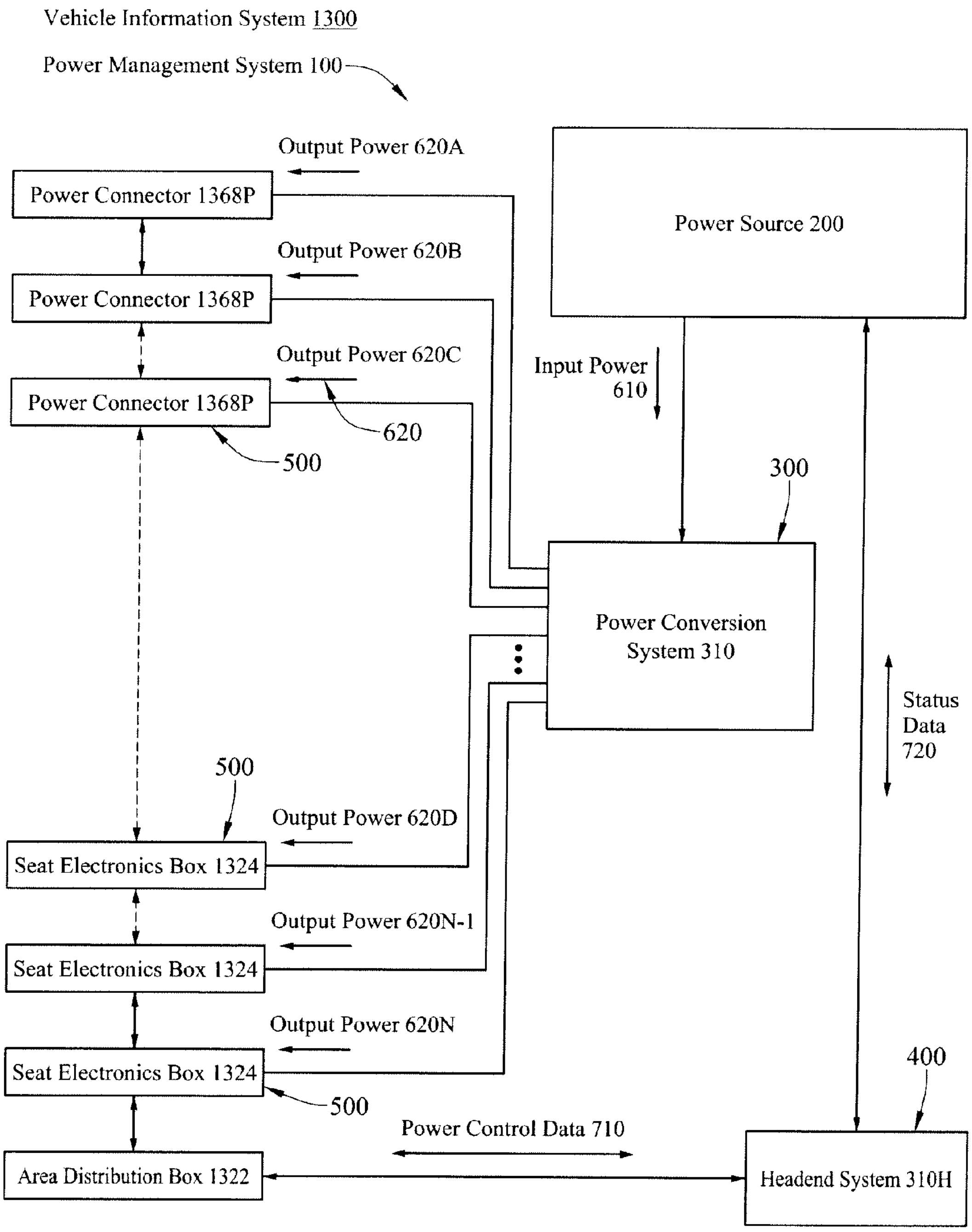
FIG. 11A is an exemplary block diagram illustrating an alternative embodiment of the power management system of FIG. 10, wherein the loads include at least one seat electronics box and at least one power connector.

Turning to FIG. 11A, the power distribution system 300 of the power management system 100 is shown as including at least one power conversion system 310. In the manner set forth in more detail above with reference to FIG. 1, the power conversion system 310 can convert the input power 610 into each respective output power 620A-N. The power conversion system 310 thereby can provide the output power 620A-N with suitable power characteristics to a predetermined number of loads 500. In a preferred embodiment, the loads 500 can include at least one power connector 1368P and/or at least one seat electronics box 1324. The power conversion system 310 of FIG. 11A is shown as providing output power 620A-C to a plurality of power connectors 1368P and as providing output power 620D, . . . , 620N-1, 620N to a plurality of seat electronics boxes 1324.

Although the power conversion system 310 can provide the output power 620A-N with any preselected power characteristics, the output power 620A-N provided to similar types of loads 500 preferable is uniform. As desired, the output power 620A-C provided to the power connectors 1368P preferably is uniform and can differ from a uniform output power 620D, . . . , 620N-1, 620N provided to the seat electronics boxes 1324. In one preferred embodiment, the power conversion system 310 can receive multi-phase input power 610 and convert the multi-phase input power 610 into single-phase output power 620A-C that can be made available at the power connectors 1368P. For example, if the input power 610 comprises three-phase, 115 VAC, 360-800 Hz variable frequency power, the power conversion system 310 can convert the input power 610 into output power 620A-C that includes a plurality of single-phase, 110 VAC, 60 Hz power for personal electronic devices 1200 (shown in FIG. 9B) that can be coupled with the power connectors 1368P. The power conversion system 310 likewise can provide output power 620D, . . . , 620N-1, 620N that comprises direct current (DC) power, such as 28 VDC, 150 W, to the seat electronics boxes 1324. As desired, the power conversion system 310 can provide (or pass-through) the multi-phase input power 610 to other system resources, including another power conversion system 310, within the vehicle information system 1300.

The headend system 1310H can exchange the status data 702 with the power source 200 and/or the power control data 710 with the loads 500 in any conventional manner. The headend system 1310H and the loads 500 are shown in FIG. 11A as exchanging the power control data 710 via an area distribution box 1322. The seat electronics boxes 1324 preferably support Ethernet communications, such as any type of Fast Ethernet (100Base-X and/or 100Base-T) communications and/or Gigabit (1000Base-X and/or 1000Base-T) Ethernet communications with a local area distribution box 1322 and/or an adjacent seat electronics box 1324 in the manner set forth in the above-referenced co-pending United States patent application, entitled "SYSTEM AND METHOD FOR MANAGING CONTENT ON MOBILE PLATFORMS," application Ser. No. 11/123,327, filed on May 6, 2005.

As desired, a selected first group of the loads 500 can be associated with, and exchange power control data 710 with the headend system 1310H by way of, a first area distribution box 1322; whereas, a selected second group of the loads 500 can be associated with, and exchange the power control data 710 with the headend system 1310H by way of, a second area distribution box 1322. Although FIG. 11A illustrates each of the loads 500 as being coupled in series with a common area distribution box 1322, the loads 500 can be coupled with the area distribution box 1322 in any conventional arrangement. In one preferred embodiment, the headend system 1310H can exchange power control data 710 and/or status data 702 with one or more selected power conversion systems 310 in the manner set forth above.

Figure 11B:
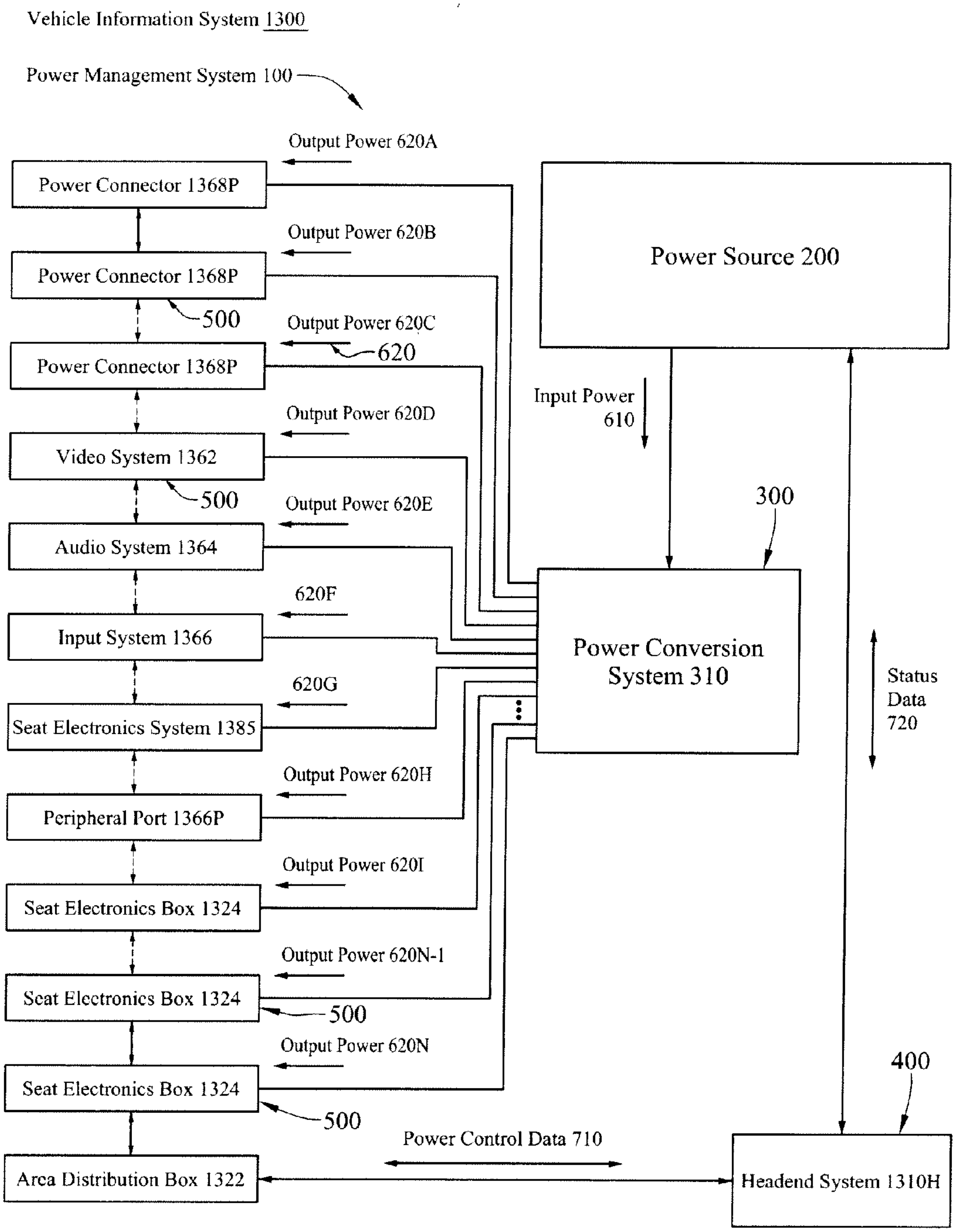
FIG. 11B is an exemplary block diagram illustrating an alternative embodiment of the power management system of FIG. 10, wherein the loads can include any selected system resource of the vehicle information system of FIGS. 7A-B, 8, and 9A-B.

FIG. 11B illustrates an alternative embodiment of the power management system 100 of FIG. 11A, wherein the loads 500 that can receive output power 620A-N from a selected power conversion system 310 can include any selected system resource (or component) of the vehicle information system 1300. A selected seat electronics box 1324, for example, can provide viewing content 1210 (shown in FIGS. 7A-B), such as network data and digital audio/video content, to each associated passenger seat 1382 (shown in FIGS. 9A-B). The power conversion system 310 can provide output power 620D to a video interface system 1362 and/or output power 620E to an audio interface system 1364 for presenting the viewing content 1210. Similarly, a user input system 1366 for controlling presentation of the viewing content 1210 and/or a peripheral communication connector 1366P are shown as respectively receiving output power 620F, 620H.

Other system resources of the vehicle information system 1300 likewise can receive output power 620 from the power conversion system 310. The other system resources of the vehicle information system 1300, for example, can include a seat electronics system 1385 for enhancing a passenger's travel experience. Typically being disposed within a passenger seat 1382 (shown in FIGS. 9A-B) associated with a premium seat class, the seat electronics system 1385 can include an in-seat massage system (not shown) and/or at least one actuator system (not shown) for electrically (or electronically) adjusting a positioning of the passenger seat 1382. The seat electronics system 1385 is shown as receiving the output power 620G from the power conversion system 310. As the system resources of the vehicle information system 1300 are activated and/or deactivated over time, the input power 610 provided by the power source 200 and/or the output power 620A-N provided by the power conversion system 310 can dynamically change in the manner set forth above.

Figure 12:
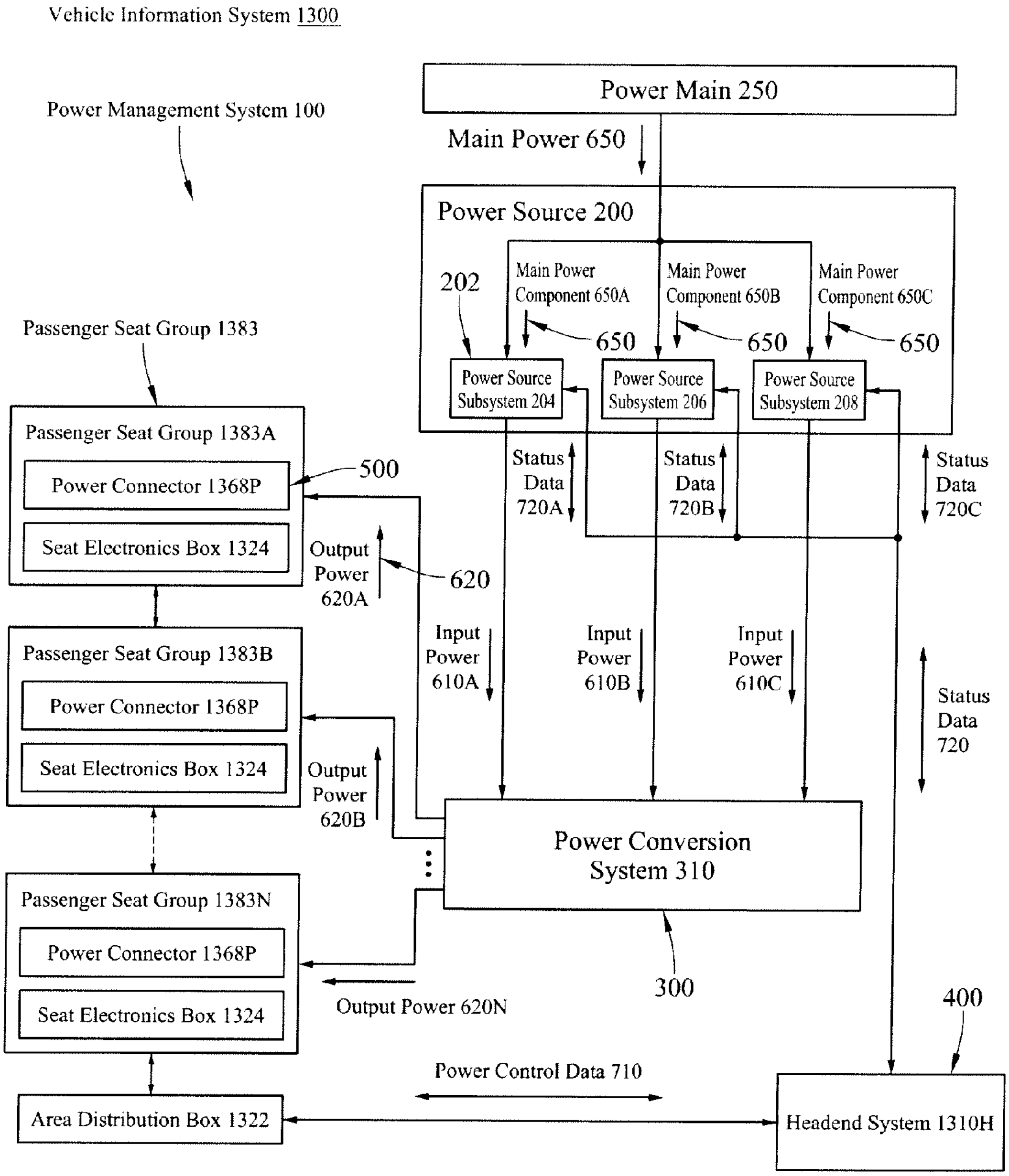
FIG. 12 is an exemplary block diagram illustrating another alternative embodiment of the power management system of FIG. 10, wherein the power management system receives multi-phase power and includes a power conversion system for converting the multi-phase power into the output power for a plurality of passenger seat groups.

Another alternative embodiment of the power management system 100 of FIG. 10 is illustrated in FIG. 12. Turning to FIG. 12, the power source 200 is shown as receiving main power 650 and as comprising a plurality of power source subsystems 202 being provided in the manner set forth in more detail above with reference to FIG. 6B. The main power 650 can be provided via at least one power main (or busbar) 250 and can comprise a predetermined number of main power components 650A-C. The total main power 650 available from each power main 250 typically is limited by a maximum power rating (and/or power budget) of the power main 250. If the main power 650 comprises multi-phase power, each main power component 650A-C can include a selected phase of the multi-phase main power 650. Each power source subsystem 202, in other words, can be configured to provide an input power 610 that comprises a single phase of alternating current (or AC) power. In one preferred embodiment, the main power 650 comprises three-phase power, and the power source subsystems 202 of the power source 200 are provided in a preselected multiple of three such that each phase of the main power 650 is associated with a uniform number of the power source subsystems 202. Thereby, the power source 200, for example, can include three, six, nine, twelve, and/or fifteen power source subsystems 202.

The power source subsystems 204, 206, 208 of the power source 200 are shown as receiving respective main power components 650A-C of the main power 650 and as converting the respective main power components 650A-C into associated input power 610A-C. The power source 200 thereby can provide the input power 610A-C to the power conversion system 310 and/or exchange status data 720 with the headend system 1310H in the manner discussed above. Each power source subsystem 204, 206, 208 is shown as being associated with a portion of the status data 720. Power source subsystem 204, for example, can exchange status data 720A with the headend system 1310H; whereas, power source subsystems 206, 208 can exchange status data 720B, 720C, respectively, with the headend system 1310H. The headend system 1310H thereby can exchange individualized status data 720A, 720B, 720C with each of the power source subsystems 204, 206, 208, respectively.

FIG. 12 also illustrates that the loads 500 can be arranged into one or more passenger seat groups 1383 of passenger seats 1382 (shown in FIGS. 9A-B) that can be distributed throughout the passenger cabin 1380 (shown in FIGS. 9A-B) of a passenger vehicle 1390 (shown in FIGS. 9A-B). As shown in FIG. 12, each passenger seat group 1383 can be associated with at least one seat electronics box 1324 and/or one or more power connectors 1368P. Preferably, a power connector 1368P is disposed adjacent to each passenger seat 1382 within a selected passenger seat group 1383; whereas, a seat electronics box 1324 can be associated with a plurality of passenger seats 1382 within the selected passenger seat group 1383. Output power 620 thereby can be made available at each passenger seat 1382 within the passenger seat group 1383 for personal electronic devices 1200 (shown in FIG. 9B) that are coupled with the power connectors 1368P. The power management system 100 advantageously can manage the output power 620 for all system resources (and/or components) associated with the passenger seats 1382, including personal electronic devices 1200 and/or seat electronics systems 1385 (shown in FIG. 11B).

The output power 620 provided to each respective passenger seat group 1383 preferably is suitable for supplying each system resource (and/or components) associated with the passenger seat group 1383, such as the seat electronics box 1324 and/or the power connectors 1368P. In other words, the output power 620A provided to the passenger seat group 1383A is compatible with each system resource associated with the passenger seat group 1383A; whereas, the output power 620B, . . . , 620N provided to the passenger seat groups 1383B, . . . , 1383N is compatible with the system resources associated with the respective passenger seat groups 1383B, . . . , 1383N. The output power 620 can be uniform and/or different among the passenger seat groups 1383. For example, passenger seat groups 1383 associated with a first seat group class can include premium system resources, such as the seat electronics system 1385, that may not be available to passenger seat groups 1383 associated with a second seat group class.

The seat electronics box 1324 preferably is the master of the in-seat network for the passenger seat group 1383 and can incorporate a suitable interface, such as an RS-485 interface, for supporting in seat network requirements defined in ARINC Specification No. 485P2 Cabin Equipment Interfaces (CEI) Physical Layer—In-Seat Protocol. Although the passenger seat groups 1383 and the headend system 1310H can communicate in any conventional manner, the passenger seat groups 1383A, 1383B, . . . , 1383N associated with the power conversion system 310 are shown as communicating with the headend system 1310H via a common area distribution box 1322. The headend system 1310H thereby exchanges power control data 710 with each of the passenger seat groups 1383A, 1383B, . . . , 1383N. The exchange of the power control data 710 permits the headend system 1310H to selectably disable one or more system resource associated with a predetermined passenger seat group 1383A, 1383B, . . . , 1383N in an effort to resolve an undesired power condition in the manner set forth above with reference to FIGS. 1 and 2.

Figures 1, 13:
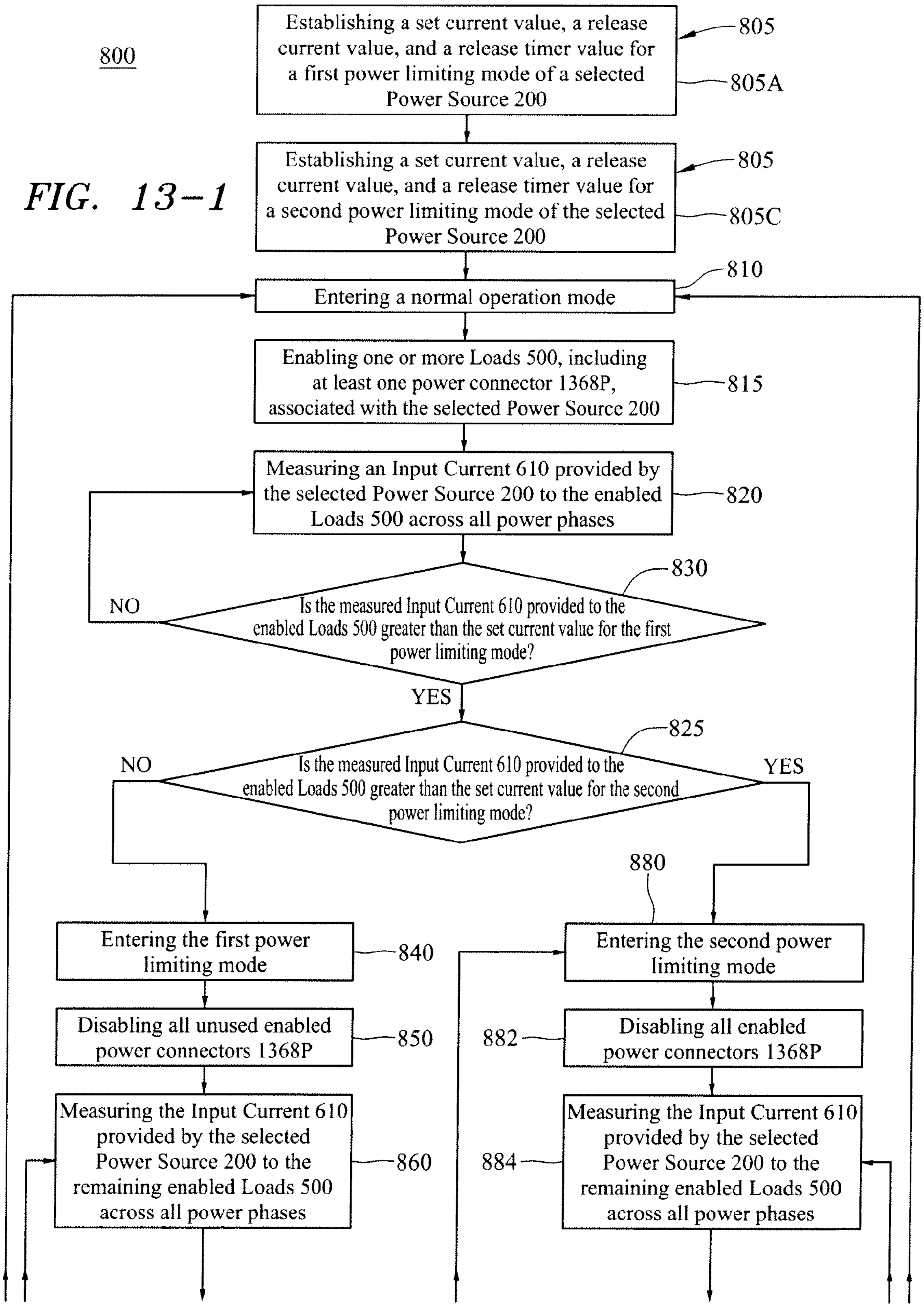
FIG. 13 is an exemplary top-level flow chart illustrating an embodiment of the power management method of FIG. 5B, wherein the method controls the conversion of the multi-phase power of FIG. 12 into the output power for the passenger seat groups.

An illustrative method 800 for managing the conversion of the multi-phase main power 650 (shown in FIG. 12) into the output power 620 is shown in FIG. 13. Selected processes within the power management method 800 of FIG. 13 are represented by reference designators that are common to the reference designators associated with selected processes within the power management method 800 of FIG. 5B. The use of common reference designators within the power management methods 800 is intended to represent that the associated processes can comprise equivalent processes. Turning to FIG. 13, the power management method 800 is illustrated as including, at 805, establishing the one or more operational parameters associated with first and second power limiting modes. The operational parameters can represent virtual operational boundaries for the power source subsystems 204, 206, 208 (shown in FIG. 12) of the power source 200 in terms of current for managing the power conversion. If the power management system 100 (shown in FIG. 12) includes more than one power source 200, operational parameters can be established for each power source 200, and the operational parameters can be uniform and/or different among the power sources 200.

In one embodiment, the operational parameters can be based upon a (theoretical) absolute maximum baseline power limit for a selected power source 200 across all phases of the multi-phase main power 650. To assist in managing power distribution in the form of current, the operational parameters can include establishing virtual operational parameters based upon the (theoretical) maximum baseline power limit, the (theoretical) maximum baseline current limit, or both for the selected power source 200. The (theoretical) maximum baseline current limit represents an operation current limit across all phases of the multi-phase main power 650. The virtual operational parameters for the selected power source 200, for instance, can comprise a predetermined percentage of the maximum baseline power limit and/or the maximum baseline current limit. The predetermined percentage can comprise any suitable percentage value (or percentage range) between 0% and 100%, inclusive. For example, the predetermined percentage can comprise ninety percent of the maximum baseline power and/or current limit. The numerical values cited throughout this specification are intended for purposes of illustration only and not for purposes of limitation.

As desired, the virtual operational parameters for the selected power source 200 can be dynamically adjusted in real-time to a greater and/or smaller value if the load conditions of the associated power main (or busbar) 250 (shown in FIG. 12) warrant. The virtual operational parameters for the selected power source 200 likewise can be adjusted based upon a priority of service of the resources (and/or components) of the vehicle information system 1300 (shown in FIG. 12). The virtual operational parameters for the selected power source 200 preferably establish boundaries that enable the power management system 100 to safely operate within the operational limits of the power main 250. Thereby, even if the power sources 200 are collectively capable of providing more power than that which is available from the power main 250 for distribution, the power management system 100 advantageously can implement a load assignment strategy for avoiding operational load conditions that exceed the available power budget of the power main 250.

As shown in FIG. 13, the selected operational parameters for the first power limiting mode, at 805A, can include a set current value, a release current value, and/or a release timer value in the manner discussed in more detail above with reference to the establishing, at 805A, as shown in FIG. 5B. The selected operational parameters for the second power limiting mode, at 805C, likewise can include a set current value, a release current value, and/or a release timer value in the manner set forth above with reference the establishing, at 805C. The release timer values of the first and second power limiting modes each can be provided as discussed above with reference to FIG. 5B. One illustrative manner for establishing the set current values and the release current values for the first and second power limiting modes of the selected power source 200 is shown and described with reference to FIG. 14.

Figure 14:
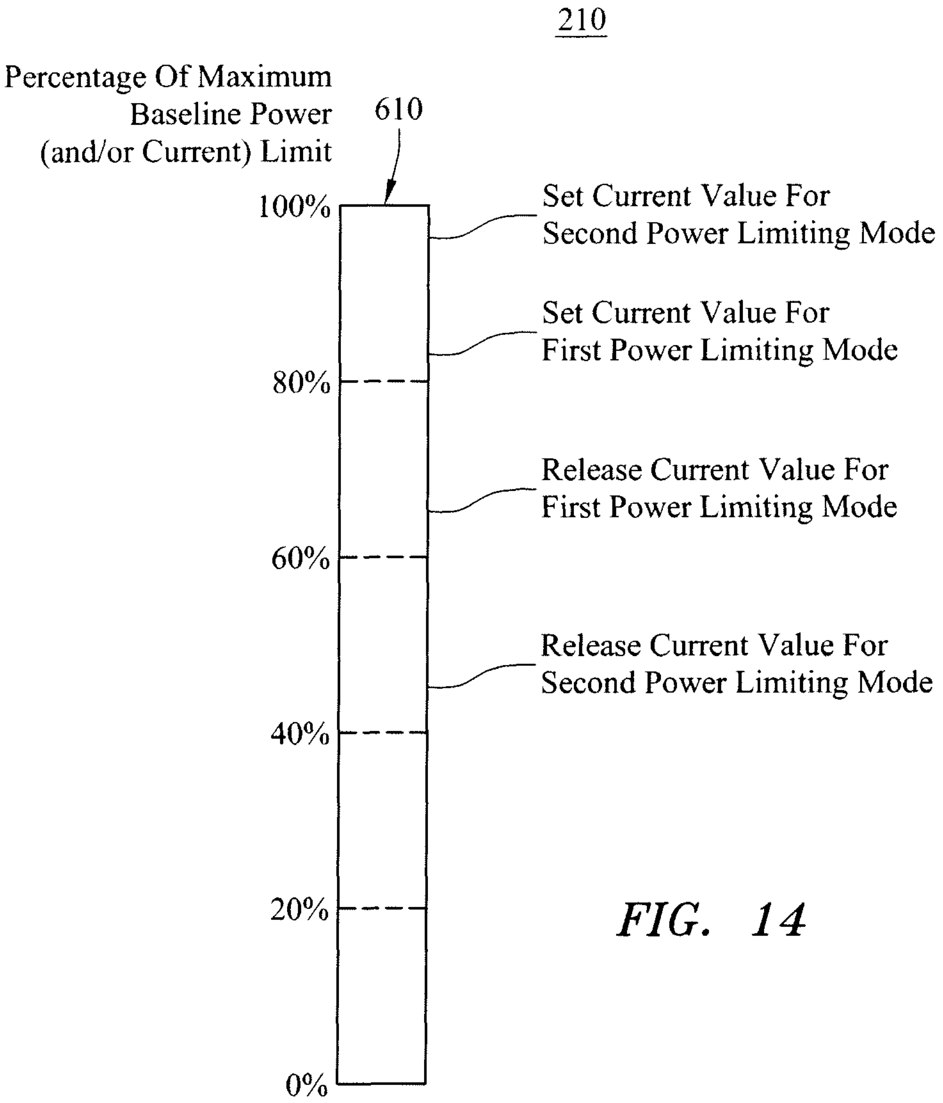
FIG. 14 is an exemplary detail drawing illustrating a current meter for establishing selected operational parameters for the first and second power limiting modes in accordance with the power management method of FIG. 13.

FIG. 14 illustrates an exemplary power (and/or current) meter 210 for the selected power source 200. The power meter 210 shows a total power (and/or current) limit range of the input power 610 that can be provided by the selected power source 200 across all power phases. The power (and/or current) limit range of the input power 610 is illustrated as a function of the maximum baseline power and/or current limit of the selected power source 200. As shown in FIG. 14, the input power 610 can range between 0% and 100%, inclusive, of the maximum baseline power and/or current limit. The set current value and the release current value for each power limiting mode thereby can be established within the maximum baseline power and/or current limits of the selected power source 200. The set current value and the release current value for the first power limiting mode preferably are disposed within the set current value and the release current value for the second power limiting mode as illustrated in FIG. 14.

Returning to FIGS. 12 and 13, the set current value and the release current value for each power limiting mode are established for each power source 200 to facilitate management of power (and/or current) distribution throughout the vehicle information system 1300 as set forth above. Preferably, the set current values and the release current values are established, at 805, relative to managing output power 620 provided to one or more associated power connectors 1368P. The set current value and the release current value for the first power limiting mode of a selected power source 200 represent a current boundary at the power source level, which, when detected, causes the power management system 100 to impose a first tier of power management by disabling all unused power connectors 1368P that receive output power 620 from the selected power source 200. A selected power connector 1368P can be deemed to be unused when no personal electronic device 1200 (shown in FIG. 9B) or other electronic device is connected with the power connector 1368P and/or when no output power 620 is being drawn from the power connector 1368P. Similarly, the set current value and the release current value for the second power limiting mode represent a second tier of power management, wherein, when detected, disables all power connectors 1368P that receive output power 620 from the selected power source 200.

As set forth above, the set current value and the release current value of the first and second power limiting modes for a selected power source 200 can be established, at 805, as a predetermined percentage of the maximum baseline power limit and/or the maximum baseline current limit of the selected power source 200 across all power phases. Alternatively, and/or additionally, the release current value can be established, at 805, as a predetermined current offset from the associated set current value. The release timer value of each power limiting mode can be established, at 805, to determine when the relevant power limiting mode can be exited, and the normal operation mode can be re-entered. Even if the resultant measured input current 610 becomes less than the release current value, at 870, the resultant measured input current 610 preferably is required to remain less than the release current value for at least a predetermined time interval before the normal operation mode can be re-entered. In other words, if the resultant measured input current 610 becomes greater than the release current value before the predetermined time interval elapses, the predetermined time interval terminates and can restart once the resultant measured input current 610 subsequently becomes less than the release current value.

In a preferred embodiment, the set current value and the release current value of the first and second power limiting modes for the selected power source 200 can be established, at 805, based at least in part on a seat class associated with the passenger seat groups 1383 that receive output power 620 from the selected power source 200. In other words, for a selected power source 200, the set current value of a relevant power limiting mode can comprise a first predetermined percentage of the maximum baseline power (and/or current) limit for passenger seat groups 1383 within a first seat class; whereas, the set current value of the relevant power limiting mode can comprise a second predetermined percentage of the maximum baseline power (and/or current) limit for passenger seat groups 1383 within a second seat class. Although the first and second predetermined percentages can comprise the same percentage, the set current value for passenger seat groups 1383 within a premium seat class preferably comprises a predetermined percentage of the maximum baseline power (and/or current) limit that is less than a predetermined percentage of the maximum baseline power (and/or current) limit that is associated with the set current value for passenger seat groups 1383 within an economy seat class.

For example, the set current value of the first power limiting mode can be established, at 805A, for passenger seat groups 1383 within the premium seat class at eighty percent of the maximum baseline power (and/or current) limit; whereas, the set current value of the first power limiting mode can be established, at 805A, for passenger seat groups 1383 within the economy seat class at eighty-five percent of the maximum baseline power (and/or current) limit. If the release current value of the first power limiting mode is established, at 805A, as a predetermined current offset of five amperes from the set current value, the release current value of the first power limiting mode can be established, at 805A, for passenger seat groups 1383 within the premium seat class at eighty percent of the maximum baseline power (and/or current) limit less the five-ampere current offset.

Similarly, the release current value of the first power limiting mode can be established, at 805A, for passenger seat groups 1383 within the economy seat class at eighty-five percent of the maximum baseline power (and/or current) limit less the five-ampere current offset. In one embodiment, a selection of the set current value and the release current value advantageously can provide a hysteresis effect for entering and/or exiting the first power limiting mode with a hysteresis value being equal to a difference between the set current value and the release current value. Use of hysteresis can help to inhibit instability within the power management system 100 (and/or power management method 800). The release timer value of the first power limiting mode can be uniformly established, at 805A, for each seat class at any suitable predetermined period of time in the manner set forth above and, for purposes of illustration only, can comprise ten seconds.

As desired, the set current value, release current value, and/or the release timer value for the second power limiting mode can be uniformly established, at 805B, for each seat class. An illustrative value for the set current value for the second power limiting mode can comprise ninety percent of the maximum baseline power (and/or current) limit; whereas, the release current value for the second power limiting mode can be established as a predetermined current offset of ten amperes from the set current value. In one embodiment, a selection of the set current value and the release current value advantageously can provide a hysteresis effect for entering and/or exiting the second power limiting mode with a hysteresis value being equal to a difference between the set current value and the release current value. Use of hysteresis can help to inhibit instability within the power management system 100 (and/or power management method 800). The release timer value of the second power limiting mode can be any suitable predetermined period of time in the manner set forth above and can comprise sixty seconds for purposes of illustration only. As set forth above, the numerical values cited for the set current value, release current value, and the release timer value for the first and second power limiting modes are intended for purposes of illustration only and not for purposes of limitation.

Under normal operating conditions, the power sources 200 typically can enter the first power limiting mode on a regular basis particularly if the power sources 200 can collectively provide more power than that which is available from the power main 250 for distribution. The power sources 200, however, generally will not routinely enter the second power limiting mode. The power sources 200 associated with the passenger seat groups 1383 within the premium seat class can enter the second power limiting mode, for example, due to the seat electronics system 1385 (shown in FIG. 11B) and other intermittent loads 500 that can present measurable short-term deviations in power consumption. Since the power consumption deviations have a short duration, these power sources 200 typically will remain in the second power limiting mode only for the predetermined period of time established by the release timer value for the second power limiting mode.

Once the selected operational parameters for the first and second power limiting modes have been established, the normal operation mode can be entered, at 810, in the manner set forth above with reference to FIG. 5B. In the normal operation mode, one or more of the loads 500, including at least one power connector 1368P, associated with the power source 200 can be enabled, at 815. The enabled power connectors 1368P can comprise all or a selected portion of the power connectors 1368P associated with the power source 200, and the selection of loads 500 that are enabled, at 815, can dynamically vary over time in the manner set forth above with reference to FIG. 5B. As desired, at least one of the enabled loads 500, including the enabled power connectors 1368P, can be independently deactivated and/or activated, which can affect a level of input current 610 provided by the power source 200. As a larger number of the enabled loads 500 becomes activated, the input current 610 can increase and approach the maximum power rating of the power source 200.

The power management method 800, at 820, includes measuring the input current 610 provided by the selected power source 200 to the enabled loads 500 across all power phases. The measurement of the input current 610, at 820, is discussed in more detail above with reference to the measurement, at 820, of FIG. 5B. The measured input current 610 can be compared with, at 830, with at least one operational parameter associated with the first power limiting mode and, at 825, with at least one operational parameter associated with the second power limiting mode in the manner set forth above. As shown in FIG. 13, for example, the operational parameters for the first and second power limiting modes can include respective set current values.

Thereby, if the input current 610 provided by the power source 200 is less than the set current value for the first power limiting mode, the normal operation mode can be maintained, and the input current 610 provided by the selected power source 200 to the enabled loads 500 can again be measured, at 820. If the input current 610 provided by the power source 200 is greater than the set current value for the second power limiting mode, the second power limiting mode, at 880, can be entered; whereas, the first power limiting mode, at 840, can be entered if the input current 610 provided by the power source 200 is greater than the set current value for the first power limiting mode but is less than the set current value for the second power limiting mode.

In the first power limiting mode, at least one of the unused enabled power connectors 1368P can be disabled, at 850. After one or more of the unused enabled power connectors 1368P has been disabled, the input current 610 provided by the selected power source 200 to the remaining enabled loads 500 can be measured across all power phases, at 860, and the resultant measured input current 610 can be compared, at 865, with the set current value for the second power limiting mode. If the resultant measured input current 610 is greater than the set current value for the second power limiting mode, the second power limiting mode can be entered, at 880. Otherwise, if the resultant measured input current 610 is less than the set current value for the second power limiting mode, the resultant measured input current 610 can be compared, at 870, with the release current value for the first power limiting mode. If the resultant measured input current 610 is greater than the release current value for the first power limiting mode (and less than the set current value for the second power limiting mode), the first power limiting mode can be maintained, and the input current 610 provided by the selected power source 200 to the remaining enabled loads 500 can again be measured, at 860.

When the resultant measured input current 610, at 870, is less than the release current value, the normal operation mode can be re-entered, at 810, wherein the disabled power connectors 1368P can again be enabled to receive input current 610 from the selected power source 200 in the manner discussed above. Preferably, the resultant measured input current 610 can be required to remain less than the release current value for at least a predetermined time interval before the normal operation mode can be re-entered. As illustrated in FIG. 13, the first power limiting mode can be maintained until the input current 610 provided by the power source 200 remains less than the release current value for a time interval that is greater than the release timer value. If the input current 610 remains less than the release current value throughout the time interval, the first power limiting mode can be exited, and the normal operation mode can be re-entered. Otherwise, the first power limiting mode continues until the input current 610 can remain less than the release current value until the time interval has elapsed and/or the input current 610 becomes greater the set current value for the second power limiting mode.

Upon entering the second power limiting mode, at 880, each of the enabled power connectors 1368P are disabled, at 882. The enabled power connectors 1368P can be disabled, at 882, regardless of whether the enabled power connectors 1368P are in use. After the enabled power connectors 1368P have been disabled, the input current 610 provided by the selected power source 200 to the remaining enabled loads 500 can be measured across all power phases, at 884, and the resultant measured input current 610 can be compared, at 886, with the release current value for the second power limiting mode. If the resultant measured input current 610 is greater than the release current value for the second power limiting mode, the second power limiting mode can be maintained, and the input current 610 provided by the selected power source 200 to the remaining enabled loads 500 can again be measured, at 884.

When the resultant measured input current 610, at 886, is less than the release current value of the second power limiting mode, the normal operation mode can be re-entered, at 810, wherein the disabled power connectors 1368P can again be enabled to receive input current 610 from the selected power source 200 in the manner discussed above. Preferably, the resultant measured input current 610 can be required to remain less than the release current value of the second power limiting mode for at least a predetermined time interval before the normal operation mode can be re-entered. As illustrated in FIG. 13, for example, the second power limiting mode can be maintained until the input current 610 provided by the power source 200 remains less than the release current value of the second power limiting mode for a time interval that is greater than the release timer value of the second power limiting mode.

If the input current 610 remains less than the release current value of the second power limiting mode throughout the time interval of the second power limiting mode, the second power limiting mode can be exited, and the normal operation mode can be re-entered. Otherwise, the second power limiting mode continues until the input current 610 can remain less than the release current value of the second power limiting mode until the time interval has elapsed. As desired, the second power limiting mode can transition into the first power limiting mode under appropriate circumstances. The power management method 800 thereby can comprise an incremental and/or hierarchical dynamic method for attempting to resolve undesired power conditions. Although shown and described with reference to FIGS. 12 and 13 as disabling one or more enabled power connectors 1368P that receive output power 620 from the selected power source 200 for purposes of illustration only, the power management method 800 can be configured to disable any suitable system resource (and/or component), including the system resources illustrated in FIG. 11B, of the vehicle information system 1300, as desired, upon entering a selected power limiting mode.

Figure 15A:
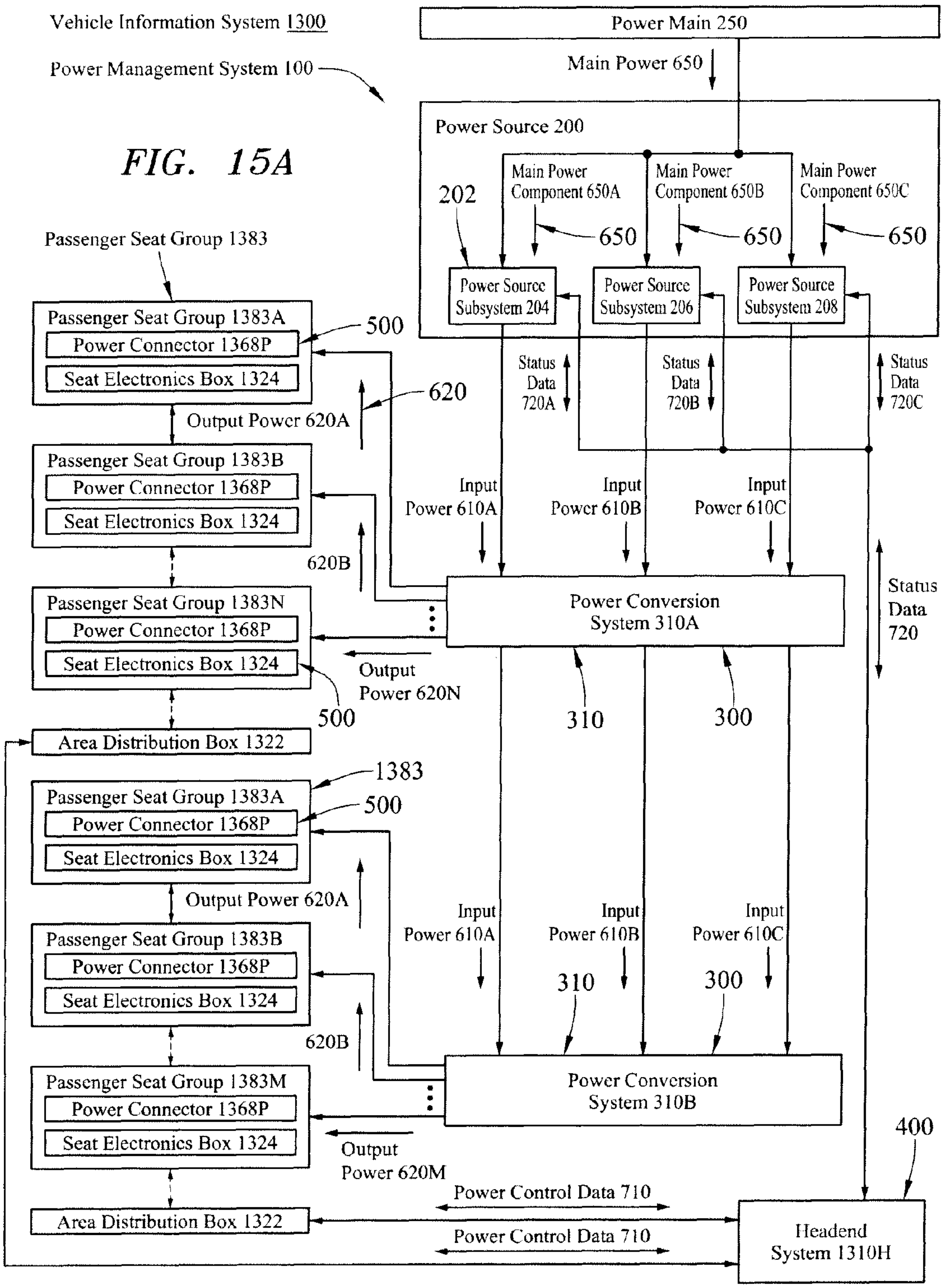
FIG. 15A is an exemplary block diagram illustrating an alternative embodiment of the power management system of FIG. 12, wherein the power management system includes a plurality of the power conversion systems for providing the output power to a plurality of passenger seat groups associated with respective area distribution boxes.
Figure 15B:
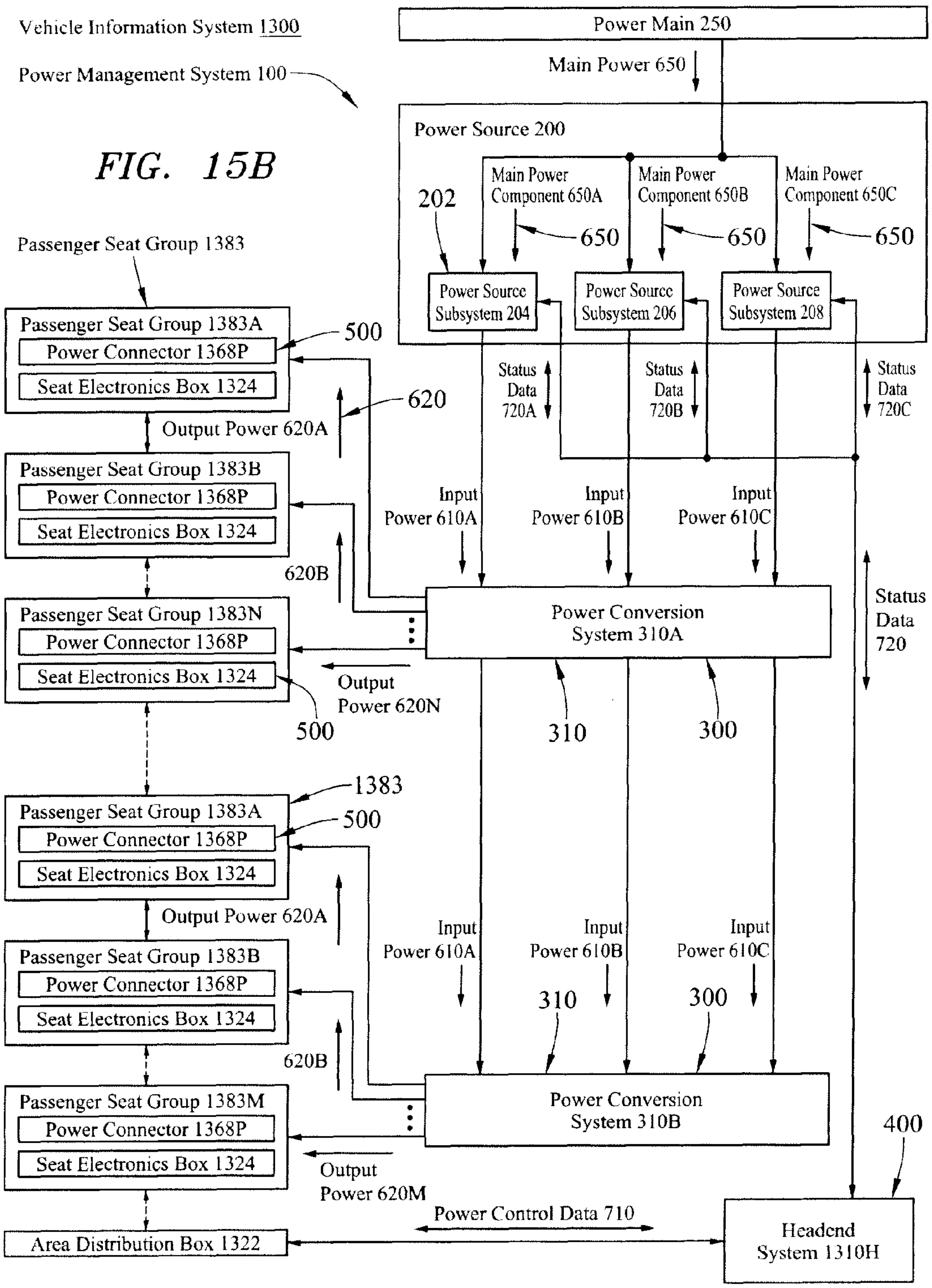
FIG. 15B is an exemplary block diagram illustrating another alternative embodiment of the power management system of FIG. 12, wherein the power management system includes a plurality of the power conversion systems for providing the output power to a plurality of passenger seat groups associated with a common area distribution box.

Turning to FIGS. 15A-B, the power management system 100 of FIG. 12 is shown as including a power distribution system 300 that comprises a plurality of power conversion systems 310. The power conversion systems 310 each can be provided in the manner set forth in more detail above with reference to FIG. 12 and are shown as being coupled with the power source 200 in conventional series arrangement. As illustrated in FIGS. 15A-B, power conversion system 310A can be coupled with the power source 200. The power conversion system 310A thereby can receive multi-phase input power 610 from the power source 200 and convert the multi-phase input power 610 into output power 620 suitable for use by loads 500 within an associated passenger seat group 1383. The power conversion system 310A likewise can provide (or pass-through) the multi-phase input power 610 to other system resources, including power conversion system 310B. Thereby, the power conversion system 310B also can receive the multi-phase input power 610 and convert the multi-phase input power 610 into output power 620 suitable for use by loads 500 within an associated passenger seat group 1383.

The headend system 1310H can exchange the status data 702 with the power source 200 and/or the power control data 710 with the loads 500 within the respective passenger seat groups 1383 in the manner set forth in more detail above with reference to FIG. 12. As illustrated in FIG. 15A, the headend system 1310H and the loads 500 within the passenger seat group 1383 associated with the power conversion system 310A can exchange the power control data 710 via a first area distribution box 1322; whereas, the headend system 1310H and the loads 500 within the passenger seat group 1383 associated with the power conversion system 310B can exchange the power control data 710 via a second area distribution box 1322. FIG. 15B shows the headend system 1310H exchanging the power control data 710 with the loads 500 within both passenger seat groups 1383 via a common area distribution box 1322. Although shown and described with reference to FIGS. 15A-B as comprising a series arrangement of two power conversion systems 310A, 310B for purposes of illustration only, the power distribution system 300 can include any suitable number of power conversion systems 310, which can be provided in any conventional configuration. Each power conversion system 310 preferably is configured to convert received multi-phase input power 610 into output power 620 suitable for use by loads 500 within a respective passenger seat group 1383 in the manner set forth above.

Figures 1, 16:
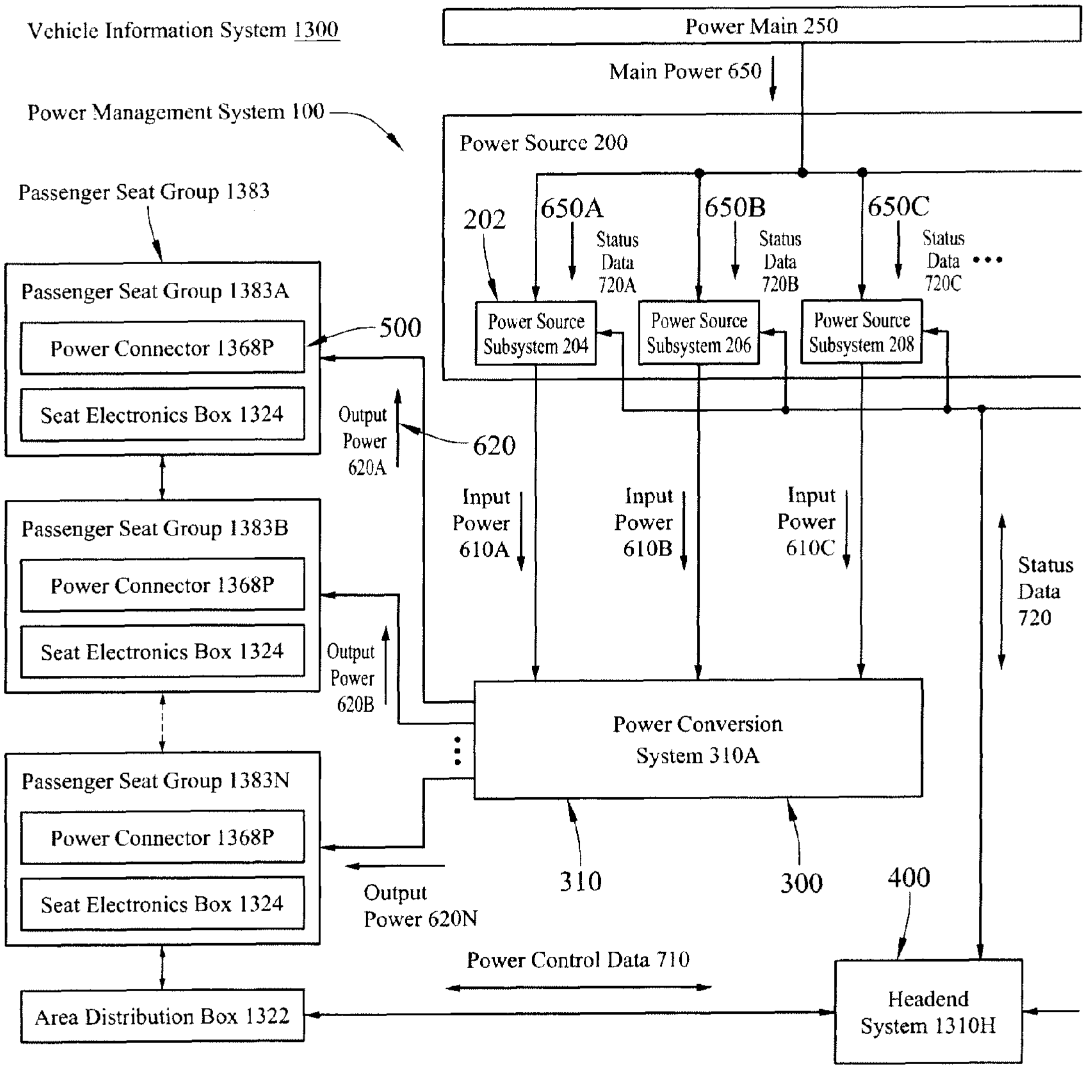
FIG. 16 is an exemplary block diagram illustrating still another alternative embodiment of the power management system of FIG. 12, wherein the power management system includes a plurality of the power conversion systems each being associated with respective power source subsystems.
Figure 16:
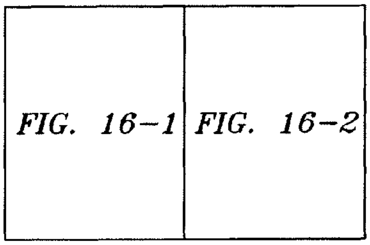
Figures 2, 16:
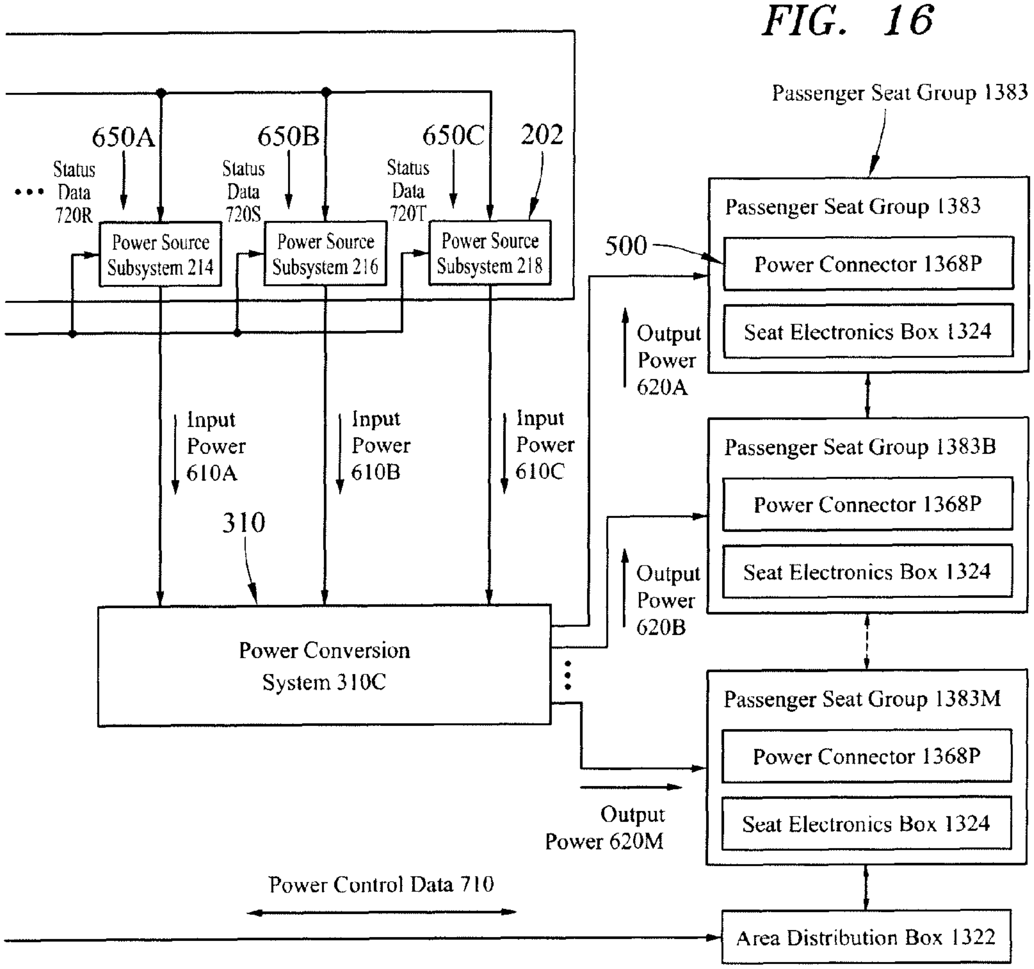

The power management system 100 of FIG. 16 likewise is shown as including a power distribution system 300 that comprises a plurality of power conversion systems 310. Each power conversion system 310 can be provided in the manner set forth in more detail above with reference to FIG. 12 and, as illustrated in FIG. 16, can be coupled with one or more respective power source subsystems 202 of the power source 200. In other words, the power source 200 can include a plurality of power source subsystems 202, and each power source subsystem 202 can be coupled with a relevant power conversion system 310. If the power source 200 provides multi-phase input power 610, each power conversion system 310 can be coupled with a plurality of power source subsystems 202, wherein each power source subsystem 202 provides a selected input power phase 610A, 610B, 610C of the multi-phase input power 610 to the power conversion system 310.

In one preferred embodiment, the main power 650 comprises three-phase power, and the power source subsystems 202 of the power source 200 are provided in a preselected multiple of three such that each phase of the main power 650 is associated with a uniform number of the power source subsystems 202. The power source subsystems 202 of the power source 200 thereby can be grouped into sets of three power source subsystems 202. Each set of three power source subsystems 202 thereby can be coupled with a relevant power conversion system 310, wherein each power source subsystem 202 in the set provides a respective input power phase 610A, 610B, 610C of the multi-phase input power 610 to the power conversion system 310.

As shown in FIG. 16, for instance, the power source 200 includes power source subsystem 204 for providing input power phase 610A to power conversion system 310A, power source subsystem 206 for providing input power phase 610B to the power conversion system 310A, and power source subsystem 208 for providing input power phase 610C to the power conversion system 310A. The power conversion system 310A thereby can receive multi-phase input power 610 from the power source 200 and convert the multi-phase input power 610 into output power 620 suitable for use by loads 500 within an associated passenger seat group 1383. Similarly, power source subsystems 214, 216, 218 are illustrated as respectively providing input power phases 610A, 610B, 610C to power conversion system 310C. The power conversion system 310C thereby also can receive the multi-phase input power 610 and convert the multi-phase input power 610 into output power 620 suitable for use by loads 500 within an associated passenger seat group 1383.

The headend system 1310H can exchange the status data 702 with the power source 200 and/or the power control data 710 with the loads 500 within the respective passenger seat groups 1383 in the manner set forth in more detail above with reference to FIG. 12. As discussed above, each power source subsystem 202 is shown as being associated with a portion of the status data 720. Power source subsystem 204, for example, can exchange status data 720A with the headend system 1310H; whereas, power source subsystems 206, 208 can exchange status data 720B, 720C, respectively, with the headend system 1310H. Similarly, power source subsystems 214, 216, 218 can exchange status data 720R, 720S, 720T, respectively, with the headend system 1310H. The headend system 1310H thereby can exchange individualized status data 720A, 720B, 720C, 720R, 720S, 720T with each of the power source subsystems 204, 206, 208, 214, 216, 218. As illustrated in FIG. 16, the headend system 1310H and the loads 500 within the passenger seat group 1383 associated with the power conversion system 310A can exchange the power control data 710 via a first area distribution box 1322; whereas, the headend system 1310H and the loads 500 within the passenger seat group 1383 associated with the power conversion system 310C can exchange the power control data 710 via a second area distribution box 1322.

Although shown and described with reference to FIG. 16 as comprising two power conversion systems 310A, 310C for purposes of illustration only, the power distribution system 300 can include any suitable number of power conversion systems 310. Each power conversion system 310 preferably is configured to receive multi-phase input power 610 from a respective set of power source subsystems 202 and to convert the received multi-phase input power 610 into output power 620 suitable for use by loads 500 within a respective passenger seat group 1383 in the manner set forth above. In other words, if the main power 650 comprises three-phase power, the power source 200 can provide three power source subsystems 202 for each power conversion systems 310, wherein the power source subsystems 202 provide the respective input power phases 610A, 610B, 610C to a relevant power conversion system 310. For example, the power source 200 can include three, six, nine, twelve, fifteen, etc. of the power source subsystems 202 depending upon the predetermined number of power conversion system 310 disposed within the power distribution system 300.

Figures 1, 17:
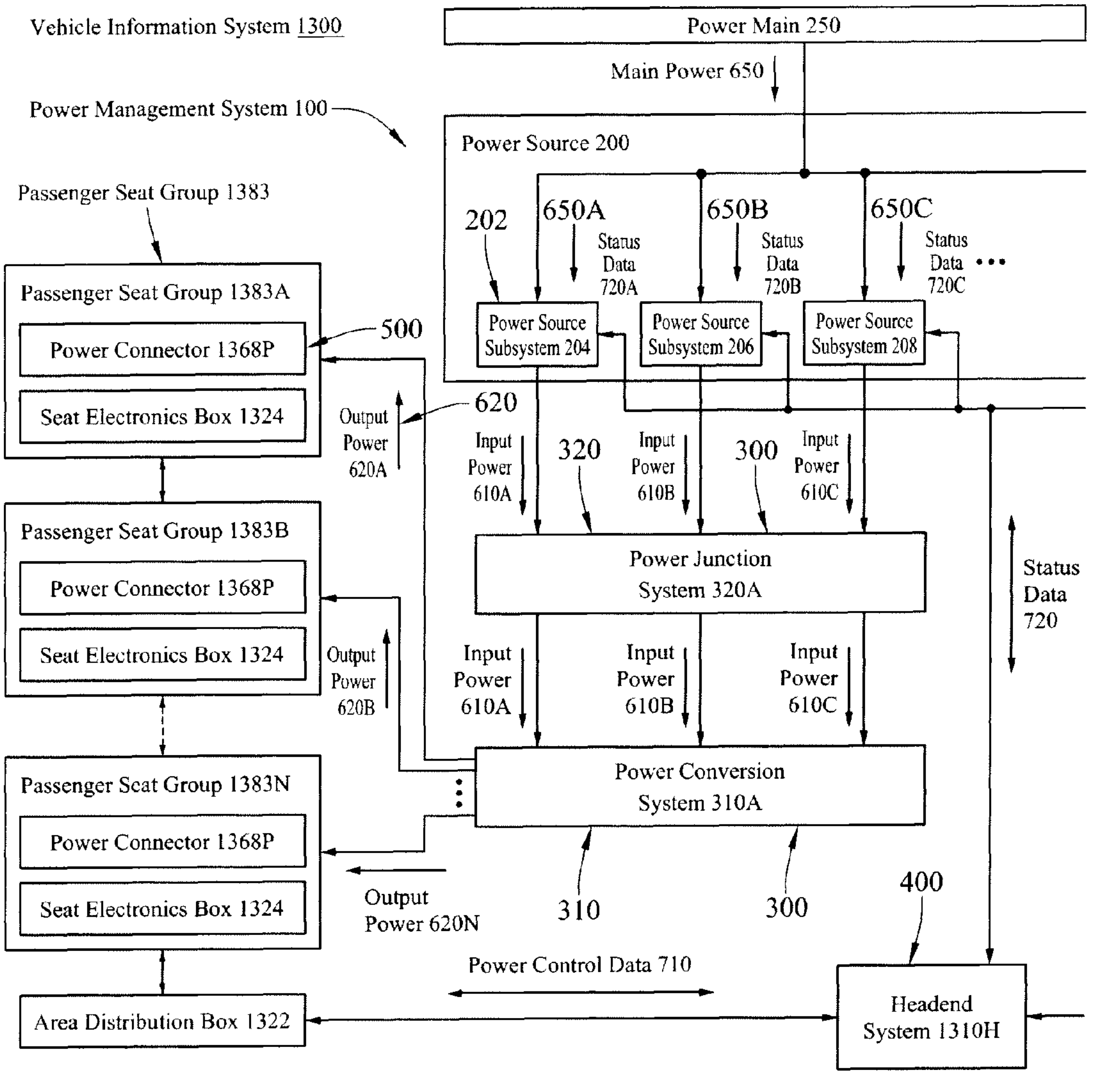
FIG. 17 is an exemplary block diagram illustrating still another alternative embodiment of the power management system of FIG. 12, wherein the power management system further includes a power junction system for coupling the power source with the power conversion system.
Figure 17:
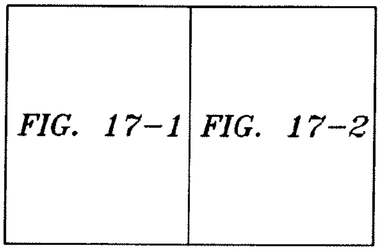
Figures 2, 17:
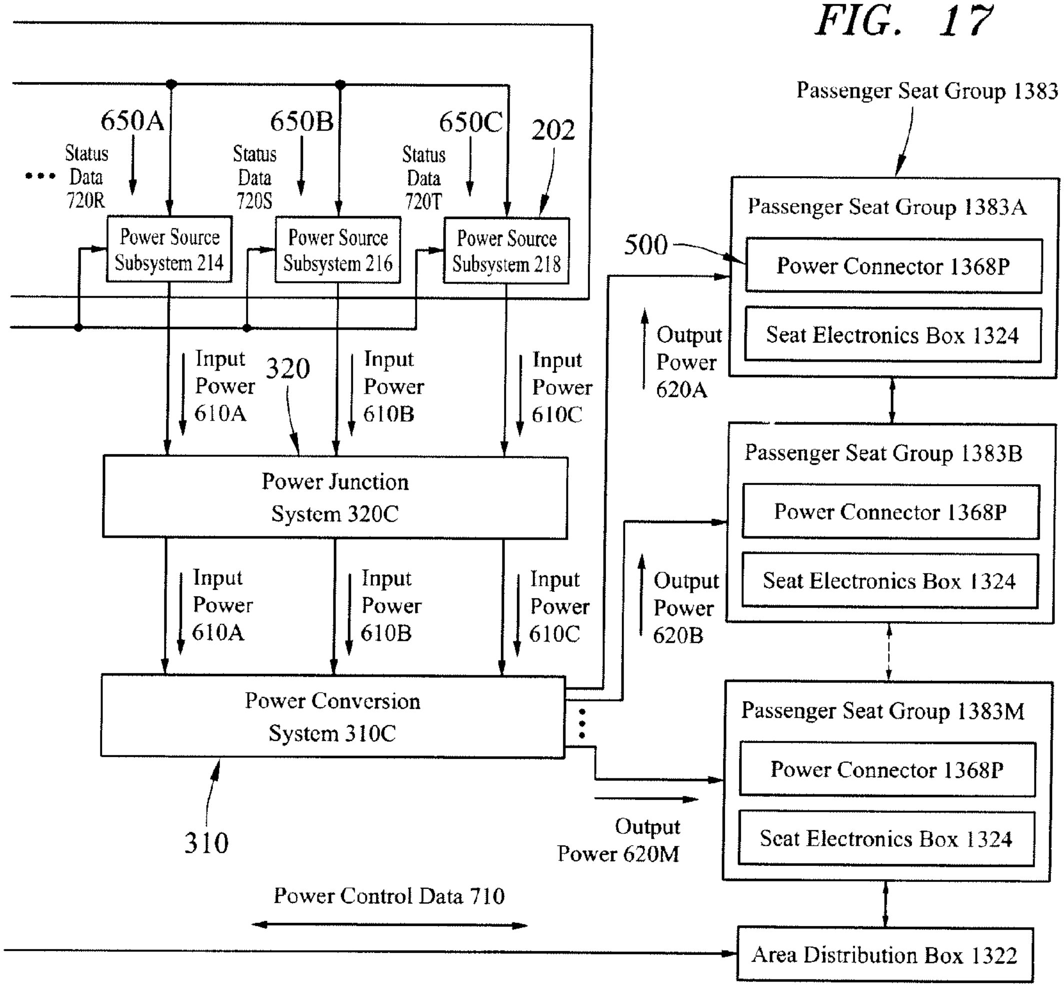

Turning to FIG. 17, the power management system 100 of FIG. 16 is shown as including a power distribution system 300 that further comprises at least one power junction system 320. Each power junction system 320 can be disposed between the power source 200 and one or more associated power conversion systems 310 and can distribute the multi-phase input power 610 from the power source 200 among the associated power conversion systems 310 and to selected other locations within the passenger cabin 1380 (shown in FIGS. 9A-B) of a passenger vehicle 1390 (shown in FIGS. 9A-B). As shown in FIG. 17, power junction system 320A couples power source subsystems 204, 206, 208 of the power source 200 with the power conversion system 310A; whereas, power source subsystems 214, 216, 218 of the power source 200 and the power conversion system 310C are coupled via power junction system 320C. Thereby, the power junction system 320A can provide the multi-phase input power 610A, 610B, 610C provided by the power source subsystems 204, 206, 208 to the power conversion system 310A, and the power junction system 320A can provide the multi-phase input power 610A, 610B, 610C provided by the power source subsystems 214, 216, 218 to the power conversion system 310C. The power conversion systems 310A, 310C can convert the multi-phase input power 610 into output power 620 suitable for use by loads 500 within respective associated passenger seat groups 1383 in the manner set forth in more detail above.

Figures 1, 18:
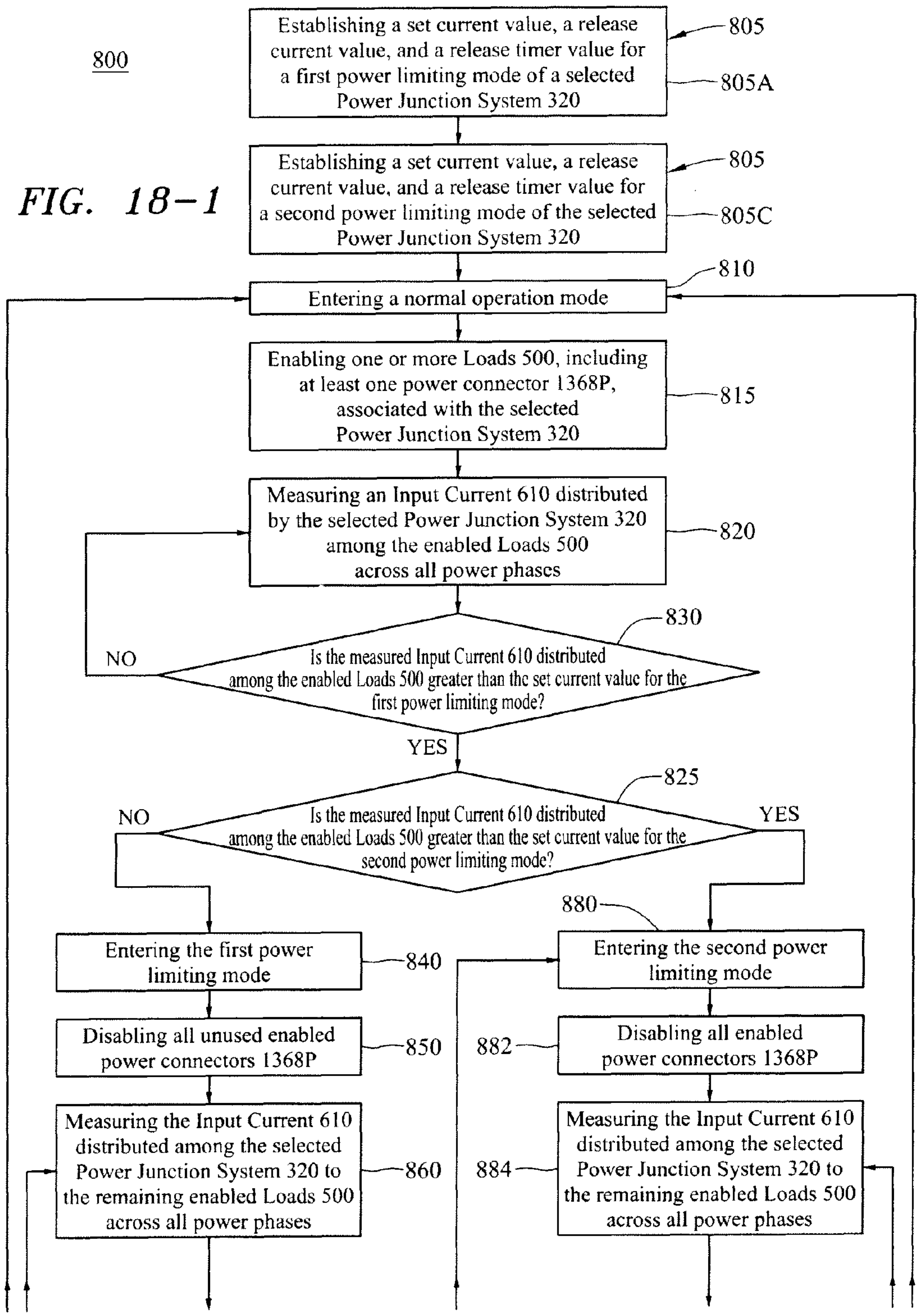
FIG. 18 is an exemplary top-level flow chart illustrating an embodiment of the power management method of FIG. 5B, wherein the method controls the distribution of the multi-phase power of FIG. 17 among the passenger seat groups.
Figures 2, 18:
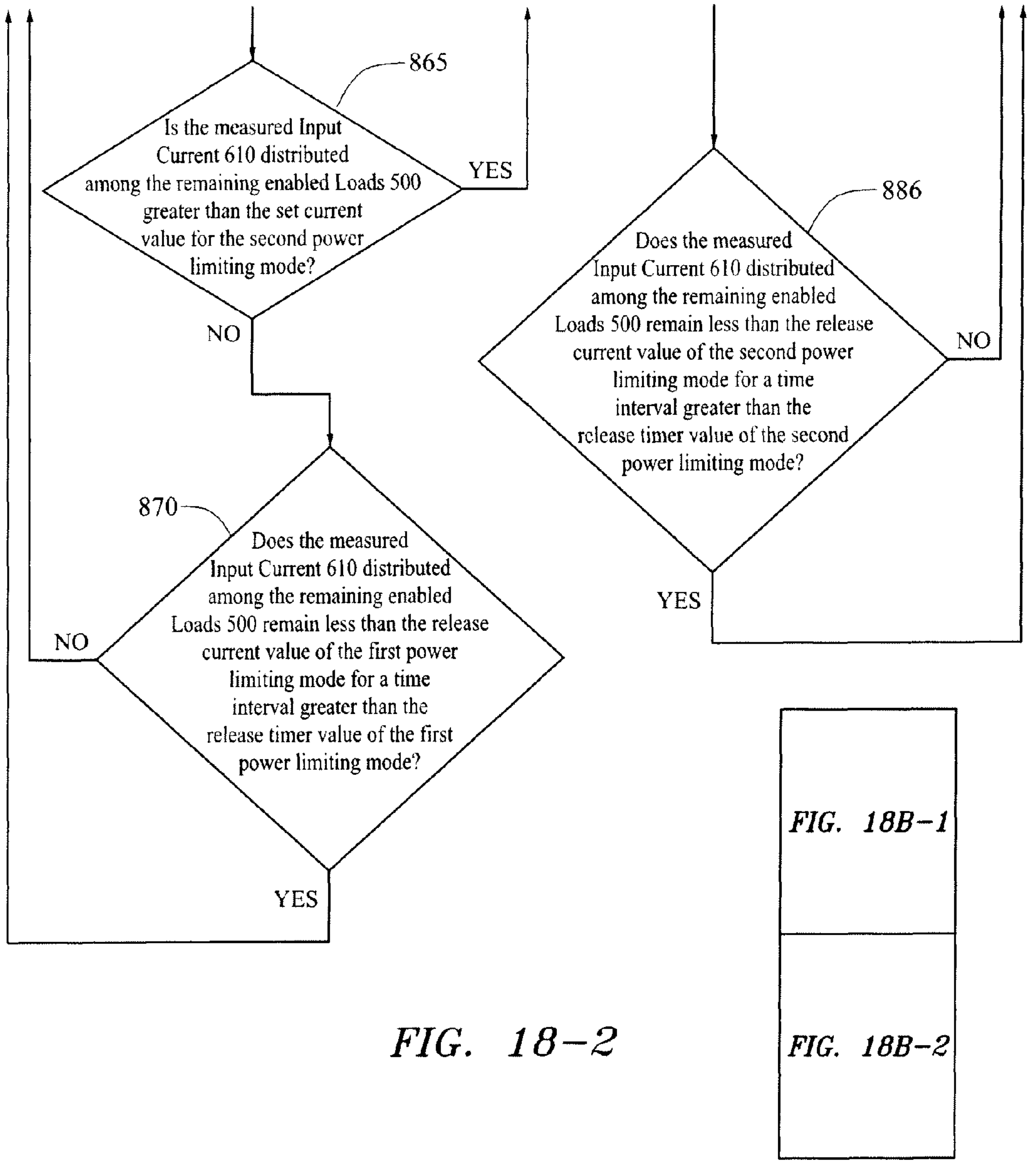

An illustrative method 800 for managing the distribution of the multi-phase input power 610 among the passenger seat groups 1383 is shown in FIG. 18. Selected processes within the power management method 800 of FIG. 18 are represented by reference designators that are common to the reference designators associated with selected processes within the power management method 800 of FIG. 5B. The use of common reference designators within the power management methods 800 is intended to represent that the associated processes can comprise equivalent processes. Turning to FIG. 18, the power management method 800 is illustrated as including, at 805, establishing the one or more operational parameters associated with first and second power limiting modes. The operational parameters can represent virtual operational boundaries for each power junction system 320 and for each input power phase 610A, 610B, 610C of the power junction system 320 in terms of current for managing the power distribution. If the power management system 100 (shown in FIG. 17) includes more than one power junction system 320, operational parameters can be established for each power junction system 320, and the operational parameters can be uniform and/or different among the power junction systems 320.

In one embodiment, the operational parameters can be based upon a (theoretical) absolute maximum baseline power limit for a selected power junction system 320 across all phases of the multi-phase input power 610. To assist in managing power distribution in the form of current, the operational parameters can include establishing virtual operational parameters based upon the (theoretical) maximum baseline power limit, the (theoretical) maximum baseline current limit, or both for the selected power junction system 320. The (theoretical) maximum baseline current limit represents an operation current limit across all phases of the multi-phase input power 610. The virtual operational parameters for the selected power junction system 320, for instance, can comprise a predetermined percentage of the maximum baseline power limit and/or the maximum baseline current limit. The predetermined percentage can comprise any suitable percentage value (or percentage range) between 0% and 100%, inclusive. For example, the predetermined percentage can comprise ninety percent of the maximum baseline power and/or current limit. As set forth above, the numerical values cited throughout this specification are intended for purposes of illustration only and not for purposes of limitation.

As desired, the virtual operational parameters for the selected power junction system 320 can be dynamically adjusted in real-time to a greater and/or smaller value if the load conditions of the associated power main (or busbar) 250 (shown in FIG. 17) warrant. The virtual operational parameters for the selected power junction system 320 likewise can be adjusted based upon a priority of service of the resources (and/or components) of the vehicle information system 1300 (shown in FIG. 17). The virtual operational parameters for the selected power junction system 320 preferably establish boundaries that enable the power management system 100 to safely operate within the operational limits of the power main 250. Thereby, even if the power junction systems 320 are collectively capable of distributing more power than that which is available from the power main 250, the power management system 100 advantageously can implement a load assignment strategy for avoiding operational load conditions that exceed an available power budget of the power main 250.

As shown in FIG. 18, the selected operational parameters for the first power limiting mode, at 805A, can include a set current value, a release current value, and/or a release timer value in the manner discussed in more detail above with reference to the establishing, at 805A, as shown in FIG. 5B. The selected operational parameters for the second power limiting mode, at 805C, likewise can include a set current value, a release current value, and/or a release timer value in the manner set forth above with reference the establishing, at 805C. The release timer values of the first and second power limiting modes each can be provided as discussed above with reference to FIG. 5B. One illustrative manner for establishing the set current values and the release current values for the first and second power limiting modes of the selected power junction system 320 is shown and described with reference to FIG. 19.

Figure 19:
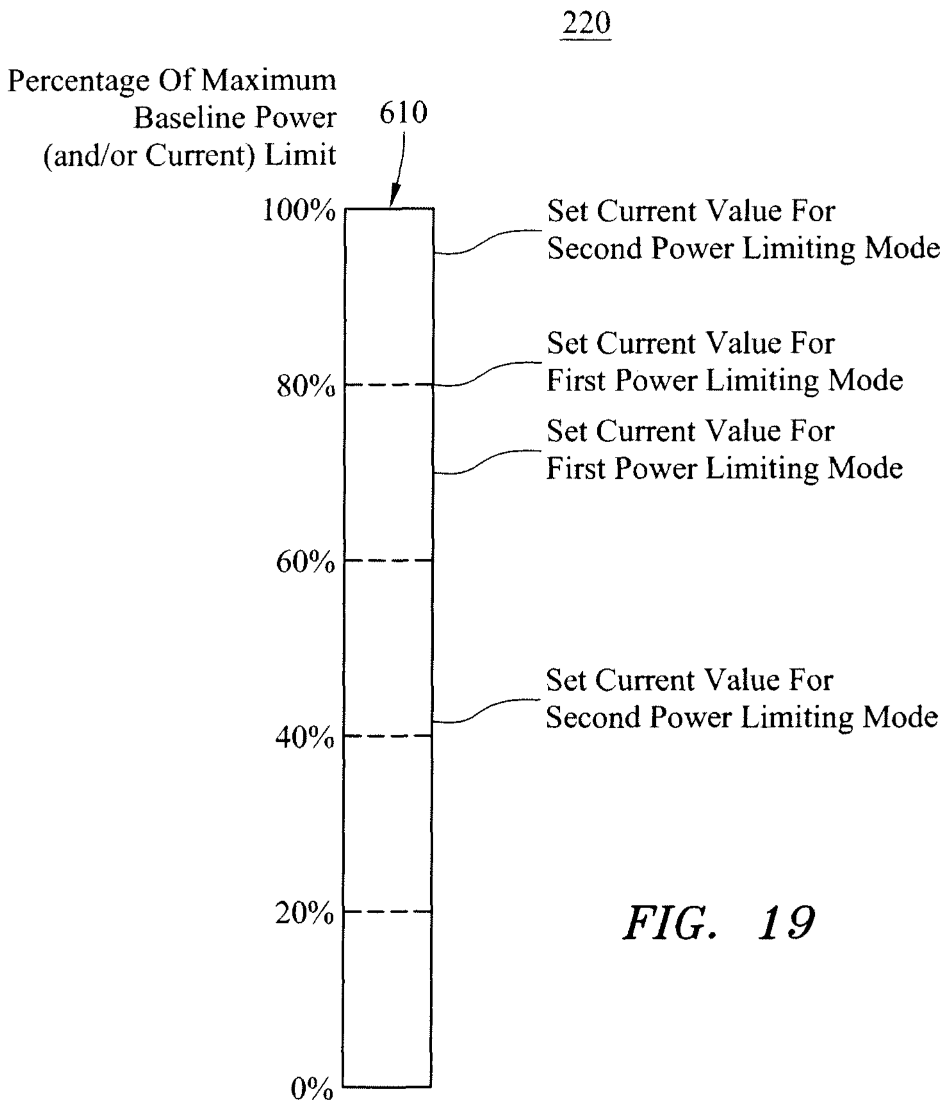
FIG. 19 is an exemplary detail drawing illustrating a current meter for establishing selected operational parameters for the first and second power limiting modes in accordance with the power management method of FIG. 18.

FIG. 19 illustrates an exemplary power (and/or current) meter 220 for the selected power junction system 320. The power meter 220 shows a total power (and/or current) limit range of the input power 610 that can be distributed by the selected power junction system 320 across all power phases. The power (and/or current) limit range of the input power 610 is illustrated as a function of the maximum baseline power and/or current limit of the selected power junction system 320. As shown in FIG. 19, the input power 610 can range between 0% and 100%, inclusive, of the maximum baseline power and/or current limit. The set current value and the release current value for each power limiting mode thereby can be established within the maximum baseline power and/or current limits of the selected power junction system 320. The set current value and the release current value for the first power limiting mode preferably are disposed within the set current value and the release current value for the second power limiting mode as illustrated in FIG. 19.

Returning to FIGS. 17 and 18, the set current value and the release current value for each power limiting mode are established for each power junction system 320 to facilitate management of power (and/or current) distribution throughout the vehicle information system 1300 as set forth above. Preferably, the set current values and the release current values are established, at 805, relative to managing output power 620 provided to one or more associated power connectors 1368P. The set current value and the release current value for the first power limiting mode of a selected power junction system 320 represent a current boundary at the power distribution level, which, when detected, causes the power management system 100 to impose a first tier of power management by disabling all unused power connectors 1368P that receive output power 620 via the selected power junction system 320. Similarly, the set current value and the release current value for the second power limiting mode represent a second tier of power management, wherein, when detected, disables all power connectors 1368P that receive output power 620 via the selected power junction system 320.

As set forth above, the set current value and the release current value of the first and second power limiting modes for a selected power junction system 320 can be established, at 805, as a predetermined percentage of the maximum baseline power limit and/or the maximum baseline current limit of the selected power junction system 320 across all power phases. Alternatively, and/or additionally, the release current value can be established, at 805, as a predetermined current offset from the associated set current value. The release timer value of each power limiting mode can be established, at 805, to determine when the relevant power limiting mode can be exited, and the normal operation mode can be re-entered. Even if the resultant measured input current 610 becomes less than the release current value, at 870, the resultant measured input current 610 preferably is required to remain less than the release current value for at least a predetermined time interval before the normal operation mode can be re-entered. In other words, if the resultant measured input current 610 becomes greater than the release current value before the predetermined time interval elapses, the predetermined time interval terminates and can restart once the resultant measured input current 610 subsequently becomes less than the release current value.

In a preferred embodiment, the set current value and the release current value of the first and second power limiting modes for the selected power junction system 320 can be established, at 805, based at least in part on a seat class associated with the passenger seat groups 1383 that receive output power 620 via the selected power junction system 320. In other words, for a selected power junction system 320, the set current value of a relevant power limiting mode can comprise a first predetermined percentage of the maximum baseline power (and/or current) limit for passenger seat groups 1383 within a first seat class; whereas, the set current value of the relevant power limiting mode can comprise a second predetermined percentage of the maximum baseline power (and/or current) limit for passenger seat groups 1383 within a second seat class. Although the first and second predetermined percentages can comprise the same percentage, the set current value for passenger seat groups 1383 within a premium seat class preferably comprises a predetermined percentage of the maximum baseline power (and/or current) limit that is less than a predetermined percentage of the maximum baseline power (and/or current) limit that is associated with the set current value for passenger seat groups 1383 within an economy seat class.

For example, the set current value of the second power limiting mode can be established, at 805C, at one hundred percent of the maximum baseline power (and/or current) limit. If the release current value of the second power limiting mode is established, at 805C, as a predetermined current offset of five amperes from the set current value, the release current value of the second power limiting mode can be established, at 805C, at one hundred percent of the maximum baseline power (and/or current) limit less the five-ampere current offset. The set current value and/or the release current value of the first power limiting mode can be established, at 805A, relative to the set current value and/or the release current value established, at 805C, for the second power limiting mode.

The set current value of the first power limiting mode, for instance, can be established as ninety percent of the set current value established for the second power limiting mode. In other words, when the set current value of the second power limiting mode is at one hundred percent of the maximum baseline power (and/or current) limit, the set current value of the first power limiting mode can be established at ninety percent of the maximum baseline power (and/or current) limit. If the release current value of the first power limiting mode is established, at 805A, as a predetermined current offset of one ampere from the set current value, the release current value of the first power limiting mode can be established, at 805A, at ninety percent of the maximum baseline power (and/or current) limit less the one-ampere current offset. In the manner set forth above with reference to FIGS. 12 and 13, the release timer values of the first and second power limiting modes can be established, at 805, at any suitable predetermined period of time and, for purposes of illustration only, can comprise ten seconds and sixty seconds, respectively.

Once the selected operational parameters for the first and second power limiting modes have been established, the normal operation mode can be entered, at 810, in the manner set forth above with reference to FIG. 5B. In the normal operation mode, one or more of the loads 500, including at least one power connector 1368P, associated with the power junction system 320 can be enabled, at 815. The enabled power connectors 1368P can comprise all or a selected portion of the power connectors 1368P associated with the power junction system 320, and the selection of loads 500 that are enabled, at 815, can dynamically vary over time in the manner set forth above with reference to FIG. 5B.

The power management method 800, at 820, includes measuring the input current 610 distributed by the selected power junction system 320 to the enabled loads 500 across all power phases. The measurement of the input current 610, at 820, is discussed in more detail above with reference to the measurement, at 820, of FIG. 5B. The measured input current 610 can be compared with, at 830, with at least one operational parameter associated with the first power limiting mode and, at 825, with at least one operational parameter associated with the second power limiting mode in the manner set forth above. As shown in FIG. 18, for example, the operational parameters for the first and second power limiting modes can include respective set current values.

Thereby, if the input current 610 distributed by the selected power junction system 320 is less than the set current value for the first power limiting mode, the normal operation mode can be maintained, and the input current 610 distributed by the selected power junction system 320 to the enabled loads 500 can again be measured, at 820. If the input current 610 distributed by the power junction system 320 is greater than the set current value for the second power limiting mode, the second power limiting mode, at 880, can be entered; whereas, the first power limiting mode, at 840, can be entered if the input current 610 distributed by the power junction system 320 is greater than the set current value for the first power limiting mode but is less than the set current value for the second power limiting mode.

In the first power limiting mode, at least one of the unused enabled power connectors 1368P can be disabled, at 850. After one or more of the unused enabled power connectors 1368P has been disabled, the input current 610 distributed by the selected power junction system 320 to the remaining enabled loads 500 can be measured across all power phases, at 860, and the resultant measured input current 610 can be compared, at 865, with the set current value for the second power limiting mode. If the resultant measured input current 610 is greater than the set current value for the second power limiting mode, the second power limiting mode can be entered, at 880. Otherwise, if the resultant measured input current 610 is less than the set current value for the second power limiting mode, the resultant measured input current 610 can be compared, at 870, with the release current value for the first power limiting mode. If the resultant measured input current 610 is greater than the release current value for the first power limiting mode (and less than the set current value for the second power limiting mode), the first power limiting mode can be maintained, and the input current 610 distributed by the selected power junction system 320 to the remaining enabled loads 500 can again be measured, at 860.

When the resultant measured input current 610, at 870, is less than the release current value, the normal operation mode can be re-entered, at 810, wherein the disabled power connectors 1368P can again be enabled to receive input current 610 from the selected power junction system 320 in the manner discussed above. Preferably, the resultant measured input current 610 can be required to remain less than the release current value for at least a predetermined time interval before the normal operation mode can be re-entered. As illustrated in FIG. 18, the first power limiting mode can be maintained until the input current 610 distributed by the power junction system 320 remains less than the release current value for a time interval that is greater than the release timer value. If the input current 610 remains less than the release current value throughout the time interval, the first power limiting mode can be exited, and the normal operation mode can be re-entered. Otherwise, the first power limiting mode continues until the input current 610 can remain less than the release current value until the time interval has elapsed and/or the input current 610 becomes greater the set current value for the second power limiting mode.

Upon entering the second power limiting mode, at 880, each of the enabled power connectors 1368P are disabled, at 882. The enabled power connectors 1368P can be disabled, at 882, regardless of whether the enabled power connectors 1368P are in use. After the enabled power connectors 1368P have been disabled, the input current 610 distributed by the selected power junction system 320 to the remaining enabled loads 500 can be measured across all power phases, at 884, and the resultant measured input current 610 can be compared, at 886, with the release current value for the second power limiting mode. If the resultant measured input current 610 is greater than the release current value for the second power limiting mode, the second power limiting mode can be maintained, and the input current 610 distributed by the selected power junction system 320 to the remaining enabled loads 500 can again be measured, at 884.

When the resultant measured input current 610, at 886, is less than the release current value of the second power limiting mode, the normal operation mode can be re-entered, at 810, wherein the disabled power connectors 1368P can again be enabled to receive input current 610 from the selected power junction system 320 in the manner discussed above. Preferably, the resultant measured input current 610 can be required to remain less than the release current value of the second power limiting mode for at least a predetermined time interval before the normal operation mode can be re-entered. As illustrated in FIG. 18, for example, the second power limiting mode can be maintained until the input current 610 distributed by the power junction system 320 remains less than the release current value of the second power limiting mode for a time interval that is greater than the release timer value of the second power limiting mode.

If the input current 610 remains less than the release current value of the second power limiting mode throughout the time interval of the second power limiting mode, the second power limiting mode can be exited, and the normal operation mode can be re-entered. Otherwise, the second power limiting mode continues until the input current 610 can remain less than the release current value of the second power limiting mode until the time interval has elapsed. As desired, the second power limiting mode can transition into the first power limiting mode under appropriate circumstances. The power management method 800 thereby can comprise an incremental and/or hierarchical dynamic method for attempting to resolve undesired power conditions.

In operation, the passenger seat group 1383 that is coupled with the power junction system 320A can be associated with the premium seat class; whereas, the passenger seat group 1383 that is coupled with the power junction system 320C can be associated with the economy seat class. The power management system 100 can monitor the levels of the multi-phase input power 610A, 610B, 610C distributed by the power junction systems 320 as personal electronic devices 1200 (shown in FIG. 9B) come on line in premium class. For each power junction system 320, the set current value of the first power limiting mode can define how many personal electronic devices 1200 can receive output power 620 via the power connectors 1368P. When the relevant power junction system 320 enters the first power limiting mode, the unused power connectors 1368P can be disabled, ensuring that no additional personal electronic devices 1200 can receive output power 620 via the power connectors 1368P until the power management system 100 returns to the normal operation mode.

The second power limiting mode of the power junction system 320 has a set current value that is greater than the set current value of the first power limiting mode. The power margin between the set current value of the first power limiting mode and the set current value of the second power limiting mode is reserved for accommodating the calculated maximum current requirements imposed by the resources (and/or components) of the vehicle information system 1300 that are connected to the power junction system 320. In other words, the power management system 100 assigns a higher priority to the resources of the vehicle information system 1300 than to the personal electronic devices 1200 coupled with the power connectors 1368P. The power allocation between the maximum current requirements of the system resources and the set current value of the first power limiting mode can be made available for use by the personal electronic devices 1200 and/or the seat electronics systems 1385 (shown in FIG. 11B). The power margin in the economy seat class typically is less than the power margin in the premium seat class. Accordingly, power availability for personal electronic devices 1200 in the economy seat class can be less than power availability for personal electronic devices 1200 in the premium seat class.

The second power limiting mode of the power junction system 320 can be entered when one or more seat electronics systems 1385 are activated. The input power 610 distributed by the power junction system 320 thereby can approach the set current value of the second power limiting mode. Upon entering the second power limiting mode, all power connectors 1368P coupled with the power junction system 320 can be disabled to permit usage of the seat electronics systems 1385. The personal electronic devices 1200 thereby are inhibited from receiving output power 620 via the disabled power connectors 1368P, and the power management system 100 avoids a potentially harmful power overload condition within the power source 200. The power management system 100 can continue to monitor the levels of the multi-phase input power 610 distributed by the power junction systems 320 upon entering the second power limiting mode.

When the power management system 100 detects the set current value of the second power limiting mode, the level of the input power 610 distributed by the power junction system 320 preferably remains less than the release current value of the second power limiting mode for at least a predetermined time interval defined by the release power value before the normal operation mode can be re-entered in the manner discussed in more detail above. During the predetermined time interval, activation of the seat electronics systems 1385 typically has subsided such that only system resources are active and can receive input power 610 via the power junction system 320. The power management system 100 can continue to monitor the level of the input power 610 distributed by the power junction system 320 upon returning to the normal operation mode. The power management system 100 preferably includes a re-connect feature. The re-connect feature enables the power connectors 1368P coupled with the power junction system 320. Thereby, the personal electronic devices 1200 can resume receiving output power 620 via the enabled power connectors 1368P. As needed, the power management system 100 can return the power junction system 320 to a selected power limiting mode where vehicle load conditions warrant.

In the economy seat class, intermittent loads, such as activation of the seat electronics system 1385, typically do not exist. Further, usage of personal electronic devices 1200 within the economy seat class commonly is less than usage of personal electronic devices 1200 within the premium seat class. The power junction system 320C that is associated with the economy seat class therefore rarely enters the second power limiting mode. As set forth above with reference to the premium seat class, the power management system 100 assigns a higher priority to the resources of the vehicle information system 1300 than to the personal electronic devices 1200 coupled with the power connectors 1368P in the economy class. Although the restrictions on power usage within the economy seat class are greater than the power restrictions within the premium seat class, the power allocation between the maximum current requirements of the system resources and the set current value of the first power limiting mode of the power junction system 320C can be made available for use by the personal electronic devices 1200 within the economy seat class.

Figure 20:
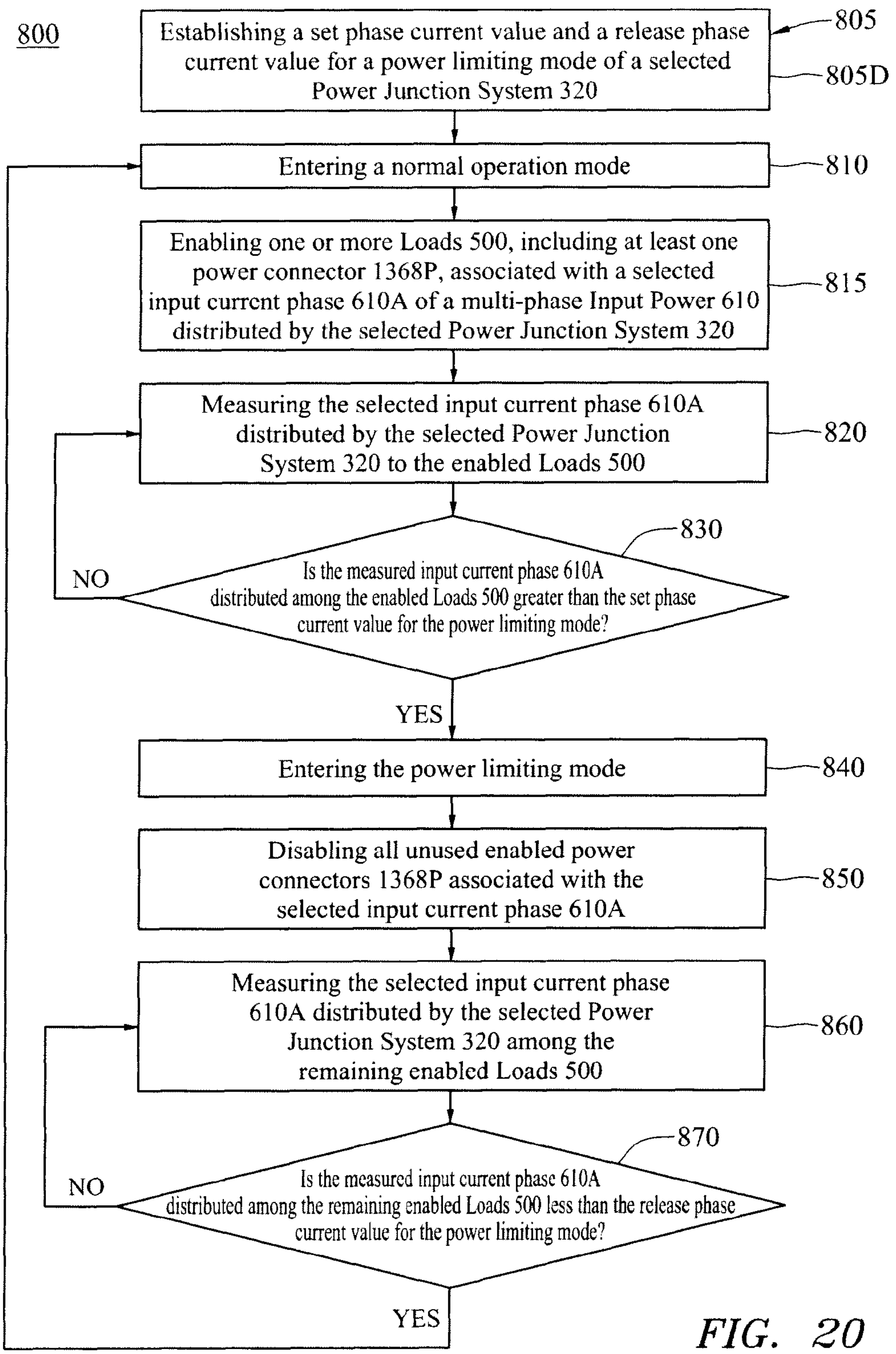
FIG. 20 is an exemplary top-level flow chart illustrating an embodiment of the power management method of FIG. 3, wherein the method controls the distribution of the multi-phase power of FIG. 17 among the passenger seat groups based upon a selected input power phase of the input power.

As desired, the power management system 100 likewise can manage the distribution of the multi-phase input power 610 by the power junction system 320 among the passenger seat groups 1383 at the phase level. In other words, the power management system 100 can support at least one power limiting mode based upon a selected input power (or current) phase, such as current phase 610A, of the input power 610 distributed by the power junction system 320. An illustrative method 800 for managing the distribution of the multi-phase input power 610 among the passenger seat groups 1383 based upon the selected current phase 610A is shown in FIG. 20. Selected processes within the power management method 800 of FIG. 20 are represented by reference designators that are common to the reference designators associated with selected processes within the power management method 800 of FIG. 3. The use of common reference designators within the power management methods 800 is intended to represent that the associated processes can comprise equivalent processes. Although shown and described with reference to the selected current phase 610A as distributed by a selected power junction system 320, the power management method 800 can manage the distribution of the multi-phase input power 610 by each a plurality of power junction systems 320 based upon one or more of the input power phases 610A, 610B, 610C of the input power 610.

Turning to FIG. 20, the power management method 800 is illustrated as including, at 805D, establishing one or more operational parameters associated with a power limiting mode. The operational parameters can represent virtual operational boundaries for the selected current phase 610A. As desired, operational parameters can be established for each input power phase 610A, 610B, 610C (shown in FIG. 17) of the input power 610, and the operational parameters can be uniform and/or different among the input power phases 610A, 610B, 610C. To assist in managing power distribution at the current phase level, the operational parameters can include establishing virtual operational parameters based upon a selected nominal (and/or maximum) power rating (and/or power budget) for the selected power junction system 320 (shown in FIG. 17) for the selected current phase 610A of the multi-phase input power 610. The virtual operational parameters for the selected power junction system 320, for instance, can be based upon a maximum current rating of a circuit breaker (not shown) of the power junction system 320.

As shown in FIG. 20, the selected operational parameters for the power limiting mode, at 805A, can include a set phase current value and a release phase current value in the manner discussed in more detail above with reference to the establishing, at 805, as shown in FIG. 3. The selected operational parameters likewise can include a release timer value as desired. Preferably, the set phase current value and the release phase current value for the selected current phase 610A are established, at 805D, relative to managing output power 620 provided to one or more associated power connectors 1368P. The set phase current value and the release phase current value for the power limiting mode of a selected power junction system 320 represent a current boundary at the power distribution level, which, when detected, causes the power management system 100 to impose a tier of power management by disabling all unused power connectors 1368P that receive output power 620 via the selected power junction system 320.

The set phase current value of the power limiting mode, for example, can be established, at 805D, as a predetermined percentage of the maximum current rating of the circuit breaker of the power junction system 320 for the selected current phase 610A. The predetermined percentage can comprise any suitable percentage value (or percentage range) between 0% and 100%, inclusive. For example, the predetermined percentage can comprise eighty-five percent of the maximum current rating. As set forth above, the numerical values cited throughout this specification are intended for purposes of illustration only and not for purposes of limitation. If the release phase current value of the power limiting mode is established, at 805D, as a predetermined current offset of one ampere from the set phase current value, the release phase current value of the power limiting mode can be established, at 805D, at eighty-five percent of the maximum current rating less the one-ampere current offset.

Once the selected operational parameters for the power limiting modes have been established, the normal operation mode can be entered, at 810, in the manner set forth above with reference to FIG. 3. In the normal operation mode, one or more of the loads 500, including at least one power connector 1368P, associated with the selected current phase 610A of the multi-phase input power 610 distributed by the power junction system 320 can be enabled, at 815. The enabled power connectors 1368P can comprise all or a selected portion of the power connectors 1368P associated with the selected current phase 610A, and the selection of loads 500 that are enabled, at 815, can dynamically vary over time in the manner set forth above with reference to FIG. 3.

The power management method 800, at 820, includes measuring the selected current phase 610A distributed by the selected power junction system 320 to the enabled loads 500. The measurement of the input current 610, at 820, is discussed in more detail above with reference to the measurement, at 820, of FIG. 3. The measured current phase 610A can be compared with, at 830, with the set phase current value of the power limiting mode in the manner set forth above. Thereby, if the selected current phase 610A distributed by the selected power junction system 320 is less than the set phase current value for the power limiting mode, the normal operation mode can be maintained, and the selected current phase 610A distributed by the selected power junction system 320 to the enabled loads 500 can again be measured, at 820. If the selected current phase 610A distributed by the power junction system 320 is greater than the set phase current value for the limiting mode, the power limiting mode, at 840, can be entered.

In the power limiting mode, at least one of the unused enabled power connectors 1368P can be disabled, at 850. After one or more of the unused enabled power connectors 1368P has been disabled, the selected current phase 610A distributed by the selected power junction system 320 to the remaining enabled loads 500 can be measured, at 860, and the resultant measured current phase 610A can be compared, at 870, with the release phase current value for the power limiting mode. If the resultant measured current phase 610A is greater than the release phase current value for the power limiting mode, the power limiting mode can be maintained, and the selected current phase 610A distributed by the selected power junction system 320 to the remaining enabled loads 500 can again be measured, at 860. When the resultant measured current phase 610A, at 870, is less than the release phase current value, the normal operation mode can be reentered, at 810, wherein the disabled power connectors 1368P can again be enabled to receive the selected current phase 610A from the selected power junction system 320 in the manner discussed above. The power management method 800 thereby can comprise an incremental and/or hierarchical dynamic method for attempting to resolve undesired power conditions.

Figures 1, 21A:
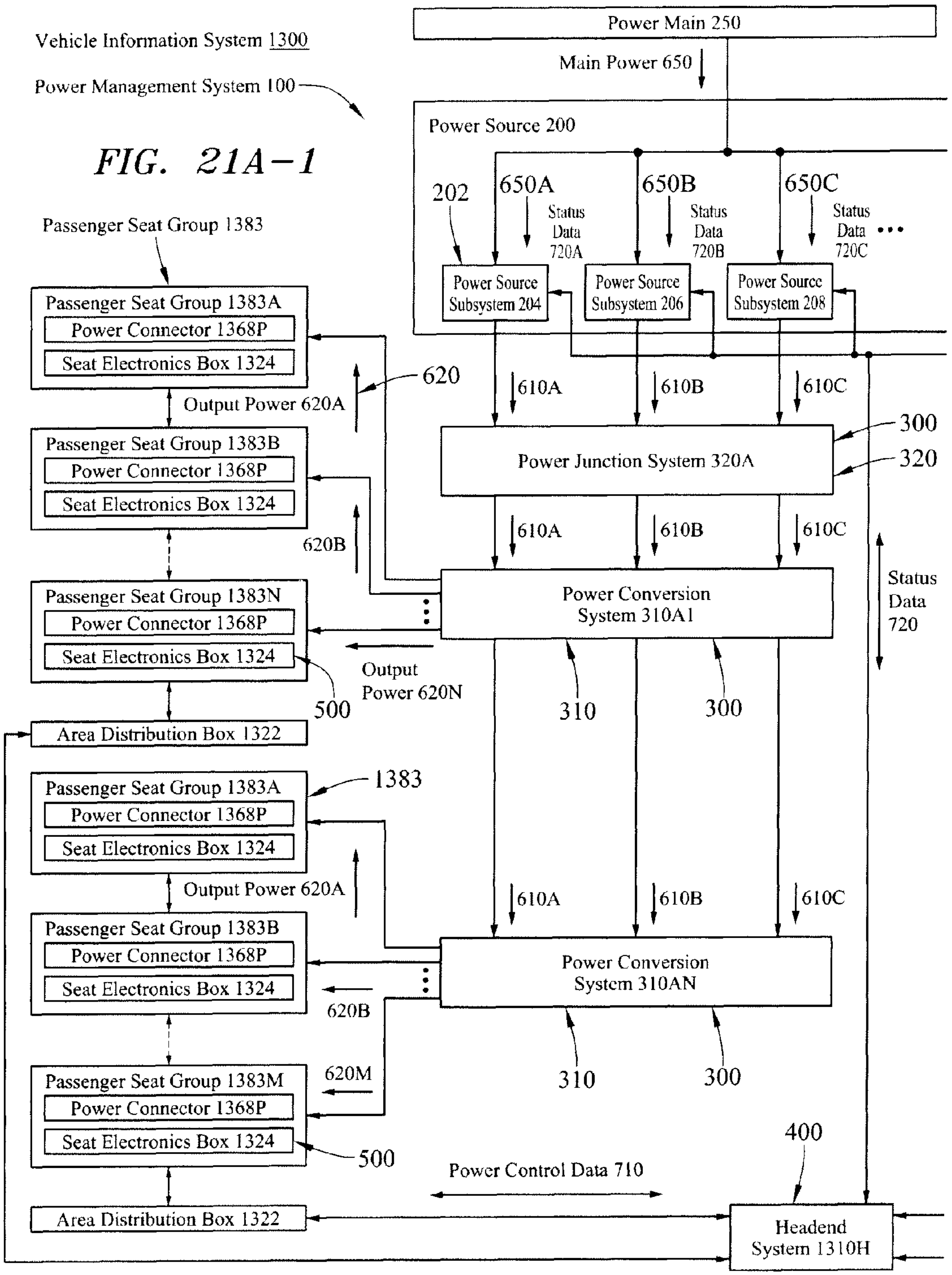
FIG. 21A is an exemplary block diagram illustrating an alternative embodiment of the power management system of FIG. 17, wherein the power junction system couples the power source with a plurality of the power conversion systems in a series configuration.
Figures 1, 21B:
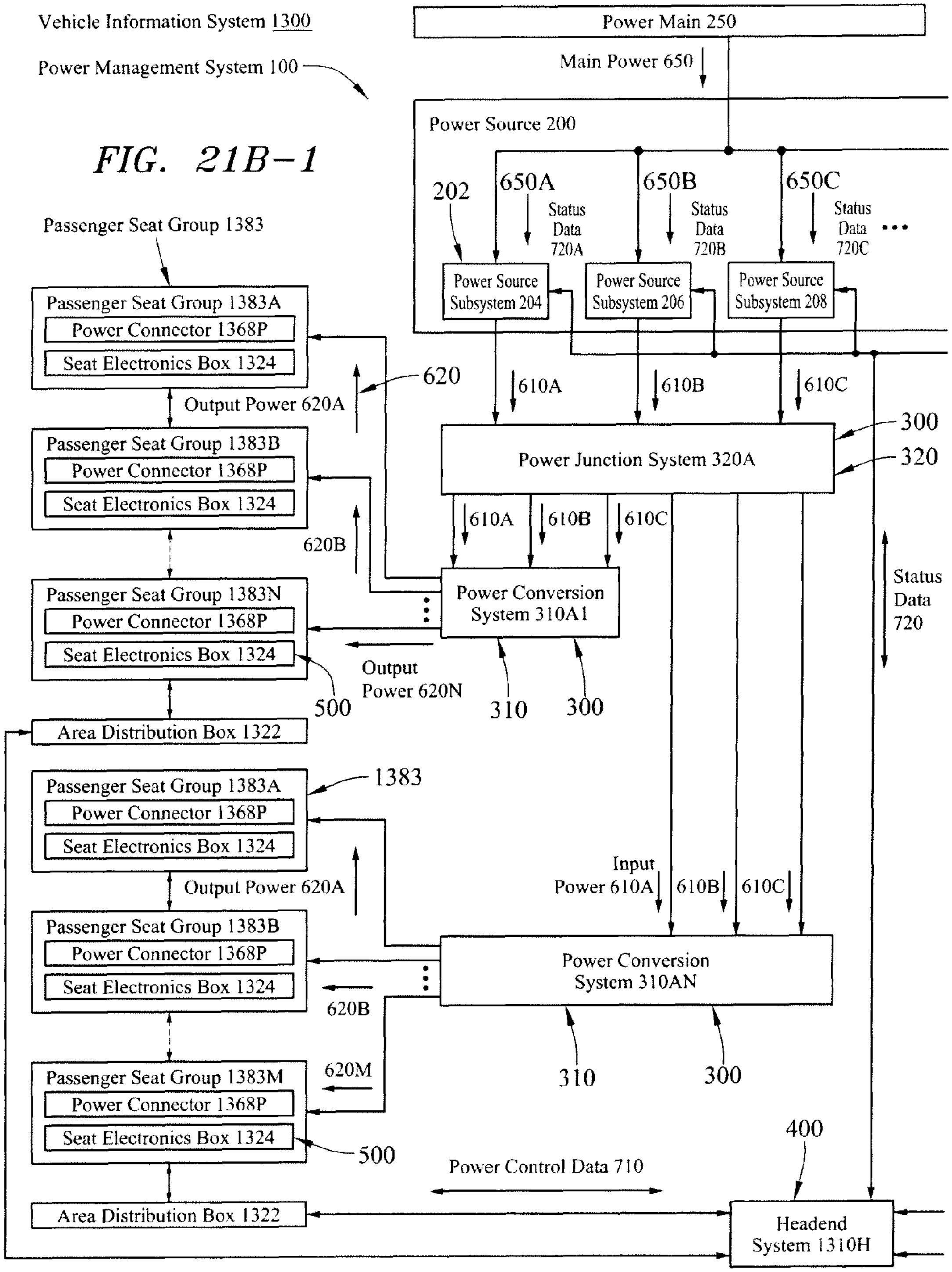
FIG. 21B is an exemplary block diagram illustrating an alternative embodiment of the power management system of FIG. 17, wherein the power junction system couples the power source with a plurality of the power conversion systems in a parallel configuration.
Figures 2, 21B:
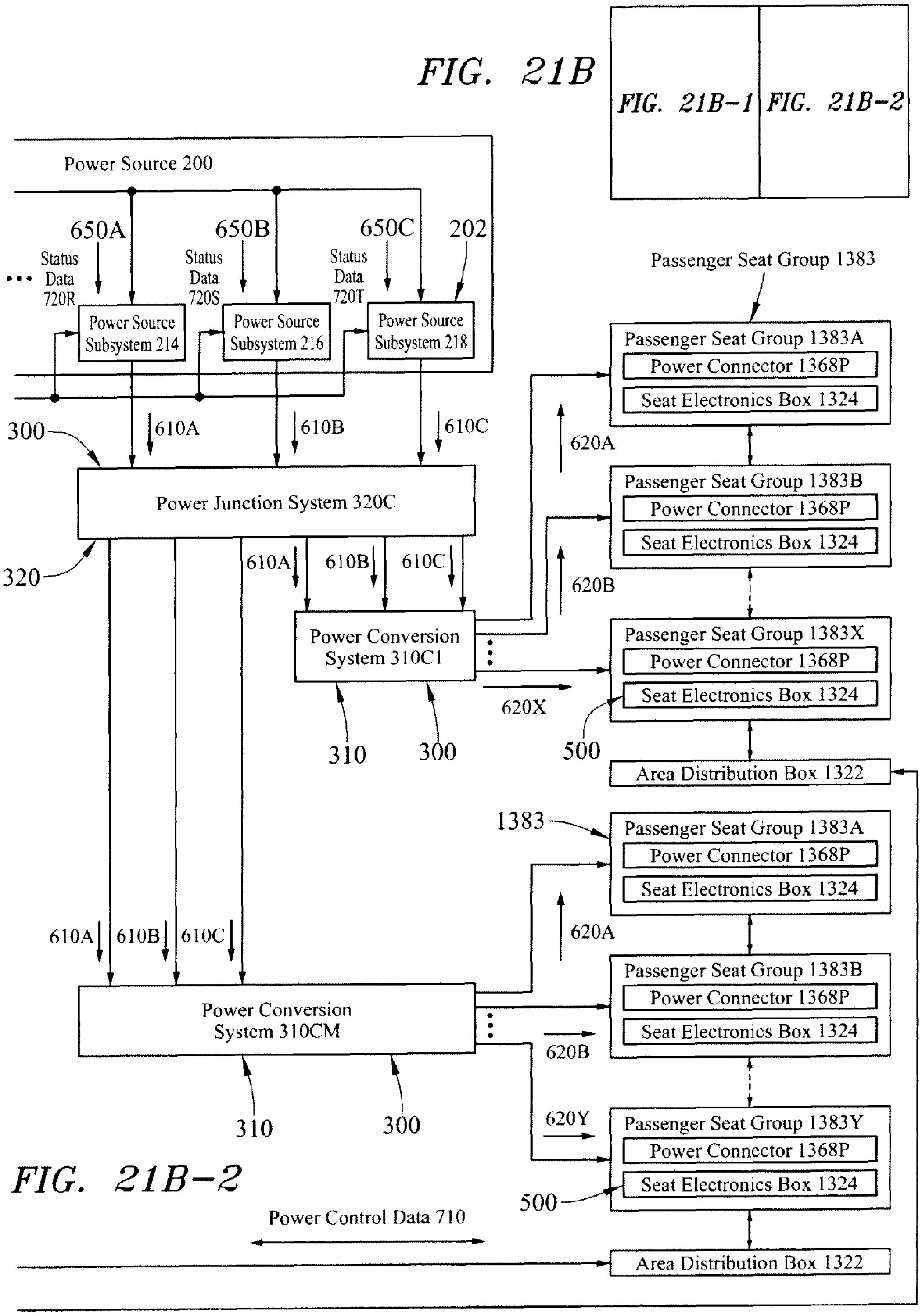

Turning to FIGS. 21A-B, the power management system 100 of FIG. 17 is shown as including a power distribution system 300 with a plurality of power conversion systems 310 coupled with each power junction system 320. In other words, the power junction system 320A is coupled with power conversion systems 310A1, . . . , 310AN; whereas, the power junction system 320C is coupled with power conversion systems 310C1, . . . , 310AM. The power conversion systems 310 and the power junction systems 320 each can be provided in the manner set forth in more detail above. As illustrated in FIGS. 21A-B, the power junction system 320A can be disposed between the power source 200 and the associated power conversion systems 310A1, . . . , 310AN and can distribute the multi-phase input power 610 from the power source subsystems 204, 206, 208 among the power conversion systems 310A1, . . . , 310AN in the manner discussed above. The power junction system 320C similarly is shown as being disposed between the power source 200 and the associated power conversion systems 310C1, . . . , 310CM and as distributing the multi-phase input power 610 from the power source subsystems 214, 216, 218 among the power conversion systems 310C1, . . . , 310CM. The power conversion systems 310 thereby can convert the multi-phase input power 610 into output power 620 suitable for use by loads 500 within respective associated passenger seat groups 1383 in the manner set forth in more detail above.

Each power junction system 320 can be coupled with, and distribute the multi-phase input power 610 among, the associated power conversion systems 310 in any conventional manner. The power conversion systems 310 shown in FIG. 21A, for example, are coupled with the respective power junction systems 320 in a series arrangement. In other words, the power conversion systems 310A1, . . . , 310AN are connected in series with the power junction system 320A; whereas, the power conversion systems 310C1, . . . , 310CM are connected in series with the power junction system 320C. The power conversion systems 310 likewise can be coupled with the respective power junction systems 320 in a parallel arrangement as illustrated in FIG. 21B. The power junction system 320A, for instance, can include a plurality of communication connectors (or ports) (not shown) for coupling with the power conversion systems 310A1, . . . , 310AN, respectively. As desired, the power junction system 320C likewise can include a plurality of communication connectors (or ports) (not shown) for respectively coupling with the power conversion systems 310C1, . . . , 310CM.

Figure 22A:
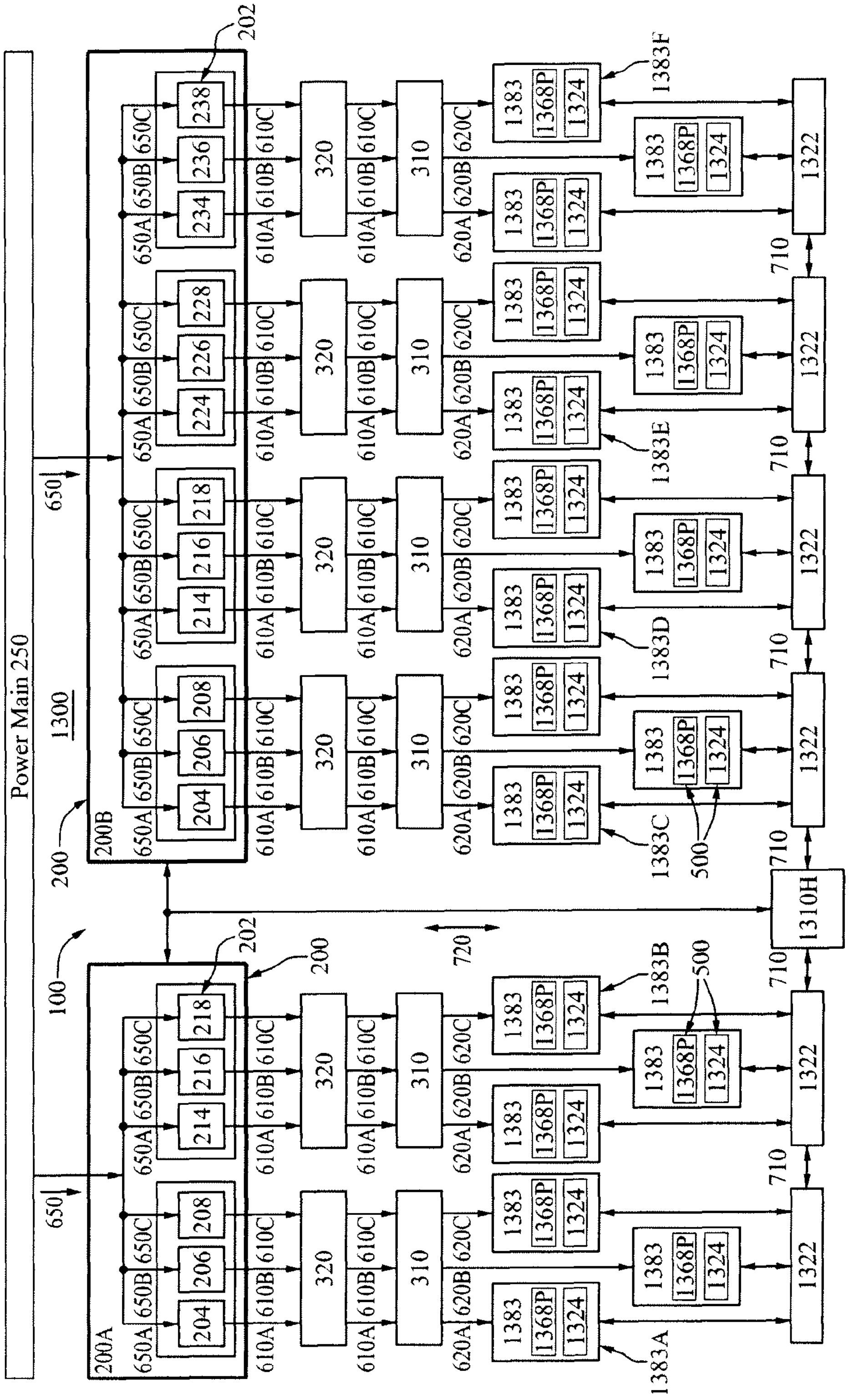
FIG. 22A is an exemplary block diagram illustrating another alternative embodiment of the power management system of FIG. 17, wherein the power management system includes a plurality of power sources.

Turning to FIG. 22A, the power management system 100 is shown as being provided in the manner set forth above with reference to FIG. 17 and further comprises a plurality of power sources 200. Each power source 200 can be provided in the manner discussed above. More particularly, the power sources 200 each can include a plurality of power source subsystems 202, wherein each power source subsystem 202 provides a selected input power phase 610A, 610B, 610C of the multi-phase input power 610 to the power conversion system 310. In one preferred embodiment, the main power 650 comprises three-phase power, and the power source subsystems 202 of each power source 200 can be provided in a preselected multiple of three such that each phase of the main power 650 is associated with a uniform number of the power source subsystems 202.

Power source 200A, for example, is shown as including six power source subsystems 202. The power source subsystems 202 are shown as comprising power source subsystems 204, 206, 208 and power source subsystems 214, 216, 218. Each source subsystem 202 can receive a selected main power component 650A-C of the multi-phase main power 650 and can provide an associated input power phase 610A of the multi-phase input power 610 in the manner discussed above. As illustrated in FIG. 22A, the power source subsystem 204 can receive main power component 650A and can provide the input power phase 610A, the power source subsystem 206 can receive main power component 650B and can provide the input power phase 610B, and the power source subsystem 208 can receive main power component 650C and can provide the input power phase 610C. The power source subsystems 214, 216, 218 similarly can respectively receive the main power components 650A, 650B, 650C and provide the input power phases 610A, 610B, 610C of the multi-phase input power 610.

The power source subsystems 204, 206, 208 and power source subsystems 214, 216, 218 can provide the multi-phase input power 610 to respective power conversion systems 310 via power junction systems 320, and each power conversion system 310 can convert the multi-phase input power 610 into output power 620 suitable for use by loads 500 within an associated passenger seat group 1383 in the manner discussed in more detail above. In other words, the power source subsystems 204, 206, 208 can provide multi-phase input power 610 to a selected power conversion system 310, and the power conversion system 310 can convert the multi-phase input power 610 into output power 620 suitable for use by loads 500 within passenger seat group 1383A. The power source subsystems 214, 216, 218 can provide multi-phase input power 610 to another selected power conversion system 310 that can convert the multi-phase input power 610 into output power 620 suitable for use by loads 500 within a second passenger seat group 1383B.

The power source 200B of FIG. 22A includes twelve power source subsystems 202. The power source subsystems 202 can comprise power source subsystems 204, 206, 208, power source subsystems 214, 216, 218, power source subsystems 224, 226, 228, and power source subsystems 234, 236, 238. In the manner set forth above with reference to power source 200A, each source subsystem 202 can receive a selected main power component 650A-C of the multi-phase main power 650 and can provide an associated input power phase 610A of the multi-phase input power 610. The power source subsystems 204, 214, 224, 234, for instance, each can receive the main power component 650A of the multi-phase main power 650 and can provide the associated input power phase 610A of the multi-phase input power 610. The power source subsystems 206, 216, 226, 236 and the power source subsystems 208, 218, 228, 238 can respectively receive the main power components 650B, 650C of the multi-phase main power 650 and provide the associated input power phases 610B, 610C of the multi-phase input power 610.

The power source subsystems 204, 206, 208, power source subsystems 214, 216, 218, power source subsystems 224, 226, 228, and power source subsystems 234, 236, 238 can provide the resultant multi-phase input power 610 to respective power conversion systems 310 via power junction systems 320, and each power conversion system 310 can convert the multi-phase input power 610 into output power 620 suitable for use by loads 500 within an associated passenger seat group 1383 as discussed above. As illustrated in FIG. 22A, the power source subsystems 204, 206, 208 can provide multi-phase input power 610 to a selected power conversion system 310 that can convert the multi-phase input power 610 into output power 620 suitable for use by loads 500 within passenger seat group 1383C; whereas, the power source subsystems 214, 216, 218 can provide multi-phase input power 610 to another selected power conversion system 310 that can convert the multi-phase input power 610 into output power 620 suitable for use by loads 500 within another passenger seat group 1383D. The power source subsystems 224, 226, 228 and the power source subsystems 234, 236, 238 likewise can provide multi-phase input power 610 to power conversion systems 310, which can convert the multi-phase input power 610 into output power 620 suitable for use by loads 500 within passenger seat groups 1383E, 1383F, respectively.

The headend system 1310H can exchange the status data 702 with the power source 200 and/or the power control data 710 with the loads 500 within the respective passenger seat groups 1383A-F in the manner set forth in more detail above with reference to FIG. 16. As discussed above, each power source subsystem 202 within each power source 200A, 200B can be associated with a portion of the status data 720. In one preferred embodiment, the headend system 1310H can exchange power control data 710 and/or status data 702 with one or more selected power junction systems 320 in the manner set forth above. The power management system 100 can attempt to resolve any undesired power conditions that might arise during system operation in the manner discussed above. Although shown and described as comprising two power sources 200A, 200B each having a preselected number of power source subsystems 202 for purposes of illustration only, the power management system 100 can comprise any predetermined number of power sources 200, wherein each power source 200 can include any suitable number of number of power source subsystems 202 depending at least in part upon the system application.

Figure 22B:
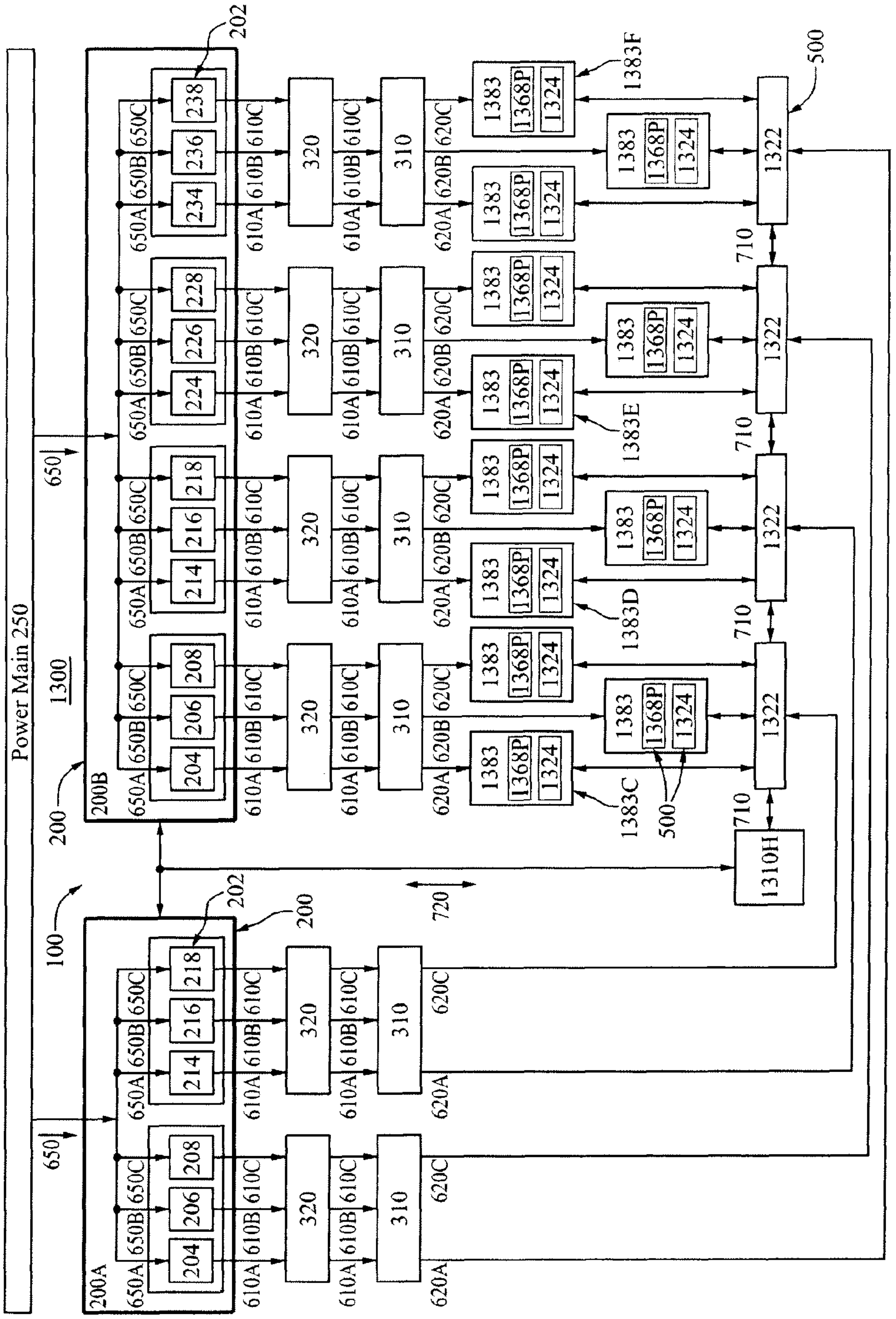
FIG. 22B is an exemplary block diagram illustrating an alternative embodiment of the power management system of FIG. 22A, wherein a selected power source provides input power for the system resources of the vehicle information system.

The power management system 100 of FIG. 22B is shown as being provided in the manner set forth above with reference to FIG. 17 and includes the power sources 200A, 200B as discussed above with reference to FIG. 22A. In the manner set forth above, the power source 200B includes power source subsystems 204, 206, 208, power source subsystems 214, 216, 218, power source subsystems 224, 226, 228, and power source subsystems 234, 236, 238. The power source subsystems 204, 206, 208 can provide multi-phase input power 610 to a selected power conversion system 310 that can convert the multi-phase input power 610 into output power 620 suitable for use by loads 500 within passenger seat group 1383C; whereas, the power source subsystems 214, 216, 218 can provide multi-phase input power 610 to another selected power conversion system 310 that can convert the multi-phase input power 610 into output power 620 suitable for use by loads 500 within another passenger seat group 1383D. The power source subsystems 224, 226, 228 and the power source subsystems 234, 236, 238 likewise can provide multi-phase input power 610 to power conversion systems 310, which can convert the multi-phase input power 610 into output power 620 suitable for use by loads 500 within passenger seat groups 1383E, 1383F, respectively.

To facilitate management of power (and/or current) distribution throughout the vehicle information system 1300, the headend system 1310H can exchange status data 702 with the power source 200 and/or the power control data 710 with the loads 500 within the respective passenger seat groups 1383A-F in the manner set forth above. The headend system 1310H and the respective passenger seat groups 1383A-F are shown as communicating via area distribution boxes 1322. The power source 200A is shown as including power source subsystems 204, 206, 208 and power source subsystems 214, 216, 218. As illustrated in FIG. 22B, the power source subsystems 204, 206, 208 and the power source subsystems 214, 216, 218 each can receive main power components 650A, 650B, 650C and can provide the input power phases 610A, 610B, 610C of the multi-phase input power 610.

The power source subsystems 204, 206, 208 and power source subsystems 214, 216, 218 can provide the multi-phase input power 610 to respective power conversion systems 310 via power junction systems 320. Each power conversion system 310 likewise can convert the multi-phase input power 610 into output power 620 suitable for use by the area distribution boxes 1322 that enable communication between the headend system 1310H and the respective passenger seat groups 1383A-F. Although shown and described as providing output power 620 suitable for use by selected area distribution boxes 1322 for purposes of illustration only, the power source 200A can provide output power 620 suitable for use by any appropriate number of selected system resources (and/or components) of the vehicle information system 1300. Exemplary system resources of the vehicle information system 1300 can include one or more area distribution boxes 1322, floor disconnect boxes 1323 (shown in FIG. 8), seat electronics boxes 1324, video seat electronics boxes, premium seat electronics boxes, line replaceable units 1326 (shown in FIG. 8), media (or content) server systems 1310A (shown in FIG. 8), and/or switching systems 1321 (shown in FIG. 8) without limitation.

Figure 22C:
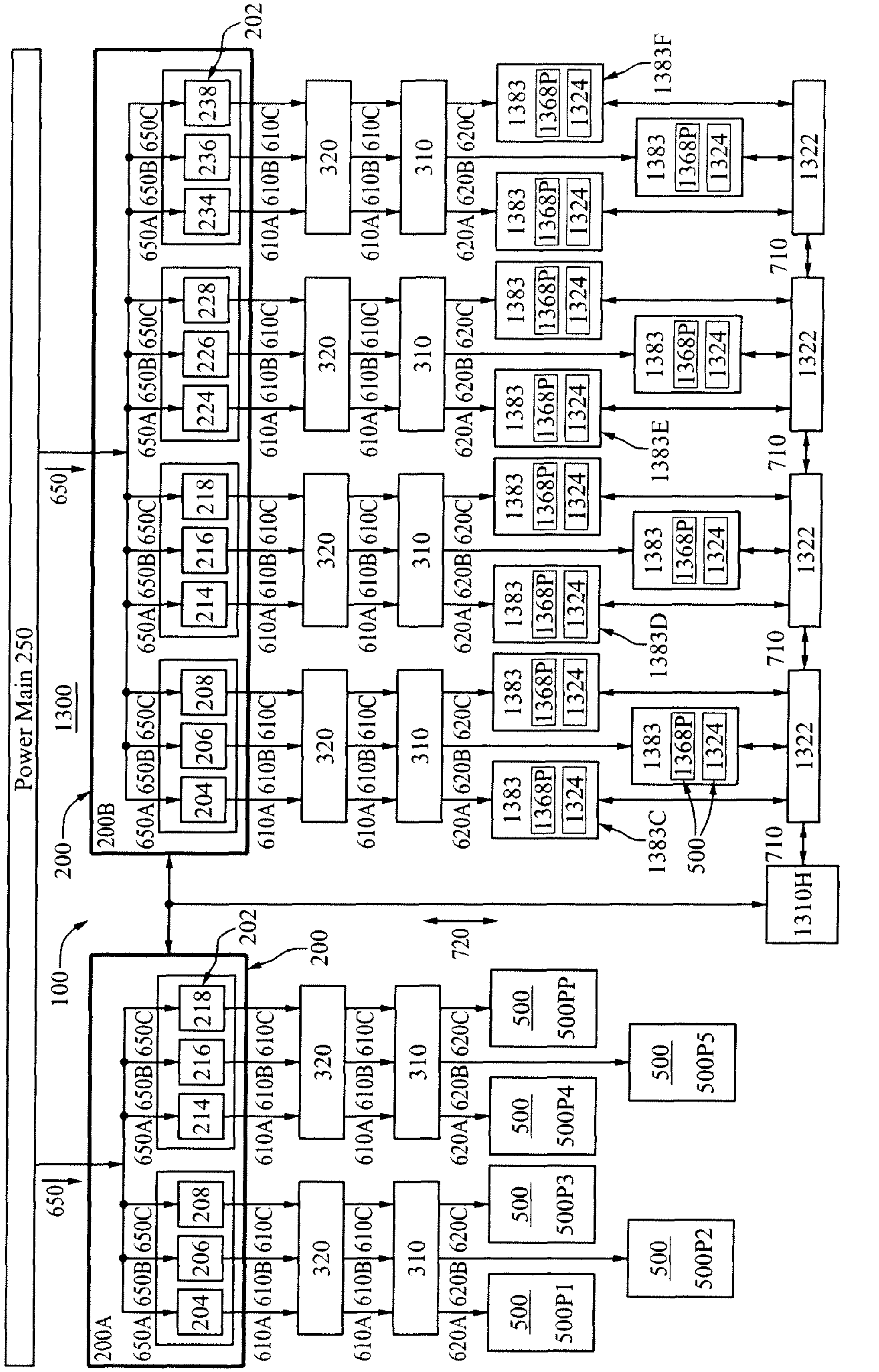
FIG. 22C is an exemplary block diagram illustrating another alternative embodiment of the power management system of FIG. 22A, wherein a selected power source provides input power for selected peripheral systems of the vehicle information system.

Turning to the power management system 100 of FIG. 22C, the selected system resources (and/or components) of the vehicle information system 1300 for which the power source 200A can provide suitable output power 620 are shown as including one or more selected peripheral systems 500P1, 500P2, . . . , 500PP of the vehicle information system 1300. Exemplary peripheral systems 500P1, 500P2, . . . , 500PP can include, but are not limited to, a crew display panel, a digital tapping unit (DTU), a crew printer, DOM, IFE Pilot Rest, IFE Attendant Rest. In the manner set forth above, the power source 200A can include power source subsystems 204, 206, 208 and power source subsystems 214, 216, 218. The power source subsystems 204, 206, 208 and the power source subsystems 214, 216, 218 each can receive main power components 650A, 650B, 650C and can provide the input power phases 610A, 610B, 610C of the multi-phase input power 610. The power source subsystems 204, 206, 208 and power source subsystems 214, 216, 218 can provide the multi-phase input power 610 to respective power conversion systems 310, which can convert the multi-phase input power 610 into output power 620 suitable for use by the selected peripheral systems 500P1, 500P2, . . . , 500PP.

Figure 23:
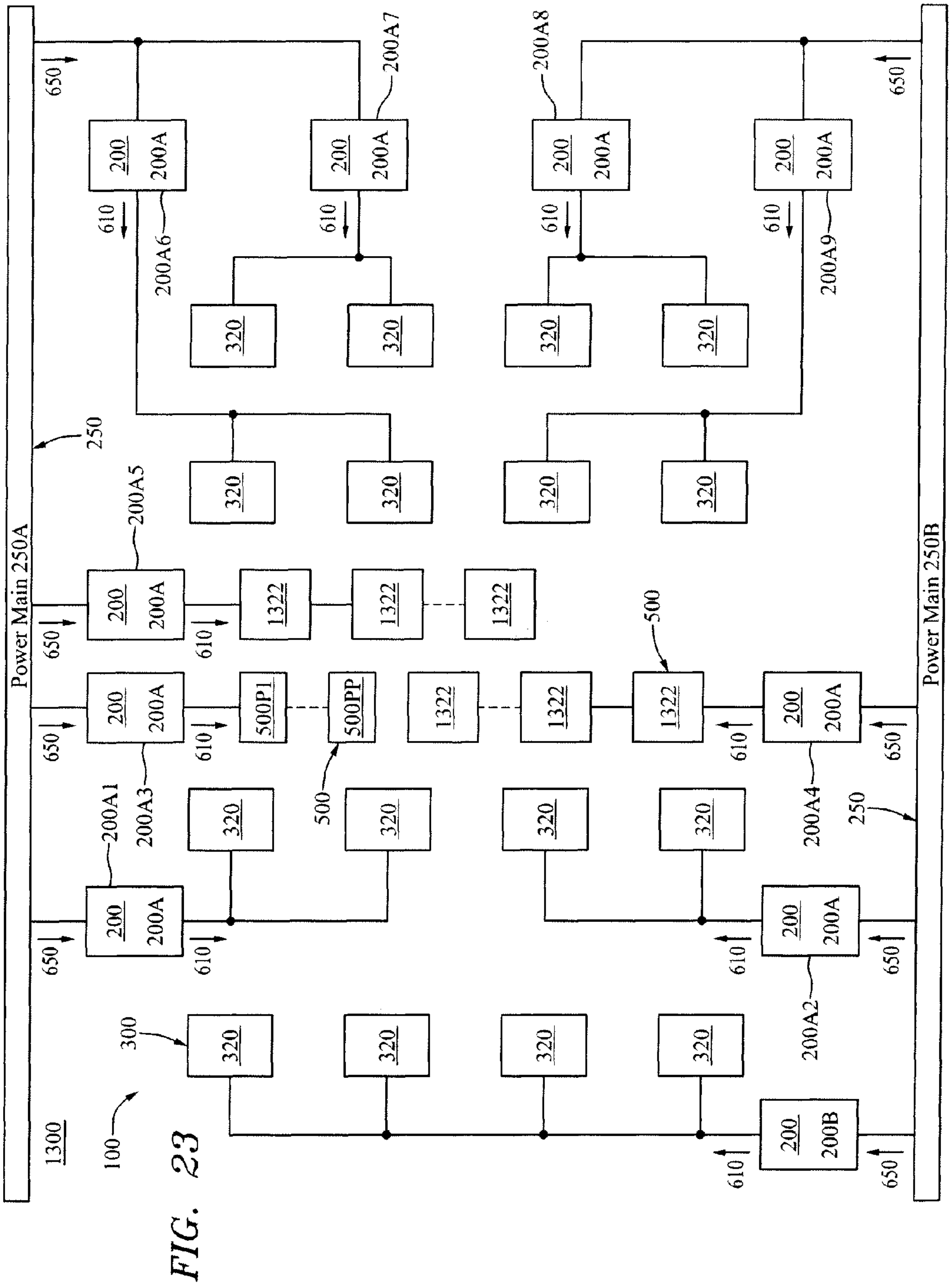
FIG. 23 is an exemplary block diagram illustrating still another alternative embodiment of the power management system of FIG. 17, wherein the power management system receives multi-phase power from a plurality of power mains.

As desired, the power management system 100 can include a plurality of power mains (or busbars) 250. Turning to FIG. 23, for example, the power management system 100 can include a power main 250A and a power main 250B. Each of the power mains 250A, 250B can be provided in the manner set forth in more detail above with reference to the power main 250 (shown in FIG. 12). The power mains 250A, 250B each thereby can provide the main power 650, which can comprise a predetermined number of main power components 650A-C (shown in FIG. 12) The total main power 650 available from each power main 250A, 250B typically is limited by a maximum power rating (and/or power budget) of the relevant power main 250A, 250B. The maximum power rating (and/or power budget) can be uniform and/or different among the power mains 250A, 250B. If the main power 650 comprises multi-phase power, each main power component 650A-C can include a selected phase of the multi-phase main power 650 in the manner discussed above.

As illustrated in FIG. 23, the power management system 100 can include a plurality of power sources 200. The power sources 200 are shown as being provided in the manner set forth above with reference to the power sources 200A, 200B (shown in FIGS. 22A-B). Each power source 200A, 200B can receive the multi-phase main power 650 from a relevant power main 250A, 250B and can provide an associated multi-phase input power 610 to the power distribution system 300, which distributes the input power 610 among one or more associated loads 500 (shown in FIGS. 22A-B) as output power 620 (shown in FIGS. 22A-B) as discussed above.

The power distribution system 300 can be provided in the manner set forth above and, for purposes of clarity only, is represented in FIG. 23 by a plurality of power junction systems 320 that can be distributed throughout the passenger cabin 1380 (shown in FIGS. 9A-B) of a passenger vehicle 1390 (shown in FIGS. 9A-B). In other words, the power distribution system 300 can include one or more power conversion systems 310 for converting the input power 610 into output power 620 suitable for use by the associated loads 500 disposed within one or more passenger seat groups 1383 (shown in FIGS. 22A-C). To facilitate management of power (and/or current) distribution throughout the vehicle information system 1300, a headend system 1310H (shown in FIGS. 22A-B) can exchange status data 702 (shown in FIGS. 22A-B) with each power source 200A, 200B and/or the power control data 710 (shown in FIGS. 22A-B) with the associated loads 500 in the manner set forth above.

The power sources 200 of the power management system 100 can include a plurality of power sources 200A and at least one power source 200B. The power source 200A1, for example, is shown as receiving the multi-phase main power 650 from the power main 250A and as providing the multi-phase input power 610 to the power distribution system 300 for distribution. The multi-phase input power 610 from the power source 200A1 can be provided to at least one power junction system 320 for subsequent conversion into the output power 620 suitable for use by the associated loads 500 disposed within one or more passenger seat groups 1383 as set forth above with reference to FIG. 22A. As shown in FIG. 23, the power sources 200A6, 200A7 likewise can receive the multi-phase main power 650 from the power main 250A and provide the multi-phase input power 610 to the power distribution system 300 for distribution, conversion, and use by the loads 500 disposed within one or more respective passenger seat groups 1383.

Similarly, the power source 200A2 of FIG. 23 is illustrated as receiving the multi-phase main power 650 from the power main 250B and as providing the multi-phase input power 610 to the power distribution system 300 for distribution. As set forth above with reference to the power source 200A1, the multi-phase input power 610 from the power source 200A2 can be provided to at least one power junction system 320 for subsequent conversion into the output power 620 suitable for use by the loads 500 disposed within one or more relevant passenger seat groups 1383. The power sources 200A8, 200A9 and the power source 200B likewise can receive the multi-phase main power 650 from the power main 250B and provide the multi-phase input power 610 to the power distribution system 300 for distribution, conversion, and use by the loads 500 disposed within one or more respective passenger seat groups 1383.

The power sources 200A4, 200A5 can receive the multi-phase main power 650 from the power mains 250B, 250A, respectively, and can provide the multi-phase input power 610 to the power distribution system 300. The power distribution system 300 can distribute and convert the input power 610 into output power 620 suitable for use by one or more respective selected system resources, such as area distribution boxes 1322, of the vehicle information system 1300 in the manner discussed above with reference to FIG. 22B. As shown in FIG. 23, the power source 200A3 can receive the multi-phase main power 650 from the power main 250A and likewise can provide the multi-phase input power 610 to the power distribution system 300. The power distribution system 300 can distribute and convert the input power 610 into output power 620 suitable for use by one or more selected peripheral systems 500P1, . . . , 500PP of the vehicle information system 1300 in the manner discussed above with reference to FIG. 22C.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for providing power management to a multi-phase power source for providing input current to a plurality of power outlets and a plurality of other loads, comprising:

measuring an input current provided by the power source to the loads and the power outlets across each power phase of the power source;

repeating said measuring the input current if the measured input current is less than a first set current value;

entering a first power limiting mode if the measured input current is greater than the first set current value and less than a second set current value, the second set current value being greater than the first set current value;

in the first power limiting mode, disabling each unused power outlet;

measuring a first resultant input current provided to the loads and the remaining power outlets across each power phase of the power source;

entering a second power limiting mode if the first resultant input current is greater than the second set current value;

enabling each of the disabled power outlets and exiting the first power limiting mode if the first resultant input current remains less than a first release current value during a first time interval that is greater than a first release timer value, the first release current value being less than the first set current value; and repeating said measuring the first resultant input current and said entering the second power limiting mode if the first resultant input current becomes greater than the first release current value during the first time interval and enabling each of the disabled power outlets and exiting the first power limiting mode if the first resultant input current remains less than the first release current value during a subsequent first time interval that is greater than the first release timer value, entering the second power limiting mode if the measured input current is greater than the second set current value, in the second power limiting mode, disabling each of the power outlets;

measuring a second resultant input current provided to the loads across each power phase of the power source;

enabling the disabled power outlets and exiting the second power limiting mode if the second resultant input current remains less than a second release current value during a second time interval that is greater than a second release timer value, the second release current value being less than the second set current value; and repeating said measuring the second resultant input current if the second resultant input current is greater than the second release current value during the second time interval and enabling the disabled power outlets and exiting the second power limiting mode if the second resultant input current remains less than the second release current value during a subsequent second time interval that is greater than a second release timer value.

2. The method of claim 1, wherein the second release current value is less than the first release current value.

3. The method of claim 1, wherein at least one load and at least one power outlet is associated with each power phase of the power source, and wherein each of the loads and each of the power outlets receive output power that is associated with a selected phase of the input power, the output power received by each of the power outlets comprising single-phase output power.

4. The method of claim 1, further comprising converting the input power into at least one output power suitable for the loads, wherein the output power comprises multiple forms of power, including single-phase alternating current power and/or direct current power, at a plurality of different voltage and/or current levels.

5. The method of claim 1, further comprising entering the third power limiting mode if the measured input current is greater than a third set current value, the third set current value being greater than the second set current value, in the third power limiting mode, disabling at least one of the other loads;

measuring a third resultant input current provided to the loads across each power phase of the power source;

enabling the disabled power outlets and the disabled loads and exiting the third power limiting mode if the third resultant input current remains less than a third release current value during a third time interval that is greater than a third release timer value, the third release current value being less than the third set current value; and repeating said measuring the third resultant input current if the third resultant input current is greater than the third release current value during the third time interval and enabling the disabled power outlets and the disabled loads and exiting the third power limiting mode if the third resultant input current remains less than the third release current value during a subsequent third time interval that is greater than a third release timer value.

6. The method of claim 1, further comprising at least one of:

establishing the first set power value as being equal to a first predetermined percentage of a maximum baseline current limit of the power source;

establishing the first release power value as being equal to the first set power value less a first predetermined current offset;

establishing the first release timer value as being a first predetermined number of seconds;

establishing the second set power value as being equal to a second predetermined percentage of the maximum baseline current limit of the power source;

establishing the second release power value as being equal to the second set power value less a second predetermined current offset; and establishing the second release timer value as being a second predetermined number of seconds, wherein at least one of the first set power value, the first release power value, the first release timer value, the second set power value, the second release power value, and the second release timer value dynamically changes over time in response to changing system load conditions.

7. The method of claim 6, wherein at least one of:

said establishing the first set power value comprises establishing the first set power value as being between eighty percent and eighty-five percent of the maximum baseline current limit of the power source, said establishing the first release power value comprises establishing the first release power value as being equal to the first set power value less five amperes, said establishing the first release timer value comprises establishing the first release timer value as being equal to ten seconds, said establishing the second set power value comprises establishing the second set power value as being equal to ninety percent of the maximum baseline current limit of the power source, said establishing the second release power value comprises establishing the second release power value as being equal to the second set power value less ten amperes, and said establishing the second release timer value comprises establishing the second release timer value as being equal to sixty seconds.

8. A power management system, comprising:

a multi-phase power source;

a power distribution system for distributing multi-phase input power provided by said multi-phase power source as output power to a plurality of loads and to a plurality of power outlets; and a power control system for managing the distribution of the output power among the loads and the power outlets via the power distribution system, the power control system configured for:

measuring an input current provided by the power source to the loads and the power outlets across each power phase of the power source;

repeating said measuring the input current if the measured input current is less than a first set current value;

entering a first power limiting mode if the measured input current is greater than the first set current value and less than a second set current value the second set current value being greater than the first set current value;

in the first power limiting mode, disabling each unused power outlet;

measuring a first resultant input current provided to the loads and the remaining power outlets across each power phase of the power source;

entering a second power limiting mode if the first resultant input current is greater than the second set current value;

enabling each of the disabled power outlets and exiting the first power limiting mode if the first resultant input current remains less than a first release current value during a first time interval that is greater than a first release timer value, the first release current value being less than the first set current value; and repeating said measuring the first resultant input current and said entering the second power limiting mode if the first resultant input current becomes greater than the first release current value during the first time interval and enabling each of the disabled power outlets and exiting the first power limiting mode if the first resultant input current remains less than the first release current value during a subsequent first time interval that is greater than the first release timer value, entering the second power limiting mode if the measured input current is greater than the second set current value, in the second power limiting mode, disabling each of the power outlets;

measuring a second resultant input current provided to the loads across each power phase of the power source;

enabling the disabled power outlets and exiting the second power limiting mode if the second resultant input current remains less than a second release current value during a second time interval that is greater than a second release timer value, the second release current value being less than the second set current value; and repeating said measuring the second resultant input current if the second resultant input current is greater than the second release current value during the second time interval and enabling the disabled power outlets and exiting the second power limiting mode if the second resultant input current remains less than the second release current value during a subsequent second time interval that is greater than a second release timer value.

9. The power management system of claim 8, wherein said multi-phase power source includes a plurality of power source subsystems, each of said power source subsystems for receiving a selected phase of main power and for providing a selected phase of the input power.

10. The power management system of claim 9, wherein said multi-phase power source includes a multiple of three power source subsystems such that said multi-phase power source provides three-phase input power.

11. The power management system of claim 9, wherein said power control system measures the input power at said power source subsystems.

12. The power management system of claim 8, wherein said power distribution system includes at least one power conversion system for receiving the multi-phase input power from said multi-phase power source and for converting each phase of the multi-phase input power into suitable output power for a respective load group, each of the load groups including at least one load and at least one power outlet.

13. The power management system of claim 12, wherein said power conversion system receives the multi-phase input power from said multi-phase power source via at least one of an intermediate power junction system and an intermediate power conversion system.

14. The power management system of claim 12, wherein said power control system measures the input power at said power conversion system.

15. The power management system of claim 8, wherein the power management system comprises a vehicle information system suitable for installation aboard a passenger vehicle, comprising:

a first area distribution box for communicating with a headend system; and a plurality of first seat electronics boxes coupled with said first area distribution box, each of said first seat electronics boxes and a first group of the power outlets being associated with a respective first passenger seat group, wherein the headend system manages distribution of the multi-phase input power provided by the multi-phase power source as first output power to said first seat electronics boxes and said first group of power outlets.

16. The power management system of claim 15, wherein said vehicle information system further comprises:

a second area distribution box for communicating with the headend system; and a plurality of second seat electronics boxes coupled with said second area distribution box, each of said second seat electronics boxes and a second group of the power outlets being associated with a respective second passenger seat group, wherein the headend system manages distribution of the multi-phase input power provided by the multi-phase power source as second output power to said second seat electronics boxes and said second group of power outlets.

17. The power management system of claim 16, wherein the multi-phase power source comprises a first multi-phase power source for receiving first multi-phase main power from a first power main and for providing the first output power to said first seat electronics boxes and said first group of power outlets and a second multi-phase power source for receiving second main power from a second power main and for providing the second output power to said second seat electronics boxes and said second group of power outlets, and wherein the headend system supports load sharing between the first power main and the second power main.

18. The power management system of claim 16, wherein at least one of said first seat electronics boxes are coupled with said area distribution box in a star network arrangement and said second seat electronics boxes are coupled with said second area distribution box in a star network arrangement.

19. The power management system of claim 16, wherein two or more of said first seat electronics boxes and two or more of said second seat electronics boxes are disposed in a daisy-chain configuration.

20. The power management system of claim 16, wherein said first seat electronics boxes and said first group of power outlets of each respective first passenger seat group and said second seat electronics boxes and said second group of power outlets of each respective second passenger seat group each receive the input power from a respective power source subsystem of the power source.

21. The power management system of claim 16, wherein the headend system establishes at least one of a first set power value, a first release power value, and a first release timer value for each power source subsystem that provides the multi-phase input power to said first seat electronics boxes and said first group of power outlets of the first passenger seat group and establishes at least one of a second set power value, a second release power value, and a second release timer value for each power source subsystem that provides the multi-phase input power to said second seat electronics boxes and said second group of power outlets of the second passenger seat group, wherein at least one of the first set power value, the first release power value, the first release timer value, the second set power value, the second release power value, and the second release timer value dynamically changes over time in response to changing system load conditions.

22. The power management system of claim 21, wherein at least one of the first set power value, the first release power value, and the first release timer value for the first passenger seat group is different from at least one of the second set power value, the second release power value, and the second release timer value for the second passenger seat group.

23. The power management system of claim 22, wherein said vehicle information system is installed aboard an aircraft, and wherein the first passenger seat group and the second passenger seat group are associated with different passenger classes.

24. A computer program product for providing power management to a multi-phase power source for providing input current to a plurality of power outlets and a plurality of other loads, the computer program product being encoded on one or more non-transitory computer-readable media and comprising:

instruction for measuring an input current provided by the power source to the loads and the power outlets across each power phase of the power source;

instruction for repeating said measuring the input current if the measured input current is less than a first set current value;

instruction for entering a first power limiting mode if the measured input current is greater than the first set current value and less than a second set current value, the second set current value being greater than the first set current value;

in the first power limiting mode, instruction for disabling each unused power outlet;

instruction for measuring a first resultant input current provided to the loads and the remaining power outlets across each power phase of the power source;

instruction for entering a second power limiting mode if the first resultant input current is greater than the second set current value;

instruction for enabling each of the disabled power outlets and exiting the first power limiting mode if the first resultant input current remains less than a first release current value during a first time interval that is greater than a first release timer value, the first release current value being less than the first set current value; and instruction for repeating said measuring the first resultant input current and said entering the second power limiting mode if the first resultant input current becomes greater than the first release current value during the first time interval and enabling each of the disabled power outlets and exiting the first power limiting mode if the first resultant input current remains less than the first release current value during a subsequent first time interval that is greater than the first release timer value, instruction for entering the second power limiting mode if the measured input current is greater than the second set current value, in the second power limiting mode, instruction for disabling each of the power outlets;

instruction for measuring a second resultant input current provided to the loads across each power phase of the power source;

instruction for enabling the disabled power outlets and exiting the second power limiting mode if the second resultant input current remains less than a second release current value during a second time interval that is greater than a second release timer value, the second release current value being less than the second set current value; and instruction for repeating said measuring the second resultant input current if the second resultant input current is greater than the second release current value during the second time interval and enabling the disabled power outlets and exiting the second power limiting mode if the second resultant input current remains less than the second release current value during a subsequent second time interval that is greater than a second release timer value.

25. The computer program product of claim 24, wherein the second release current value is less than the first release current value.

26. The computer program product of claim 24, wherein at least one load and at least one power outlet is associated with each power phase of the power source, and wherein each of the loads and each of the power outlets receive output power that is associated with a selected phase of the input power, the output power received by each of the power outlets comprising single-phase output power.

27. The computer program product of claim 24, further comprising instruction for converting the input power into at least one output power suitable for the loads, wherein the output power comprises multiple forms of power, including single-phase alternating current power and/or direct current power, at a plurality of different voltage and/or current levels.

28. The computer program product of claim 24, further comprising instruction for entering the third power limiting mode if the measured input current is greater than a third set current value, the third set current value being greater than the second set current value, in the third power limiting mode, instruction for disabling at least one of the other loads;

instruction for measuring a third resultant input current provided to the loads across each power phase of the power source;

instruction for enabling the disabled power outlets and the disabled loads and exiting the third power limiting mode if the third resultant input current remains less than a third release current value during a third time interval that is greater than a third release timer value, the third release current value being less than the third set current value; and instruction for repeating said instruction for measuring the third resultant input current if the third resultant input current is greater than the third release current value during the third time interval and enabling the disabled power outlets and the disabled loads and instruction for exiting the third power limiting mode if the third resultant input current remains less than the third release current value during a subsequent third time interval that is greater than a third release timer value.

29. The computer program product of claim 24, further comprising at least one of:

instruction for establishing the first set power value as being equal to a first predetermined percentage of a maximum baseline current limit of the power source;

instruction for establishing the first release power value as being equal to the first set power value less a first predetermined current offset;

instruction for establishing the first release timer value as being a first predetermined number of seconds;

instruction for establishing the second set power value as being equal to a second predetermined percentage of the maximum baseline current limit of the power source;

instruction for establishing the second release power value as being equal to the second set power value less a second predetermined current offset; and instruction for establishing the second release timer value as being a second predetermined number of seconds, wherein at least one of the first set power value, the first release power value, the first release timer value, the second set power value, the second release power value, and the second release timer value dynamically changes over time in response to changing system load conditions.

30. The computer program product of claim 29, wherein at least one of:

said instruction for establishing the first set power value comprises instruction for establishing the first set power value as being between eighty percent and eighty-five percent of the maximum baseline current limit of the power source, said instruction for establishing the first release power value comprises instruction for establishing the first release power value as being equal to the first set power value less five amperes, said instruction for establishing the first release timer value comprises instruction for establishing the first release timer value as being equal to ten seconds, said instruction for establishing the second set power value comprises instruction for establishing the second set power value as being equal to ninety percent of the maximum baseline current limit of the power source, said instruction for establishing the second release power value comprises instruction for establishing the second release power value as being equal to the second set power value less ten amperes, and said instruction for establishing the second release timer value comprises instruction for establishing the second release timer value as being equal to sixty seconds.

* * * * *